United States Patent
Lai et al.

(10) Patent No.: US 10,429,624 B2
(45) Date of Patent: *Oct. 1, 2019

(54) OPTICAL IMAGE CAPTURING SYSTEM

(71) Applicant: ABILITY OPTO-ELECTRONICS TECHNOLOGY CO., LTD., Taichung (TW)

(72) Inventors: Chien-Hsun Lai, Taichung (TW); Kuo-Yu Liao, Taichung (TW); Yao-Wei Liu, Taichung (TW); Yeong-Ming Chang, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 262 days.

This patent is subject to a terminal disclaimer.

(21) Appl. No.: 15/378,798

(22) Filed: Dec. 14, 2016

(65) Prior Publication Data
US 2018/0031805 A1 Feb. 1, 2018

(30) Foreign Application Priority Data

Jul. 26, 2016 (TW) .............................. 105123528 A

(51) Int. Cl.
*G02B 13/00* (2006.01)
*G02B 9/14* (2006.01)

(52) U.S. Cl.
CPC ............. *G02B 13/008* (2013.01); *G02B 9/14* (2013.01); *G02B 13/0035* (2013.01)

(58) Field of Classification Search
CPC ............. G02B 13/001; G02B 13/0015; G02B 13/002; G02B 13/0035; G02B 13/008; G02B 13/14; G02B 13/146; G02B 9/12–32; G02B 5/20; G02B 5/208
See application file for complete search history.

(56) References Cited

U.S. PATENT DOCUMENTS

| | | | |
|---|---|---|---|
| 2011/0051229 A1* | 3/2011 | Alexay | G02B 13/146 359/356 |
| 2011/0304764 A1* | 12/2011 | Shigemitsu | G02B 13/0035 348/345 |
| 2013/0301144 A1 | 11/2013 | Tsai | |
| 2015/0370039 A1* | 12/2015 | Bone | G02B 13/004 359/715 |
| 2018/0106979 A1* | 4/2018 | Chang | G02B 7/02 |

FOREIGN PATENT DOCUMENTS

| | | |
|---|---|---|
| CN | 103323930 A | 9/2013 |
| CN | 203838392 U | 9/2014 |
| CN | 105676416 A | 6/2016 |
| CN | 105676429 A | 6/2016 |
| TW | 201341841 A | 10/2013 |
| TW | 201418767 A | 5/2014 |

* cited by examiner

*Primary Examiner* — Derek S. Chapel
*Assistant Examiner* — Adam W Booher
(74) *Attorney, Agent, or Firm* — Muncy, Geissler, Olds & Lowe, P.C.

(57) ABSTRACT

The invention discloses a three-piece optical lens for capturing image and a three-piece optical module for capturing image. In order from an object side to an image side, the optical lens along the optical axis comprises a first lens with positive refractive power; a second lens with refractive power; and a third lens with refractive power; and at least one of the image-side surface and object-side surface of each of the three lenses are aspheric. The optical lens can increase aperture value and improve the imaging quality for use in compact cameras.

25 Claims, 30 Drawing Sheets

OPTICAL IMAGE CAPTURING SYSTEM

BACKGROUND OF THE INVENTION

1. Technical Field

The present invention relates generally to an optical system, and more particularly to a compact optical image capturing system for an electronic device.

2. Description of Related Art

In recent years, with the rise of portable electronic devices having camera functionalities, the demand for an optical image capturing system is raised gradually. The image sensing device of the ordinary photographing camera is commonly selected from charge coupled device (CCD) or complementary metal-oxide semiconductor sensor (CMOS Sensor). In addition, as advanced semiconductor manufacturing technology enables the minimization of the pixel size of the image sensing device, the development of the optical image capturing system towards the field of high pixels. Therefore, the requirement for high imaging quality is rapidly raised.

The conventional optical system of the portable electronic device usually has two lenses. However, the optical system is asked to take pictures in a dark environment, or is asked to provide a wide view angle to satisfy the requirement for taking selfies through the front camera of a portable phone. In other words, the optical system is asked to have a large aperture. However, an optical system having large aperture usually generates aberrations, which causes poor imaging quality at peripheral portions, and also increases the difficulty of manufacturing such an optical system. In addition, an optical system with a wide view angle usually has higher distortion while imaging. The conventional optical system could not provide high optical performance as required.

It is an important issue to increase the amount of light entering the lens, and to widen the view angle of an optical image capturing system. In addition, the modern lens is asked not only to contain more total pixels, to provide higher image quality, but also to balance the requirements for a miniature optical image capturing system.

BRIEF SUMMARY OF THE INVENTION

The aspect of embodiment of the present disclosure directs to an optical image capturing system and an optical image capturing lens which use combination of refractive powers, convex and concave surfaces of three-piece optical lenses (the convex or concave surface in the disclosure denotes the geometrical shape of an image-side surface or an object-side surface of each lens on an optical axis) to increase the amount of incoming light of the optical image capturing system, widen the view angle of the optical image capturing system, and to improve the total pixels contained in an image and the imaging quality, so as to be applied to minimized electronic products.

In addition, when it comes to certain application of optical imaging, there will be a need to capture image via light sources with wavelengths in both visible and infrared ranges, an example of this kind of application is IP video surveillance camera, which is equipped with the Day & Night function. The visible spectrum for human vision has wavelengths ranging from 400 to 700 nm, but the image formed on the camera sensor includes infrared light, which is invisible to human eyes. Therefore, under certain circumstances, an IR cut filter removable (ICR) is placed before the sensor of the IP video surveillance camera, in order to ensure that only the light that is visible to human eyes is picked up by the sensor eventually, so as to enhance the "fidelity" of the image. The ICR of the IP video surveillance camera can completely filter out the infrared light under daytime mode to avoid color cast; whereas under night mode, it allows infrared light to pass through the lens to enhance the image brightness. Nevertheless, the elements of the ICR occupy a significant amount of space and are expensive, which impede to the design and manufacture of miniaturized surveillance cameras in the future.

The aspect of embodiment of the present disclosure directs to an optical image capturing system and an optical image capturing lens which utilize the combination of refractive powers, convex surfaces and concave surfaces of four lenses, as well as the selection of materials thereof, to reduce the difference between the imaging focal length of visible light and imaging focal length of infrared light, in order to achieve the near "confocal" effect without the use of ICR elements.

The term and its definition to the lens parameter in the embodiment of the present are shown as below for further reference.

The lens parameters related to the magnification of the optical image capturing system The optical image capturing system can be designed and applied to biometrics, for example, facial recognition. When the embodiment of the present disclosure is configured to capture image for facial recognition, the infrared light can be adopted as the operation wavelength. For a face of about 15 centimeters (cm) wide at a distance of 25-30 cm, at least 30 horizontal pixels can be formed in the horizontal direction of an image sensor (pixel size of 1.4 micrometers (μm)). The linear magnification of the infrared light on the image plane is LM, and it meets the following conditions: LM≥0.0003, where LM=(30 horizontal pixels)*(1.4 μm pixel size)/(15 cm, width of the photographed object). Alternatively, the visible light can also be adopted as the operation wavelength for image recognition. When the visible light is adopted, for a face of about 15 cm wide at a distance of 25-30 cm, at least 50 horizontal pixels can be formed in the horizontal direction of an image sensor (pixel size of 1.4 micrometers (μm)).

The lens parameter related to a length or a height in the lens:

For visible spectrum, the present invention may adopt the wavelength of 555 nm as the primary reference wavelength and the basis for the measurement of focus shift; for infrared spectrum (700-1000 nm), the present invention may adopt the wavelength of 850 nm as the primary reference wavelength and the basis for the measurement of focus shift.

The optical image capturing system includes a first image plane and a second image plane. The first image plane is an image plane specifically for the visible light, and the first image plane is perpendicular to the optical axis; the through-focus modulation transfer rate (value of MTF) at the first spatial frequency has a maximum value at the central field of view of the first image plane; the second image plane is an image plane specifically for the infrared light, and second image plane is perpendicular to the optical axis; the through-focus modulation transfer rate (value of MTF) at the first spatial frequency has a maximum value in the central of field of view of the second image plane. The optical image capturing system also includes a first average image plane and a second average image plane. The first average image plane is an image plane specifically for the visible light, and the first average image plane is perpendicular to the optical axis. The first average image plane is installed at the average position of the defocusing positions, where the values of MTF of the visible light at the central field of view, 0.3 field of view, and the 0.7 field of view are at their respective maximum at the first spatial frequency. The second average image plane is an image plane specifically for the infrared light, and the second average image plane is perpendicular to the optical axis. The second average image plane is installed at the average position of the defocusing positions, where the values of MTF of the infrared light at the central field of view, 0.3 field of view, and the 0.7 field of view are at their respective maximum at the first spatial frequency.

The aforementioned first spatial frequency is set to be half of the spatial frequency (half frequency) of the image sensor (sensor) used in the present invention. For example, for an image sensor having the pixel size of 1.12 μm or less, the quarter spatial frequency, half spatial frequency (half frequency) and full spatial frequency (full frequency) in the characteristic diagram of modulation transfer function are at least 110 cycles/mm, 220 cycles/mm and 440 cycles/mm, respectively. Lights of any field of view can be further divided into sagittal ray and tangential ray.

The focus shifts where the through-focus MTF values of the visible sagittal ray at the central field of view, 0.3 field of view, and 0.7 field of view of the optical image capturing system are at their respective maxima, are denoted by VSFS0, VSFS3, and VSFS7 (unit of measurement: mm), respectively. The maximum values of the through-focus MTF of the visible sagittal ray at the central field of view, 0.3 field of view, and 0.7 field of view are denoted by VSMTF0, VSMTF3, and VSMTF7, respectively. The focus shifts where the through-focus MTF values of the visible tangential ray at the central field of view, 0.3 field of view, and 0.7 field of view of the optical image capturing system are at their respective maxima, are denoted by VTFS0, VTFS3, and VTFS7 (unit of measurement: mm), respectively. The maximum values of the through-focus MTF of the visible tangential ray at the central field of view, 0.3 field of view, and 0.7 field of view are denoted by VTMTF0, VTMTF3, and VTMTF7, respectively. The average focus shift (position) of both the aforementioned focus shifts of the visible sagittal ray at three fields of view and focus shifts of the visible tangential ray at three fields of view is denoted by AVFS (unit of measurement: mm), which equals to the absolute value |(VSFS0+VSFS3+VSFS7+VTFS0+VTFS3+VTFS7)/6|.

The focus shifts where the through-focus MTF values of the infrared sagittal ray at the central field of view, 0.3 field of view, and 0.7 field of view of the optical image capturing system are at their respective maxima, are denoted by ISFS0, ISFS3, and ISFS7 (unit of measurement: mm), respectively. The average focus shift (position) of the aforementioned focus shifts of the infrared sagittal ray at three fields of view is denoted by AISFS (unit of measurement: mm). The maximum values of the through-focus MTF of the infrared sagittal ray at the central field of view, 0.3 field of view, and 0.7 field of view are denoted by ISMTF0, ISMTF3, and ISMTF7, respectively. The focus shifts where the through-focus MTF values of the infrared tangential ray at the central field of view, 0.3 field of view, and 0.7 field of view of the optical image capturing system are at their respective maxima, are denoted by ITFS0, ITFS3, and ITFS7 (unit of measurement: mm), respectively. The average focus shift (position) of the aforementioned focus shifts of the infrared tangential ray at three fields of view is denoted by AITFS (unit of measurement: mm). The maximum values of the through-focus MTF of the infrared tangential ray at the central field of view, 0.3 field of view, and 0.7 field of view are denoted by ITMTF0, ITMTF3, and ITMTF7, respectively. The average focus shift (position) of both of the aforementioned focus shifts of the infrared sagittal ray at the three fields of view and focus shifts of the infrared tangential ray at the three fields of view is denoted by AIFS (unit of measurement: mm), which equals to the absolute value of |(ISFS0+ISFS3+ISFS7+ITFS0+ITFS3+ITFS7)/6|.

The focus shift (difference) between the focal points of the visible light and the infrared light at their central fields of view (RGB/IR) of the entire optical image capturing system (i.e. wavelength of 850 nm versus wavelength of 555 nm, unit of measurement: mm) is denoted by FS, which satisfies the absolute value |(VSFS0+VTFS0)/2−(ISFS0+ITFS0)/2|. The difference (focus shift) between the average focus shift of the visible light in the three fields of view and the average focus shift of the infrared light in the three fields of view (RGB/IR) of the entire optical image capturing system is denoted by AFS (i.e. wavelength of 850 nm versus wavelength of 555 nm, unit of measurement: mm), which equals to the absolute value of |AIFS−AVFS|.

A height for image formation of the optical image capturing system is denoted by HOI. A height of the optical image capturing system is denoted by HOS. A distance from the object-side surface of the first lens to the image-side surface of the third lens is denoted by InTL. A distance between the image-side surface of the third lens and the image plane is denoted as InB; InTL+InB=HOS; A distance from the first lens to the second lens is denoted by IN12 (as an example). A central thickness of the first lens of the optical image capturing system on the optical axis is denoted by TP1 (as an example).

The lens parameter related to a material in the lens:

An Abbe number of the first lens in the optical image capturing system is denoted by NA1 (as an example). A refractive index of the first lens is denoted by Nd1 (as an example).

The lens parameter related to a view angle in the lens:

A view angle is denoted by AF. Half of the view angle is denoted by HAF. A major light angle is denoted by MRA.

The lens parameter related to exit/entrance pupil in the lens:

An entrance pupil diameter of the optical image capturing system is denoted by HEP. For any surface of any lens, a maximum effective half diameter (EHD) is a perpendicular distance between an optical axis and a crossing point on the surface where the incident light with a maximum viewing angle of the system passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on.

The lens parameter related to a depth of the lens shape:

A displacement from a point on the object-side surface of the third lens, which is passed through by the optical axis, to a point on the optical axis, where a projection of the maximum effective semi diameter of the object-side surface of the third lens ends, is denoted by InRS31 (as an example). A distance in parallel with the optical axis from a point on the image-side surface of the third lens where the optical axis passes through to the position of the maximum effective semi diameter on the image-side surface of the third lens is denoted by InRS32 (as an example).

The lens parameter related to the lens shape:

A critical point C is a tangent point on a surface of a specific lens, and the tangent point is tangent to a plane perpendicular to the optical axis and the tangent point cannot be a crossover point on the optical axis. By the definition, a distance perpendicular to the optical axis between a critical point C21 on the object-side surface of the second lens and the optical axis is denoted by HVT21 (as an example), and a distance perpendicular to the optical axis between a critical point C22 on the image-side surface of the second lens and the optical axis is denoted by HVT22 (as an example). A distance perpendicular to the optical axis between a critical point C31 on the object-side surface of the third lens and the optical axis is denoted by HVT31 (as an example), and a distance perpendicular to the optical axis between a critical point C32 on the image-side surface of the third lens and the optical axis is denoted by HVT32 (as an example). A distance perpendicular to the optical axis between a critical point on the object-side or image-side surface of other lenses the optical axis is denoted in the same manner.

The object-side surface of the third lens has one inflection point IF311 which is nearest to the optical axis, and the sinkage value of the inflection point IF311 is denoted by SGI311 (as an example). A distance perpendicular to the optical axis between the inflection point IF311 and the optical axis is HIF311 (as an example). The image-side surface of the third lens has one inflection point IF321 which is nearest to the optical axis, and the sinkage value of the inflection point IF321 is denoted by SGI321 (as an example). A distance perpendicular to the optical axis between the inflection point IF321 and the optical axis is HIF321 (as an example).

The object-side surface of the third lens has one inflection point IF312 which is the second nearest to the optical axis, and the sinkage value of the inflection point IF312 is denoted by SGI312 (as an example). A distance perpendicular to the optical axis between the inflection point IF312 and the optical axis is HIF312 (as an example). The image-side surface of the third lens has one inflection point IF322 which is the second nearest to the optical axis, and the sinkage value of the inflection point IF322 is denoted by SGI322 (as an example). A distance perpendicular to the optical axis between the inflection point IF322 and the optical axis is HIF322 (as an example).

The object-side surface of the third lens has one inflection point IF313 which is the third nearest to the optical axis, and the sinkage value of the inflection point IF313 is denoted by SGI313 (as an example). A distance perpendicular to the optical axis between the inflection point IF313 and the optical axis is HIF313 (as an example). The image-side surface of the third lens has one inflection point IF323 which is the third nearest to the optical axis, and the sinkage value of the inflection point IF323 is denoted by SGI323 (as an example). A distance perpendicular to the optical axis between the inflection point IF323 and the optical axis is HIF323 (as an example).

The object-side surface of the third lens has one inflection point IF314 which is the fourth nearest to the optical axis, and the sinkage value of the inflection point IF314 is denoted by SGI314 (as an example). A distance perpendicular to the optical axis between the inflection point IF314 and the optical axis is HIF314 (as an example). The image-side surface of the third lens has one inflection point IF324 which is the fourth nearest to the optical axis, and the sinkage value of the inflection point IF324 is denoted by SGI324 (as an example). A distance perpendicular to the optical axis between the inflection point IF324 and the optical axis is HIF324 (as an example).

An inflection point, a distance perpendicular to the optical axis between the inflection point and the optical axis, and a sinkage value thereof on the object-side surface or image-side surface of other lenses is denoted in the same manner.

The lens parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

A modulation transfer function (MTF) graph of an optical image capturing system is used to test and evaluate the contrast and sharpness of the generated images. The vertical axis of the coordinate system of the MTF graph represents the contrast transfer rate, of which the value is between 0 and 1, and the horizontal axis of the coordinate system represents the spatial frequency, of which the unit is cycles/mm or 1 p/mm, i.e., line pairs per millimeter. Theoretically, a perfect optical image capturing system can present all detailed contrast and every line of an object in an image. However, the contrast transfer rate of a practical optical image capturing system along a vertical axis thereof would be less than 1. In addition, peripheral areas in an image would have poorer realistic effect than a center area thereof has. For visible spectrum, the values of MTF in the spatial frequency of 55 cycles/mm at the optical axis, 0.3 field of view, and 0.7 field of view on an image plane are respectively denoted by MTFE0, MTFE3, and MTFE7; the values of MTF in the spatial frequency of 110 cycles/mm at the optical axis, 0.3 field of view, and 0.7 field of view on an image plane are respectively denoted by MTFQ0, MTFQ3, and MTFQ7; the values of MTF in the spatial frequency of 220 cycles/mm at the optical axis, 0.3 field of view, and 0.7 field of view on an image plane are respectively denoted by MTFH0, MTFH3, and MTFH7; the values of MTF in the spatial frequency of 440 cycles/mm at the optical axis, 0.3 field of view, and 0.7 field of view on the image plane are respectively denoted by MTF0, MTF3, and MTF7. The three aforementioned fields of view respectively represent the center, the inner field of view, and the outer field of view of a lens, and, therefore, can be used to evaluate the performance of an optical image capturing system. If the optical image capturing system provided in the present invention corresponds to photosensitive components which provide pixels having a size no large than 1.12 micrometer, a quarter of the spatial frequency, a half of the spatial frequency (half frequency), and the full spatial frequency (full frequency) of the MTF diagram are respectively at least 110 cycles/mm, 220 cycles/mm and 440 cycles/mm.

If an optical image capturing system is required to be able also to image for infrared spectrum, e.g., to be used in low-light environments, then the optical image capturing system should be workable in wavelengths of 850 nm or 800 nm. Since the main function for an optical image capturing system used in low-light environment is to distinguish the shape of objects by light and shade, which does not require high resolution, it is appropriate to only use spatial frequency less than 110 cycles/mm for evaluating the performance of optical image capturing system in the infrared spectrum. When the aforementioned wavelength of 850 nm focuses on the image plane, the contrast transfer rates (i.e., the values of MTF) in spatial frequency of 55 cycles/mm at the optical axis, 0.3 field of view, and 0.7 field of view on an image plane are respectively denoted by MTFI0, MTFI3, and MTFI7. However, infrared wavelengths of 850 nm or 800 nm are far away from the wavelengths of visible light; it would be difficult to design an optical image capturing system capable of focusing visible and infrared light (i.e., dual-mode) at the same time and achieving certain performance.

The present invention provides an optical image capturing system capable of focusing visible and infrared light (i.e., dual-mode) at the same time and achieving certain performance, in which the third lens is provided with an inflection point at the object-side surface or at the image-side surface to adjust the incident angle of each view field and modify the ODT and the TDT. In addition, the surfaces of the third lens are capable of modifying the optical path to improve the imagining quality.

The optical image capturing system of the present invention includes a first lens, a second lens, a third lens, a first image plane, and a second image plane. The first image plane is an image plane specifically for the visible light, and the first image plane is perpendicular to the optical axis; the through-focus modulation transfer rate (value of MTF) at the first spatial frequency has a maximum value at the central field of view of the first image plane; the second image plane is an image plane specifically for the infrared light, and second image plane is perpendicular to the optical axis; the through-focus modulation transfer rate (value of MTF) at the first spatial frequency has a maximum value at the central of field of view of the second image plane. All lenses among the first lens to the third lens have refractive power. The optical image capturing system satisfies:

$$1 \leq f/HEP \leq 1.0;\ 0.5 \leq HOS/f \leq 20;\ |FS| \leq 30\ \mu m\ \text{and}\ 0.5 \leq SETP/STP < 1;$$

where f is a focal length of the optical image capturing system; HEP is an entrance pupil diameter of the optical image capturing system; HOS is a distance between an object-side surface, which face the object side, of the first lens and the first image plane on the optical axis; HAF is a half of a maximum view angle of the optical image capturing system; HOI is the maximum image height on the first image plane perpendicular to the optical axis of the optical image capturing system; FS is the distance on the optical axis between the first image plane and the second image plane; ETP1, ETP2, and ETP3 are respectively a thickness in parallel with the optical axis at a height of ½ HEP of the first lens to the third lens, wherein SETP is a sum of the aforementioned ETP1 to ETP3; TP1, TP2, and TP3 are respectively a thickness at the optical axis of the first lens to the third lens, wherein STP is a sum of the aforementioned TP1 to TP3.

The present invention further provides an optical image capturing system, including a first lens, a second lens, a third lens, a first image plane, and a second image plane. The first image plane is an image plane specifically for the visible light, and the first image plane is perpendicular to the optical axis; the through-focus modulation transfer rate (value of MTF) at the first spatial frequency has a maximum value at the central field of view of the first image plane; the second image plane is an image plane specifically for the infrared light, and second image plane is perpendicular to the optical axis; the through-focus modulation transfer rate (value of MTF) at the first spatial frequency has a maximum value at the central of field of view of the second image plane. The first lens has refractive power. The second lens has refractive power, and the image-side surface thereof is convex on the optical axis. The third lens has refractive power. The optical image capturing system satisfies:

$$1 \leq f/HEP \leq 1.0;\ 0.5 \leq HOS/f \leq 20;\ |FS| \leq 30\ \mu m\ \text{and}\ 0.5 \leq EIN/ETL < 1;$$

where f1, f2, and f3 are the focal lengths of the first, the second, and the third lenses, respectively; f is a focal length of the optical image capturing system; HEP is an entrance pupil diameter of the optical image capturing system; HOS is a distance between an object-side surface, which face the object side, of the first lens and the first image plane on the optical axis; HAF is a half of a maximum view angle of the optical image capturing system; HOI is the maximum image height on the first image plane perpendicular to the optical axis of the optical image capturing system; FS is the distance on the optical axis between the first image plane and the second image plane; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the third lens.

The present invention further provides an optical image capturing system, including a first lens, a second lens, a third lens, a first average image plane, and a second average image plane. The first average image plane is an image plane specifically for the visible light, and the first average image plane is perpendicular to the optical axis. The first average image plane is installed at the average position of the defocusing positions, where the values of MTF of the visible light at the central field of view, 0.3 field of view, and the 0.7 field of view are at their respective maximum at the first spatial frequency. The second average image plane is an image plane specifically for the infrared light, and the second average image plane is perpendicular to the optical axis. The second average image plane is installed at the average position of the defocusing positions, where the values of MTF of the infrared light at the central field of view, 0.3 field of view, and the 0.7 field of view are at their respective maximum at the first spatial frequency. The first lens has positive refractive power, and the image-side surface thereof is convex on the optical axis. The second lens has refractive power, and the image-side surface thereof is convex on the optical axis. The third lens has positive refractive power. The optical image capturing system satisfies:

$$1 \leq f/HEP \leq 10;\ 0.2 \leq EIN/ETL < 1;$$

where f1, f2, and f3 are the focal lengths of the first, the second, and the third lenses, respectively; f is a focal length of the optical image capturing system; HEP is an entrance pupil diameter of the optical image capturing system; HOS is a distance between an object-side surface, which face the object side, of the first lens and the image plane on the optical axis; HAF is a half of a maximum view angle of the optical image capturing system; HOI is the maximum image height on the first image plane perpendicular to the optical axis of the optical image capturing system; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the third lens.

For any lens, the thickness at the height of a half of the entrance pupil diameter (HEP) particularly affects the ability of correcting aberration and differences between optical paths of light in different fields of view of the common region of each field of view of light within the covered range at the height of a half of the entrance pupil diameter (HEP). With greater thickness, the ability to correct aberration is better. However, the difficulty of manufacturing increases as well. Therefore, the thickness at the height of a half of the entrance pupil diameter (HEP) of any lens has to be controlled. The ratio between the thickness (ETP) at the height of a half of the entrance pupil diameter (HEP) and the thickness (TP) of any lens on the optical axis (i.e., ETP/TP) has to be particularly controlled. For example, the thickness at the height of a half of the entrance pupil diameter (HEP) of the first lens is denoted by ETP1, the thickness at the height of a half of the entrance pupil diameter (HEP) of the second lens is denoted by ETP2, and the thickness at the height of a half of the entrance pupil diameter (HEP) of any other lens in the optical image capturing system is denoted in the same manner. The optical image capturing system of the present invention satisfies:

$0.3 \leq SETP/EIN \leq 0.9$;

where SETP is the sum of the aforementioned ETP1 to ETP3.

In order to enhance the ability of correcting aberration and to lower the difficulty of manufacturing at the same time, the ratio between the thickness (ETP) at the height of a half of the entrance pupil diameter (HEP) and the thickness (TP) of any lens on the optical axis (i.e., ETP/TP) has to be particularly controlled. For example, the thickness at the height of a half of the entrance pupil diameter (HEP) of the first lens is denoted by ETP1, the thickness of the first lens on the optical axis is TP1, and the ratio between these two parameters is ETP1/TP1; the thickness at the height of a half of the entrance pupil diameter (HEP) of the first lens is denoted by ETP2, the thickness of the second lens on the optical axis is TP2, and the ratio between these two parameters is ETP2/TP2. The ratio between the thickness at the height of a half of the entrance pupil diameter (HEP) and the thickness of any other lens in the optical image capturing system is denoted in the same manner. The optical image capturing system of the present invention satisfies:

$0.5 \leq ETP/TP \leq 5$.

The horizontal distance between two neighboring lenses at the height of a half of the entrance pupil diameter (HEP) is denoted by ED, wherein the aforementioned horizontal distance (ED) is parallel to the optical axis of the optical image capturing system, and particularly affects the ability of correcting aberration and differences between optical paths of light in different fields of view of the common region of each field of view of light at the height of a half of the entrance pupil diameter (HEP). With longer distance, the ability to correct aberration is potential to be better. However, the difficulty of manufacturing increases, and the feasibility of "slightly shorten" the length of the optical image capturing system is limited as well. Therefore, the horizontal distance (ED) between two specific neighboring lenses at the height of a half of the entrance pupil diameter (HEP) has to be controlled.

In order to enhance the ability of correcting aberration and to lower the difficulty of "slightly shorten" the length of the optical image capturing system at the same time, the ratio between the horizontal distance (ED) between two neighboring lenses at the height of a half of the entrance pupil diameter (HEP) and the parallel distance (IN) between these two neighboring lens on the optical axis (i.e., ED/IN) has to be particularly controlled. For example, the horizontal distance between the first lens and the second lens at the height of a half of the entrance pupil diameter (HEP) is denoted by ED12, the horizontal distance between the first lens and the second lens on the optical axis is denoted by IN12, and the ratio between these two parameters is ED12/IN12; the horizontal distance between the second lens and the third lens at the height of a half of the entrance pupil diameter (HEP) is denoted by ED23, the horizontal distance between the second lens and the third lens on the optical axis is denoted by IN23, and the ratio between these two parameters is ED23/IN23. The ratio between the horizontal distance between any two neighboring lenses at the height of a half of the entrance pupil diameter (HEP) and the horizontal distance between these two neighboring lenses on the optical axis is denoted in the same manner.

The horizontal distance in parallel with the optical axis between a coordinate point at the height of ½ HEP on the image-side surface of the third lens and image surface is denoted by EBL. The horizontal distance in parallel with the optical axis between the point on the image-side surface of the third lens where the optical axis passes through and the image plane is denoted by BL. In order to enhance the ability to correct aberration and to preserve more space for other optical components, the optical image capturing system of the present invention can satisfy: $0.2 \leq EBL/BL \leq 1.1$.

The optical image capturing system can further include a filtering component, which is provided between the third lens and the image plane, wherein the horizontal distance in parallel with the optical axis between the coordinate point at the height of ½ HEP on the image-side surface of the third lens and the filtering component is denoted by EIR, and the horizontal distance in parallel with the optical axis between the point on the image-side surface of the fifth lens where the optical axis passes through and the filtering component is denoted by PIR. The optical image capturing system of the present invention can satisfy: $0.2 \leq EIR/PIR \leq 0.8$.

The optical image capturing system could be applied with an image sensor of which the image size is less than 1/1.2 inches in diagonal. Pixel size of said image sensor is less than 1.4 μm, which is preferred to be less than 1.12 μm, and is most preferred to be less than 0.9 μm. In addition, the optical image capturing system would be compatible with an image sensor of which aspect ratio is 16:9.

Said optical image capturing system could meet the requirement for recording megapixel videos, and could provide good image quality.

In an embodiment, a height of the optical image capturing system (HOS) can be reduced while $|f1|>f3$.

In an embodiment, when the lenses satisfy $|f2|>|f1|$, the second lens has weak positive refractive power or weak negative refractive power. When the second lenses has weak positive refractive power, it may share the positive refractive power of the first lens, and on the contrary, when the second lenses has weak negative refractive power, it may fine tune and correct the aberration of the system.

In an embodiment, the third lens could have positive refractive power, and an image-side surface thereof is concave, it may reduce back focal length and size. Besides, the third lens can have at least an inflection point on at least a surface thereof, which may reduce an incident angle of the light of an off-axis field of view and correct the aberration of the off-axis field of view.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
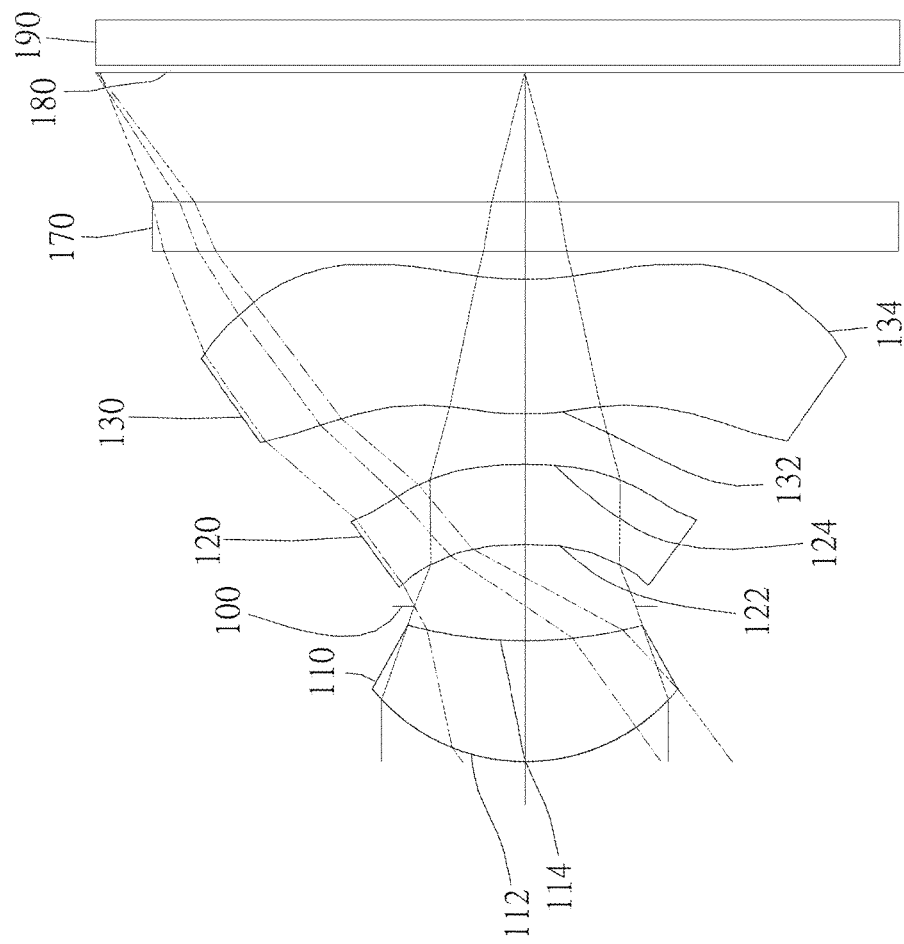
FIG. 1A is a schematic diagram of a first embodiment of the present invention.

An optical image capturing system of the present invention includes a first lens, a second lens, and a third lens from an object side to an image side. The optical image capturing system further is provided with an image sensor at an image plane.

The optical image capturing system can also work in five wavelengths, including 480 nm, 510 nm, 555 nm, 610 nm, and 650 nm wherein 555 nm is the main reference wavelength, and is the reference wavelength for obtaining the technical characters. Referring to obtaining the values of lateral aberration while the longest operation wavelength and the shortest operation wavelength passing through the margin of the aperture, the longest operation wavelength is set as 650 nm, the main wavelength of light of the reference wavelength is set as 555 nm, and the shortest operation wavelength is set as 470 nm.

The optical image capturing system of the present invention satisfies $0.5 \leq \Sigma PPR/|\Sigma NPR| \leq 4.5$, and a preferable range is $1 \leq PPR/|\Sigma NPR| \leq 3.8$, where PPR is a ratio of the focal length f of the optical image capturing system to a focal length fp of each of lenses with positive refractive power;

NPR is a ratio of the focal length f of the optical image capturing system to a focal length fn of each of lenses with negative refractive power; ΣPPR is a sum of the PPRs of each positive lens; and ΣNPR is a sum of the NPRs of each negative lens. It is helpful for control of an entire refractive power and an entire length of the optical image capturing system.

The height of the optical image capturing system is denoted by HOS. When HOS/f is close to 1, it would help to manufacture a miniaturized optical image capturing system capable of providing images of hyper-rich pixels.

A sum of the focal lengths fp of each lens with positive refractive power in the optical image capturing system is denoted by ΣPP, while a sum of each lens with negative refractive power in the optical image capturing system is denoted by ΣNP. In an embodiment, the optical image capturing system satisfies the condition: 0≤ΣPP≤200; and f1/PP≤0.85. Preferably, the optical image capturing system satisfies the condition: 0≤ΣPP≤150; and 0.01≤f1/ΣPP≤0.6. Whereby, the focusing ability of the optical image capturing system could be controlled. Furthermore, the positive refractive power of the system could be properly distributed to suppress obvious aberration from happening too early. The first lens has positive refractive power, and an object-side surface thereof could be convex. Whereby, the strength of the positive refractive power of the first lens could be properly adjusted, which helps to shorten a total length of the optical image capturing system.

The second lens could have negative refractive power, which helps to compensate the aberration generated by the first lens.

The third lens could have positive refractive power, and an image-side surface thereof could be concave. Whereby, the positive refractive power of the first lens could be shard, and it would help to shorten the rear focal length to maintain miniature. In addition, at least a surface of third lens could have at least an inflection point, which could effectively suppress the incidence angle of light in the off-axis field of view, and further correct the aberration in the off-axis field of view. Preferably, an object-side surface and the image-side surface thereof both have at least an inflection point.

The image sensor is provided on the image plane. The optical image capturing system of the present invention satisfies HOS/HOI≤3 and 0.5≤HOS/f≤3.0, and a preferable range is 1≤HOS/HOI≤2.5 and 1≤HOS/f≤2, where HOI is a half of a diagonal of an effective sensing area of the image sensor, i.e., the maximum image height, and HOS is a height of the optical image capturing system, i.e. a distance on the optical axis between the object-side surface of the first lens and the image plane. It is helpful for reduction of the size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies 0.5≤InS/HOS≤1.1, where InS is a distance between the aperture and the image plane. Preferably, the optical image capturing system satisfies 0.6≤InS/HOS≤1. It is helpful for size reduction and wide angle.

The optical image capturing system of the present invention satisfies 0.45≤ΣTP/InTL≤0.95, where InTL is a distance between the object-side surface of the first lens and the image-side surface of the third lens, and ETP is a sum of central thicknesses of the lenses on the optical axis. It is helpful for the contrast of image and yield rate of manufacture and provides a suitable back focal length for installation of other elements.

The optical image capturing system of the present invention satisfies 0.1≤|R1/R2|≤3.0, and a preferable range is 0.1≤|R1/R2|≤2.0, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies −200<(R5−R6)/(R5+R6)<30, where R5 is a radius of curvature of the object-side surface of the third lens, and R6 is a radius of curvature of the image-side surface of the third lens. It may modify the astigmatic field curvature.

The optical image capturing system of the present invention satisfies 0<IN12/f≤0.30, and a preferable range is 0.01≤IN12/f≤0.25, where IN12 is a distance on the optical axis between the first lens and the second lens. It may correct chromatic aberration and improve the performance.

The optical image capturing system of the present invention satisfies IN23/f≤0.25, where IN23 is a distance on the optical axis between the second lens and the third lens. It may correct chromatic aberration and improve the performance.

The optical image capturing system of the present invention satisfies 2≤(TP1+IN12)/TP2≤10, where TP1 is a central thickness of the first lens on the optical axis, and TP2 is a central thickness of the second lens on the optical axis. It may control the sensitivity of manufacture of the system and improve the performance.

The optical image capturing system of the present invention satisfies 1.0≤(TP3+IN23)/TP2≤10, where TP3 is a central thickness of the third lens on the optical axis, and IN23 is a distance between the second lens and the third lens. It may control the sensitivity of manufacture of the system and reduce the total height of the system.

The optical image capturing system of the present invention satisfies 0.1≤TP1/TP2≤0.6; 0.1≤TP2/TP3≤0.6. It may fine tune and correct the aberration of the incident rays layer by layer, and reduce the height of the system.

The optical image capturing system 10 of the first embodiment further satisfies −1 mm≤InRS31≤1 mm; −1 mm≤InRS32≤1 mm; 1 mm≤|InRS31|+|InRS32|≤2 mm; 0.01≤|InRS31|/TP3≤10; 0.01≤|InRS32|/TP3≤10, where InRS31 is a displacement from a point on the object-side surface of the third lens, which is passed through by the optical axis, to a point on the optical axis, where a projection of the maximum effective semi diameter of the object-side surface of the third lens ends (if the displacement on the optical axis moves towards the image side, then InRS31 is a positive value; if the displacement on the optical axis moves towards the object side, then InRS31 is a negative value); InRS32 is a displacement from a point on the image-side surface of the third lens, which is passed through by the optical axis, to a point on the optical axis, where a projection of the maximum effective semi diameter of the image-side surface of the third lens ends; and TP3 is a central thickness of the third lens on the optical axis. Whereby, a location of the maximum effective semi diameter between two surfaces of the third lens could be controlled, which helps to correct the aberration of the peripheral view field of the optical image capturing system, and to maintain miniature.

The optical image capturing system satisfies 0<SGI311/(SGI311+TP3)≤0.9; 0<SGI321/(SGI321+TP3)≤0.9, and preferably satisfies 0.01<SGI311/(SGI311+TP3)≤0.7; 0.01<SGI321/(SGI321+TP3)≤0.7, where SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis.

The optical image capturing system of the present invention satisfies 0<SGI312/(SGI312+TP3)≤0.9; 0<SGI322/(SGI322+TP3)≤0.9, and it is preferable to satisfy 0.1≤SGI312/(SGI312+TP3)≤0.8; 0.1≤SGI322/(SGI322+TP3)≤0.8, where SGI312 is a displacement in parallel with the optical axis, from a point on the object-side surface of the third lens, through which the optical axis passes, to the inflection point on the object-side surface, which is the second closest to the optical axis, and SGI322 is a displacement in parallel with the optical axis, from a point on the image-side surface of the third lens, through which the optical axis passes, to the inflection point on the image-side surface, which is the second closest to the optical axis.

The optical image capturing system of the present invention satisfies 0.01≤HIF311/HOI≤0.9; 0.01≤HIF321/HOI≤0.9, and it is preferable to satisfy 0.09≤HIF311/HOI≤0.5; 0.09≤HIF321/HOI≤0.5, where HIF311 is a distance perpendicular to the optical axis between the inflection point on the object-side surface of the third lens, which is the closest to the optical axis, and the optical axis; HIF321 is a distance perpendicular to the optical axis between the inflection point on the image-side surface of the third lens, which is the closest to the optical axis, and the optical axis.

The optical image capturing system of the present invention satisfies 0.01≤HIF312/HOI≤0.9; 0.01≤HIF322/HOI≤0.9, and it is preferable to satisfy.09≤HIF312/HOI≤0.8; 0.09≤HIF322/HOI≤0.8, where HIF312 is a distance perpendicular to the optical axis between the inflection point on the object-side surface of the third lens, which is the second closest to the optical axis, and the optical axis; HIF322 is a distance perpendicular to the optical axis between the inflection point on the image-side surface of the third lens, which is the second closest to the optical axis, and the optical axis.

The optical image capturing system of the present invention satisfies 0.001 mm≤|HIF313|≤5 mm; 0.001 mm≤|HIF323|≤5 mm, and it is preferable to satisfy 0.1 mm≤|HIF323|≤3.5 mm; 0.1 mm≤|HIF313|≤3.5 mm, where HIF313 is a distance perpendicular to the optical axis between the inflection point on the object-side surface of the third lens, which is the third closest to the optical axis, and the optical axis; HIF323 is a distance perpendicular to the optical axis between the inflection point on the image-side surface of the third lens, which is the third closest to the optical axis, and the optical axis.

The optical image capturing system of the present invention satisfies 0.001 mm≤|HIF314|≤5 mm; 0.001 mm≤|HIF324|≤5 mm, and it is preferable to satisfy 0.1 mm≤|HIF3241|≤3.5 mm; 0.1 mm≤|HIF314|≤3.5 mm, where HIF314 is a distance perpendicular to the optical axis between the inflection point on the object-side surface of the third lens, which is the fourth closest to the optical axis, and the optical axis; HIF324 is a distance perpendicular to the optical axis between the inflection point on the image-side surface of the third lens, which is the fourth closest to the optical axis, and the optical axis.

In an embodiment, the lenses of high Abbe number and the lenses of low Abbe number are arranged in an interlaced arrangement that could be helpful for correction of aberration of the system.

An equation of aspheric surface is $$z = ch^2/[1+[1(k+1)c^2h^2]^{0.5}] + A4h^4 + A6h^6 + A8h^8 + A10h^{10} + A12h^{12} + A14h^{14} + A16h^{16} + A18h^{18} + A20h^{20} + \quad (1)$$

where z is a depression of the aspheric surface; k is conic constant; c is reciprocal of the radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of the refractive power of the system. In addition, the opposite surfaces (object-side surface and image-side surface) of the first to the third lenses could be aspheric that can obtain more control parameters to reduce aberration. The number of aspheric glass lenses could be less than the conventional spherical glass lenses, which is helpful for reduction of the height of the system.

When the lens has a convex surface, which means that the surface is convex around a position, through which the optical axis passes, and when the lens has a concave surface, which means that the surface is concave around a position, through which the optical axis passes.

In addition, the optical image capturing system of the present invention could be further provided with at least an stop as required, which could reduce stray light to improve the imaging quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor.

The optical image capturing system of the present invention could be applied in a dynamic focusing optical system. It is superior in the correction of aberration and high imaging quality so that it could be allied in lots of fields.

The optical image capturing system of the present invention could further include a driving module to meet different demands, wherein the driving module can be coupled with the lenses to move the lenses. The driving module can be a voice coil motor (VCM), which is used to move the lens for focusing, or can be an optical image stabilization (OIS) component, which is used to lower the possibility of having the problem of image blurring which is caused by subtle movements of the lens while shooting.

To meet different requirements, at least one lens among the first lens to the third lens of the optical image capturing system of the present invention can be a light filter, which filters out light of wavelength shorter than 500 nm. Such effect can be achieved by coating on at least one surface of the lens, or by using materials capable of filtering out short waves to make the lens.

To meet different requirements, the image plane of the optical image capturing system in the present invention can be either flat or curved. If the image plane is curved (e.g., a sphere with a radius of curvature), the incidence angle required for focusing light on the image plane can be decreased, which is not only helpful to shorten the length of the system (TTL), but also helpful to increase the relative illuminance.

We provide several embodiments in conjunction with the accompanying drawings for the best understanding, which are:

First Embodiment

Figure 1B:
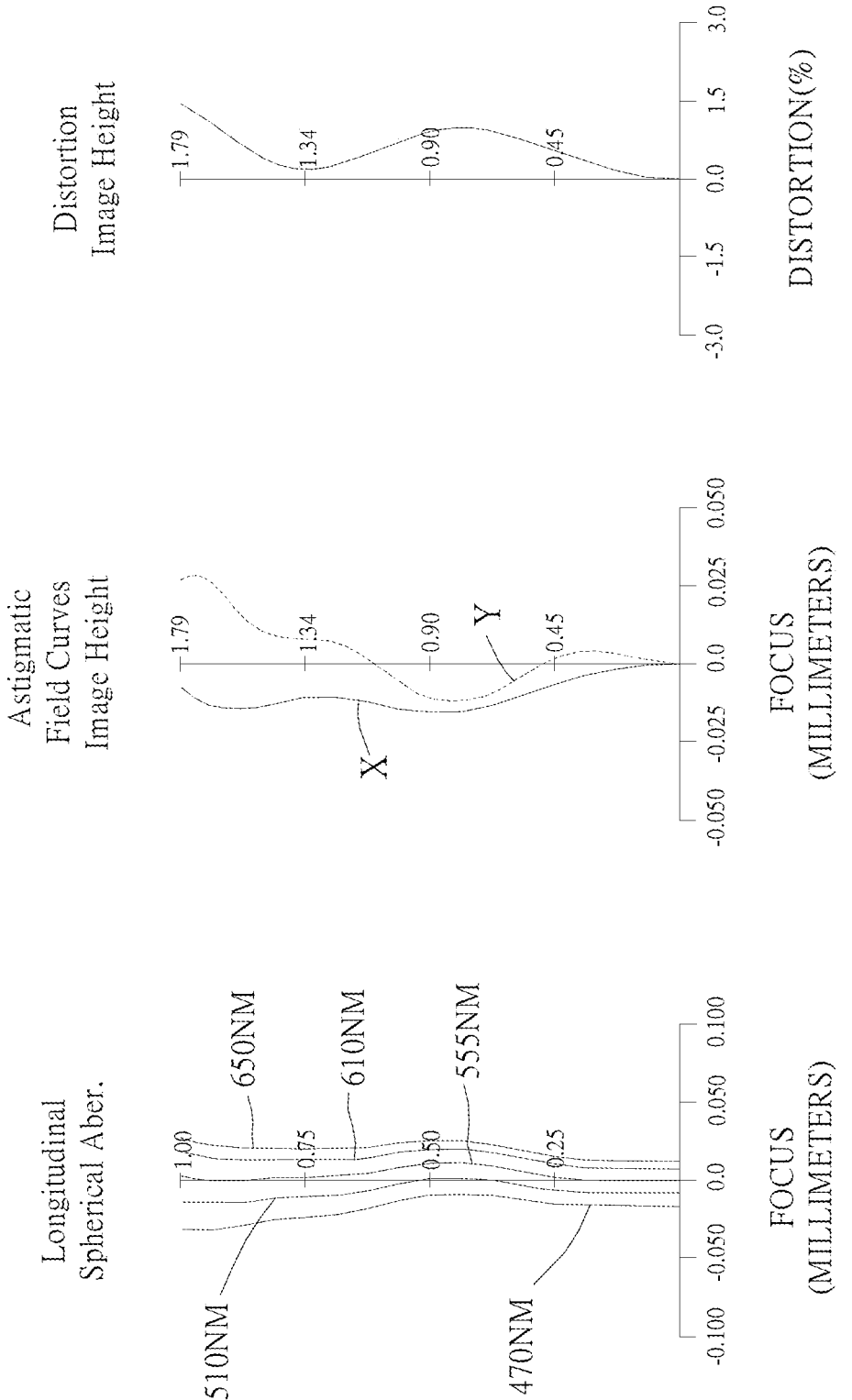
FIG. 1B shows curve diagrams of longitudinal spherical aberration, astigmatic field, and optical distortion of the optical image capturing system in the order from left to right of the first embodiment of the present application.
Figure 1C:
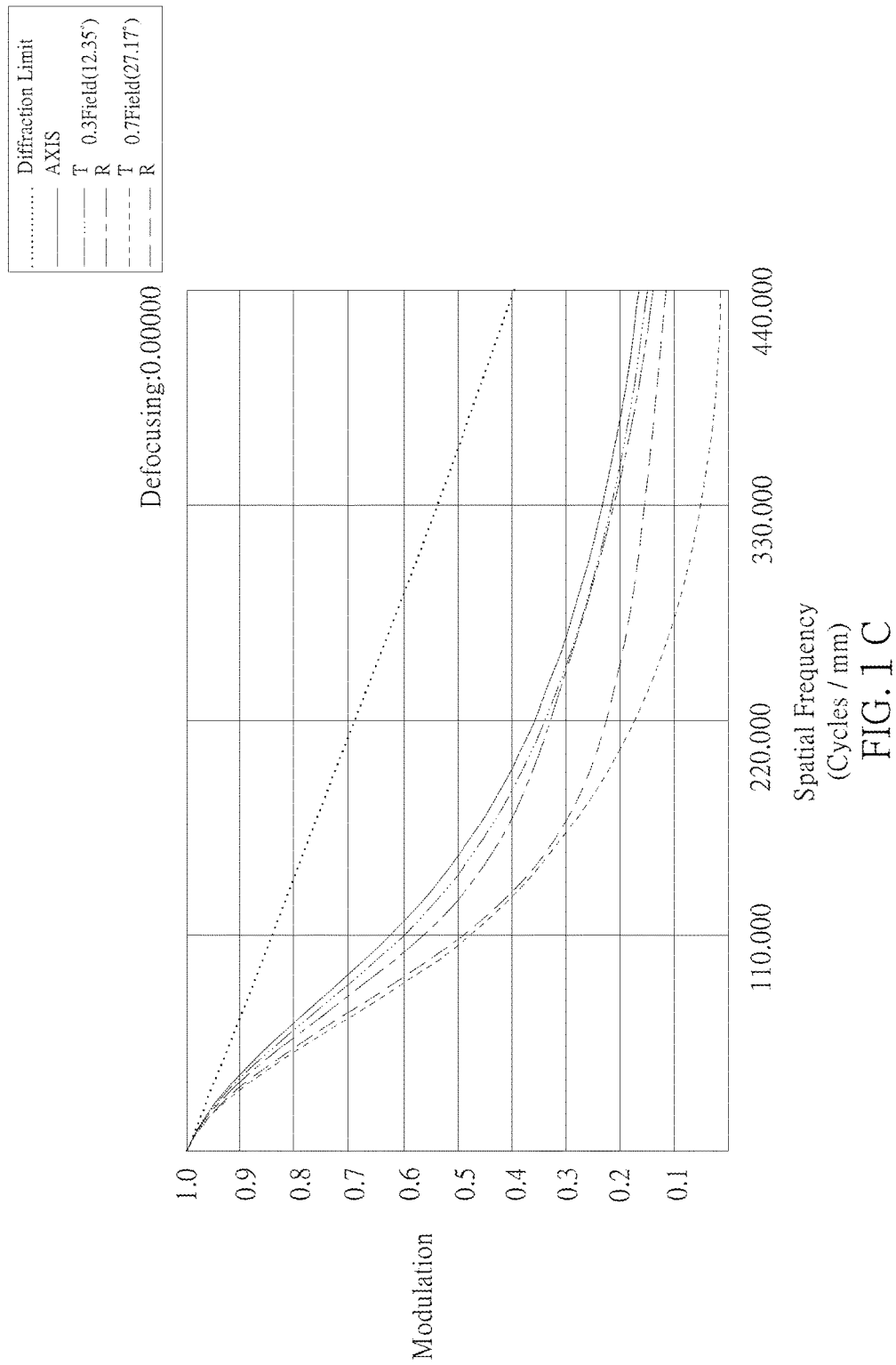
FIG. 1C shows a feature map of modulation transformation of the optical image capturing system of the first embodiment of the present application in visible spectrum.
Figure 1D:
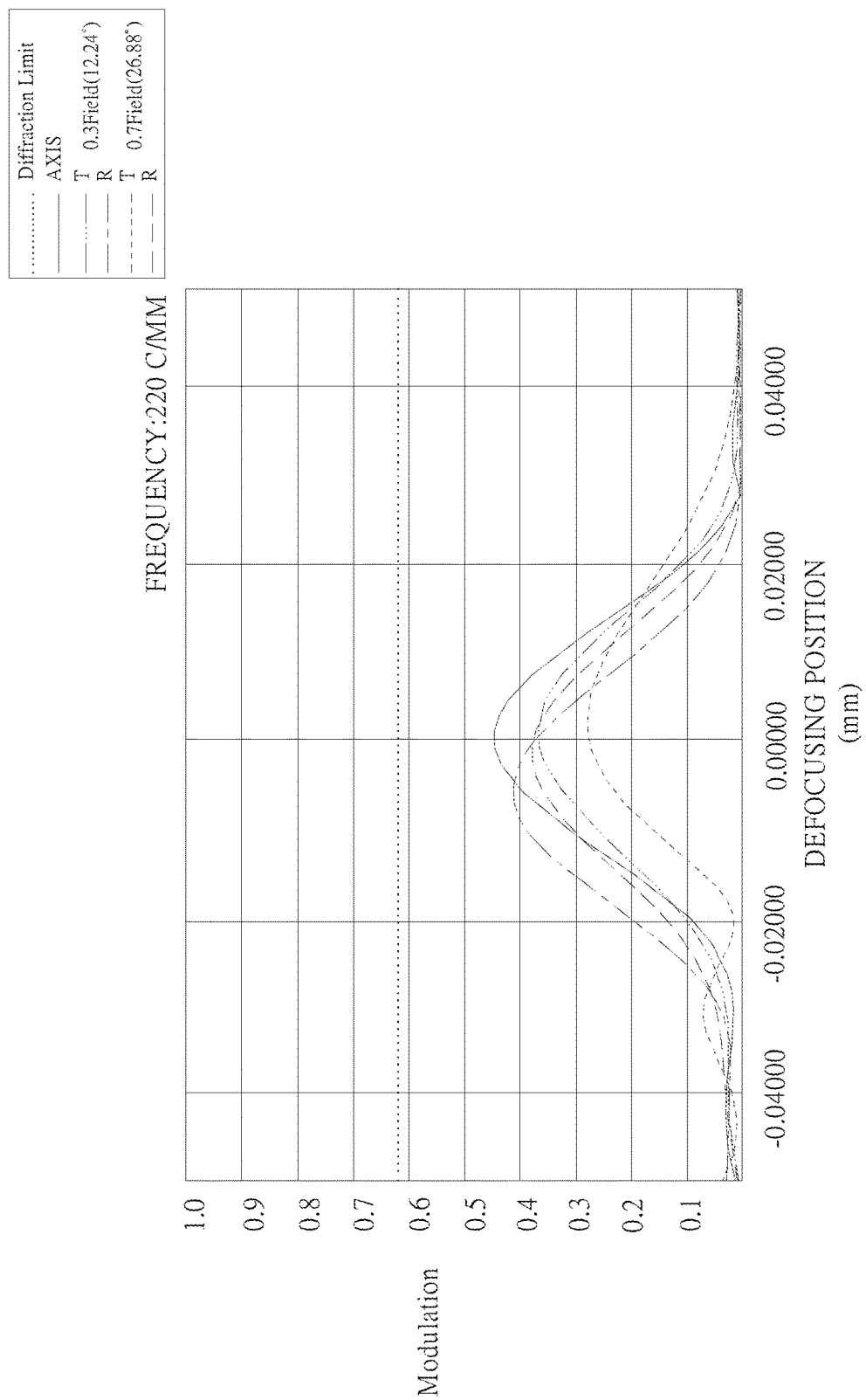
FIG. 1D is a diagram showing the through-focus MTF values of the visible light spectrum at the central field of view, 0.3 field of view, and 0.7 field of view of the first embodiment of the present invention.
Figure 1E:
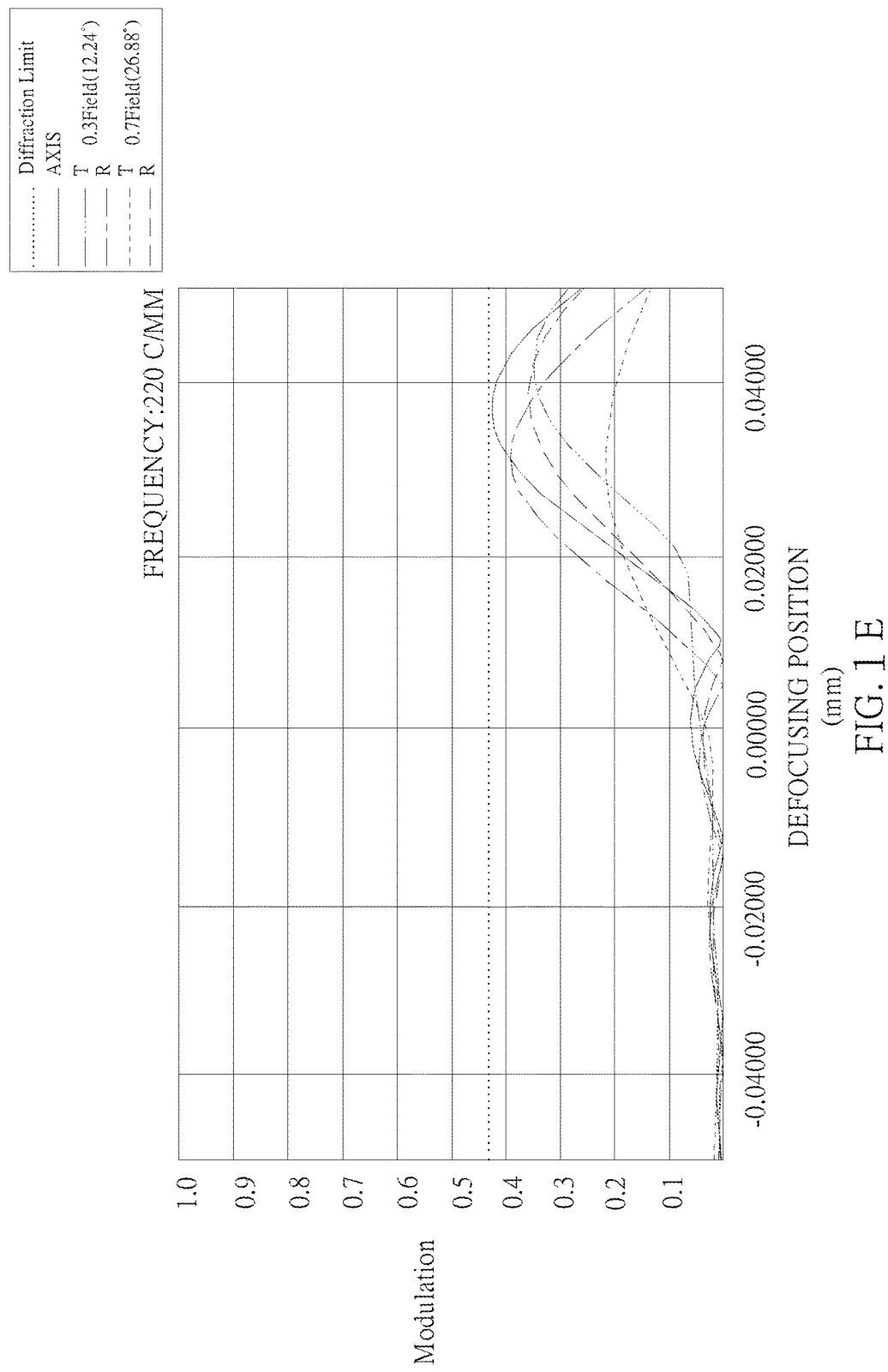
FIG. 1E is a diagram showing the through-focus MTF values of the infrared light spectrum at the central field of view, 0.3 field of view, and 0.7 field of view of the first embodiment of the present disclosure.

As shown in FIG. 1A and FIG. 1B, an optical image capturing system 10 of the first embodiment of the present invention includes, along an optical axis from an object side to an image side, a first lens 110, an aperture 100, a second lens 120, a third lens 130, an infrared rays filter 170, an image plane 180, and an image sensor 190. FIG. 1C shows a modulation transformation of the optical image capturing system 10 of the first embodiment of the present application. FIG. 1D is a diagram showing the through-focus MTF values of the visible light spectrum at the central field of view, 0.3 field of view, and 0.7 field of view of the first embodiment of the present invention. FIG. 1E is a diagram showing the through-focus MTF values of the infrared light spectrum at the central field of view, 0.3 field of view, and 0.7 field of view of the first embodiment of the present disclosure.

The first lens 110 has positive refractive power and is made of plastic. An object-side surface 112 thereof, which faces the object side, is a convex aspheric surface, and an image-side surface 114 thereof, which faces the image side, is a concave aspheric surface. A thickness of the first lens 110 on the optical axis is TP1, and a thickness of the first lens 110 at the height of a half of the entrance pupil diameter (HEP) is denoted by ETP1.

The second lens 120 has negative refractive power and is made of plastic. An object-side surface 122 thereof, which faces the object side, is a concave aspheric surface, and an image-side surface 124 thereof, which faces the image side, is a convex aspheric surface. The second lens satisfies the condition: SGI221=−0.1526 mm; |SGI221|/(|SGI221|+TP2)=0.2292, where SGI221 is a displacement in parallel with the optical axis from a point on the image-side surface of the second lens, through which the optical axis passes, to the inflection point on the image-side surface closest to the optical axis. A thickness of the second lens 120 on the optical axis is TP2, and thickness of the second lens 120 at the height of a half of the entrance pupil diameter (HEP) is denoted by ETP2.

The second lens satisfies HIF221=0.5606 mm; HIF221/HOI=0.3128, where a displacement perpendicular to the optical axis from a point on the image-side surface of the second lens, through which the optical axis passes, to the inflection point closest to the optical axis is denoted by HIF221.

The third lens 130 has positive refractive power and is made of plastic. An object-side surface 132, which faces the object side, is a convex aspheric surface, and an image-side surface 134, which faces the image side, is a concave aspheric surface. The object-side surface 132 has two inflection points, and the image-side surface 134 has an inflection point. The third lens 130 satisfies SGI311=0.0180 mm; SGI321=0.0331 mm; |SGI311|/(|SGI311|+|TP3)=0.0339; |SGI321|/(|SGI321|+TP3)=0.0605, where SGI311 is a displacement in parallel with the optical axis, from a point on the object-side surface of the third lens, through which the optical axis passes, to the inflection point on the object-side surface closest to the optical axis, and SGI321 is a displacement in parallel with the optical axis, from a point on the image-side surface of the third lens, through which the optical axis passes, to the inflection point on the image-side surface closest to the optical axis. A thickness of the third lens 130 on the optical axis is TP3, and a thickness of the third lens 130 at the height of a half of the entrance pupil diameter (HEP) is denoted by ETP3.

The third lens 130 satisfies SGI312=−0.0367 mm; |SGI312|/(|SGI312|+TP3)=0.0668, where SGI312 is a displacement in parallel with the optical axis, from a point on the object-side surface of the third lens, through which the optical axis passes, to the inflection point on the object-side surface second closest to the optical axis.

The third lens 130 further satisfies HIF312=0.8186 mm; HIF312/HOI=0.4568, where HIF321 is a distance perpendicular to the optical axis between the inflection point on the image-side surface of the third lens closest to the optical axis, and the optical axis.

A distance in parallel with the optical axis between a coordinate point at a height of ½ HEP on the object-side surface of the first lens 110 and the image plane is ETL, and a distance in parallel with the optical axis between the coordinate point at the height of ½ HEP on the object-side surface of the first lens 110 and a coordinate point at a height of ½ HEP on the image-side surface of the third lens 130 is EIN, which satisfy: ETL=2.776 mm; EIN=1.952 mm; EIN/ETL=0.703.

The optical image capturing system of the first embodiment satisfies: ETP1=0.430 mm; ETP2=0.370 mm; ETP3=0.586 mm. The sum of the aforementioned ETP1 to ETP3 is SETP, wherein SETP=1.385 mm. In addition, TP1=0.5132 mm; TP2=0.3363 mm; TP3=0.57 mm. The sum of the aforementioned TP1 to TP3 is STP, wherein STP=1.4194 mm; SETP/STP=0.97576.

In order to enhance the ability of correcting aberration and to lower the difficulty of manufacturing at the same time, the ratio between the thickness (ETP) at the height of a half of the entrance pupil diameter (HEP) and the thickness (TP) of any lens on the optical axis (i.e., ETP/TP) in the optical image capturing system of the first embodiment is particularly controlled, which satisfies: ETP1/TP1=0.837; ETP2/TP2=1.100; ETP3/TP3=1.027.

In order to enhance the ability of correcting aberration, lower the difficulty of manufacturing, and "slightly shortening" the length of the optical image capturing system at the same time, the ratio between the horizontal distance (ED) between two neighboring lenses at the height of a half of the entrance pupil diameter (HEP) and the parallel distance (IN) between these two neighboring lens on the optical axis (i.e., ED/IN) in the optical image capturing system of the first embodiment is particularly controlled, which satisfies: the horizontal distance between the first lens 110 and the second lens 120 at the height of a half of the entrance pupil diameter (HEP) is denoted by ED12, wherein ED12=0.223 mm; the horizontal distance between the second lens 120 and the third lens 130 at the height of a half of the entrance pupil diameter (HEP) is denoted by ED23, wherein ED23=0.344 mm. The sum of the aforementioned ED12 to ED23 is SED, wherein SED=0.567 mm.

The horizontal distance between the first lens 110 and the second lens 120 on the optical axis is denoted by IN12, wherein IN12=0.407 mm, and the ratio therebetween ED12/IN12=0.547. The horizontal distance between the second lens 120 and the third lens 130 on the optical axis is denoted by IN23, wherein IN23=0.214 mm, and the ratio therebetween ED23/IN23=1.612.

The horizontal distance in parallel with the optical axis between a coordinate point at the height of ½ HEP on the image-side surface of the third lens 130 and image surface is denoted by EBL, wherein EBL=0.823 mm. The horizontal distance in parallel with the optical axis between the point on the image-side surface of the third lens 130 where the optical axis passes through and the image plane is denoted by BL, wherein BL=0.871 mm. The optical image capturing system of the first embodiment satisfies: EBL/BL=0.9449. The horizontal distance in parallel with the optical axis between the coordinate point at the height of ½ HEP on the image-side surface of the third lens 130 and the infrared rays filter 190 is denoted by EIR, wherein EIR=0.063 mm. The horizontal distance in parallel with the optical axis between the point on the image-side surface of the third lens 130 where the optical axis passes through and the infrared rays filter 190 is denoted by PIR, wherein PIR=0.114 mm, and it satisfies: EIR/PIR=0.555.

The infrared rays filter 170 is made of glass and between the third lens 130 and the image plane 180. The infrared rays filter 190 gives no contribution to the focal length of the system.

The optical image capturing system 10 of the first embodiment has the following parameters, which are f=2.42952 mm; f/HEP=2.02; and HAF=35.87 degrees; and tan(HAF)=0.7231, where f is a focal length of the system; HAF is a half of the maximum field angle; and HEP is an entrance pupil diameter.

The parameters of the lenses of the first embodiment are f1=2.27233 mm; |f/f1|=1.0692; f3=7.0647 mm; f3; and |f1/f3|=0.3216, where f1 is a focal length of the first lens 110; and f3 is a focal length of the third lens 130.

The first embodiment further satisfies f2=−5.2251 mm; and |f2|>|f1|, where f2 is a focal length of the second lens 120, and f3 is a focal length of the third lens 130.

The optical image capturing system 10 of the first embodiment further satisfies ΣPPR=f/f1+f/f3=1.4131; ΣNPR=f/f2=0.4650; ΣPPR/|ΣNPR|=3.0391; |f/f3|=0.3439; |f1/f2|=0.4349; |f2/f3|=0.7396, where PPR is a ratio of a focal length f of the optical image capturing system to a focal length fp of each of the lenses with positive refractive power; and NPR is a ratio of a focal length fn of the optical image capturing system to a focal length fn of each of lenses with negative refractive power.

The optical image capturing system 10 of the first embodiment further satisfies InTL+InB=HOS; HOS=2.9110 mm; HOI=1.792 mm; HOS/HOI=1.6244; HOS/f=1.1982; InTL/HOS=0.7008; InS=2.25447 mm; and InS/HOS=0.7745, where InTL is a distance between the object-side surface 112 of the first lens 110 and the image-side surface 134 of the third lens 130; HOS is a height of the image capturing system, i.e. a distance between the object-side surface 112 of the first lens 110 and the image plane 180; InS is a distance between the aperture 100 and the image plane 180; HOI is a half of a diagonal of an effective sensing area of the image sensor 190, i.e., the maximum image height; and InB is a distance between the image-side surface 134 of the third lens 130 and the image plane 180.

The optical image capturing system 10 of the first embodiment further satisfies ΣTP=1.4198 mm; and ΣTP/InTL=0.6959, where ETP is a sum of the thicknesses of the lenses 110-130 with refractive power. It is helpful for the contrast of image and yield rate of manufacture and provides a suitable back focal length for installation of other elements.

The optical image capturing system 10 of the first embodiment further satisfies |R1/R2|=0.3849, where R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system 10 of the first embodiment further satisfies (R5−R6)/(R5+R6)=−0.0899, where R5 is a radius of curvature of the object-side surface 132 of the third lens 130, and R6 is a radius of curvature of the image-side surface 134 of the third lens 130. It may modify the astigmatic field curvature.

The optical image capturing system 10 of the first embodiment further satisfies ΣPP=f1+f3=9.3370 mm; and f1/(f1+f3)=0.2434, where f1, f3 are the focal lengths of the first lens and the third lens, and ΣPP is a sum of the focal lengths fp of each lens with positive refractive power. It is helpful to share the positive refractive power of the first lens 110 to the other positive lens to avoid the significant aberration caused by the incident rays.

The optical image capturing system 10 of the first embodiment further satisfies ΣNP=f2=−5.2251 mm, where f2 is the focal length of the second lens, and ENP is a sum of the focal lengths fn of each lens with negative refractive power. It is helpful to avoid the significant aberration caused by the incident rays.

The optical image capturing system 10 of the first embodiment further satisfies IN12=0.4068 mm; IN12/f=0.1674, where IN12 is a distance on the optical axis between the first lens 110 and the second lens 120. It may correct chromatic aberration and improve the performance.

The optical image capturing system 10 of the first embodiment further satisfies TP1=0.5132 mm; TP2=0.3363 mm; and (TP1+IN12)/TP2=2.7359, where TP1 is a central thickness of the first lens 110 on the optical axis, and TP2 is a central thickness of the second lens 120 on the optical axis. It may control the sensitivity of manufacture of the system and improve the performance.

The optical image capturing system 10 of the first embodiment further satisfies (TP3+IN23)/TP2=2.3308, where IN23 is a distance on the optical axis between the second lens 120 and the third lens 130. It may control the sensitivity of manufacture of the system and lower the total height of the system.

The optical image capturing system 10 of the first embodiment further satisfies TP2/(IN12+TP2+IN23)=0.35154; TP1/TP2=1.52615; TP2/TP3=0.58966. It may fine tune and correct the aberration of the incident rays layer by layer, and reduce the height of the system.

The optical image capturing system 10 of the first embodiment further satisfies TP2/ΣTP=0.2369, where ΣTP is a sum of thicknesses of the first lens 110 to the third lens 130 on the optical axis. It may fine tune and correct the aberration of the incident rays, and reduce the height of the system.

The optical image capturing system 10 of the first embodiment further satisfies InRS31=−0.1097 mm; InRS32−0.3195 mm; |InRS31|+|InRS32|=0.42922 mm; |InRS31|/TP3=0.1923; and |InRS32|/TP3=0.5603, where InRS31 is a displacement from a point on the object-side surface 132 of the third lens passed through by the optical axis to a point on the optical axis where a projection of the maximum effective semi diameter of the object-side surface 132 of the third lens ends; InRS32 is a displacement from a point on the image-side surface 134 of the third lens passed through by the optical axis to a point on the optical axis where a projection of the maximum effective semi diameter of the image-side surface 134 of the third lens ends; and TP3 is a central thickness of the third lens 130 on the optical axis. It is helpful for manufacturing and shaping of the lenses and is helpful to reduce the size.

The optical image capturing system 10 of the first embodiment further satisfies HVT31=0.4455 mm; HVT32=0.6479 mm; HVT31/HVT32=0.6876, where HVT31 a distance perpendicular to the optical axis between the critical point C31 on the object-side surface 132 of the third lens and the optical axis; and HVT32 a distance perpendicular to the optical axis between the critical point C32 on the image-side surface 134 of the third lens and the optical axis. Whereby, it is helpful to correct the off-axis view field aberration.

The optical image capturing system 10 of the first embodiment satisfies HVT32/HOI=0.3616. It is helpful for correction of the aberration of the peripheral view field of the optical image capturing system.

The optical image capturing system 10 of the first embodiment satisfies HVT32/HOS=0.2226. It is helpful for correction of the aberration of the peripheral view field of the optical image capturing system.

The second lens 120 and the third lens 130 have negative refractive power. The optical image capturing system 10 of the first embodiment further satisfies |NA1−NA2|=33.5951; NA3/NA2=2.4969, where NA1 is an Abbe number of the first lens 110; NA2 is an Abbe number of the second lens 120; and NA3 is an Abbe number of the third lens 130. It may correct the aberration of the optical image capturing system.

The optical image capturing system 10 of the first embodiment further satisfies |TDT|=1.2939%; |ODT|=1.4381%, where TDT is TV distortion; and ODT is optical distortion.

In the present embodiment, the lights of any field of view can be further divided into sagittal ray and tangential ray, and the spatial frequency of 220 cycles/mm serves as the benchmark for assessing the focus shifts and the values of MTF. The focus shifts where the through-focus MTF values of the visible sagittal ray at the central field of view, 0.3 field of view, and 0.7 field of view of the optical image capturing system are at their respective maxima are denoted by VSFS0, VSFS3, and VSFS7 (unit of measurement: mm), respectively. The values of VSFS0, VSFS3, and VSFS7 equal to 0.005 mm, −0.005 mm, and 0.005 mm, respectively. The maximum values of the through-focus MTF of the visible sagittal ray at the central field of view, 0.3 field of view, and 0.7 field of view are denoted by VSMTF0, VSMTF3, and VSMTF7, respectively. The values of VSMTF0, VSMTF3, and VSMTF7 equal to 0.441, 0.402, and 0.309, respectively. The focus shifts where the through-focus MTF values of the visible tangential ray at the central field of view, 0.3 field of view, and 0.7 field of view of the optical image capturing system are at their respective maxima, are denoted by VTFS0, VTFS3, and VTFS7 (unit of measurement: mm), respectively. The values of VTFS0, VTFS3, and VTFS7 equal to 0.005 mm, −0.005 mm, and −0.000 mm, respectively. The maximum values of the through-focus MTF of the visible tangential ray at the central field of view, 0.3 field of view, and 0.7 field of view are denoted by VTMTF0, VTMTF3, and VTMTF7, respectively. The values of VTMTF0, VTMTF3, and VTMTF7 equal to 0.441, 0.369, and 0.239, respectively. The average focus shift (position) of both the aforementioned focus shifts of the visible sagittal ray at three fields of view and focus shifts of the visible tangential ray at three fields of view is denoted by AVFS (unit of measurement: mm), which satisfies the absolute value |(VSFS0+VSFS3+VSFS7+VTFS0+VTFS3+VTFS7)/6|=10.001 mm|.

The focus shifts where the through-focus MTF values of the infrared sagittal ray at the central field of view, 0.3 field of view, and 0.7 field of view of the optical image capturing system are at their respective maxima, are denoted by ISFS0, ISFS3, and ISFS7 (unit of measurement: mm), respectively. The values of ISFS0, ISFS3, and ISFS7 equal to 0.04 mm, 0.03 mm, and 0.04 mm, respectively. The average focus shift (position) of the aforementioned focus shifts of the infrared sagittal ray at three fields of view is denoted by AISFS (unit of measurement: mm). The maximum values of the through-focus MTF of the infrared sagittal ray at the central field of view, 0.3 field of view, and 0.7 field of view are denoted by ISMTF0, ISMTF3, and ISMTF7, respectively. The values of ISMTF0, ISMTF3, and ISMTF7 equal to 0.485, 0.441, and 0.388, respectively. The focus shifts where the through-focus MTF values of the infrared tangential ray at the central field of view, 0.3 field of view, and 0.7 field of view of the optical image capturing system are at their respective maxima, are denoted by ITFS0, ITFS3, and ITFS7 (unit of measurement: mm), respectively. The values of ITFS0, ITFS3, and ITFS7 equal to 0.04, 0.045, and 0.04, respectively. The average focus shift (position) of the aforementioned focus shifts of the infrared tangential ray at three fields of view is denoted by AITFS (unit of measurement: mm). The maximum values of the through-focus MTF of the infrared tangential ray at the central field of view, 0.3 field of view, and 0.7 field of view are denoted by ITMTF0, ITMTF3, and ITMTF7, respectively. The values of ITMTF0, ITMTF3, and ITMTF7 equal to 0.485, 0.396, and 0.273, respectively. The average focus shift (position) of both of the aforementioned focus shifts of the infrared sagittal ray at the three fields of view and focus shifts of the infrared tangential ray at the three fields of view is denoted by AIFS (unit of measurement: mm), which equals to the absolute value of |(ISFS0+ISFS3+ISFS7+ITFS0+ITFS3+ITFS7)/6|=|0.039 mm|.

The focus shift (difference) between the focal points of the visible light and the infrared light at their central fields of view (RGB/IR) of the entire optical image capturing system (i.e. wavelength of 850 nm versus wavelength of 555 nm, unit of measurement: mm) is denoted by FS, which satisfies the absolute value |(VSFS0+VTFS0)/2−(ISFS0+ITFS0)/2|=|0.035 mm|. The difference (focus shift) between the average focus shift of the visible light in the three fields of view and the average focus shift of the infrared light in the three fields of view (RGB/IR) of the entire optical image capturing system is denoted by AFS (i.e. wavelength of 850 nm versus wavelength of 555 nm, unit of measurement: mm), for which the absolute value of |AIFS−AVFS|=|0.038 mm| is satisfied.

For the optical image capturing system of the first embodiment, the values of MTF in the spatial frequency of 55 cycles/mm at the optical axis, 0.3 field of view, and 0.7 field of view on an image plane for visible light are respectively denoted by MTFE0, MTFE3, and MTFE7, wherein MTFE0 is around 0.86, MTFE3 is around 0.84, and MTFE7 is around 0.77; the values of MTF in the spatial frequency of 110 cycles/mm at the optical axis, 0.3 field of view, and 0.7 field of view on an image plane for visible light are respectively denoted by MTFQ0, MTFQ3, and MTFQ7, wherein MTFQ0 is around 0.63, MTFQ3 is around 0.6, and MTFQ7 is around 0.48; the values of modulation transfer function (MTF) in the half spatial frequency at the optical axis, 0.3 field of view, and 0.7 field of view on an image plane for visible light are respectively denoted by MTFH0, MTFH3, and MTFH7, wherein MTFH0 is around 0.36, MTFH3 is around 0.35, and MTFH7 is around 0.175.

The parameters of the lenses of the first embodiment are listed in Table 1 and Table 2.

TABLE 1 f = 2.42952 mm; f/HEP = 2.02; HAF = 35.87 deg; tan(HAF) = 0.7231

| Surface | | Radius of curvature (mm) | Thickness (mm) | Material | Refractive index | Abbe number | Focal length (mm) |
|---|---|---|---|---|---|---|---|
| 0 | Object | plane | 600 | | | | |
| 1 | 1st lens | 0.848804821 | 0.513 | plastic | 1.535 | 56.070 | 2.273 |
| 2 | | 2.205401548 | 0.143 | | | | |
| 3 | Aperture | plane | 0.263 | | | | |
| 4 | 2nd lens | −1.208297825 | 0.336 | plastic | 1.643 | 22.470 | −5.225 |
| 5 | | −2.08494476 | 0.214 | | | | |
| 6 | 3rd lens | 1.177958479 | 0.570 | plastic | 1.544 | 56.090 | 7.012 |
| 7 | | 1.410696843 | 0.114 | | | | |
| 8 | Infrared rays filter | plane | 0.210 | BK7_SCHOTT | | | |
| 9 | | plane | 0.550 | | | | |
| 10 | Image plane | plane | 0.000 | | | | |

Reference wavelength: 555 nm; the position of blocking light: the clear aperture of the first surface is 0.640 mm.

TABLE 2

Coefficients of the aspheric surfaces

| | Surface | | | | | |
|---|---|---|---|---|---|---|
| | 1 | 2 | 4 | 5 | 6 | 7 |
| k | 1.22106E−01 | 1.45448E+01 | 8.53809E−01 | 4.48992E−01 | −1.44104E+01 | −3.61090E+00 |
| A4 | −6.43320E−04 | −9.87186E−02 | −7.81909E−01 | −1.69310E+00 | −7.90920E−01 | −5.19895E−01 |
| A6 | −2.58026E−02 | 2.63247E+00 | −8.49939E−01 | 5.85139E+00 | 4.98290E−01 | 4.24519E−01 |
| A8 | 1.00186E+00 | −5.88099E+01 | 3.03407E+01 | −1.67037E+01 | 2.93540E−01 | −3.12444E−01 |
| A10 | −4.23805E+00 | 5.75648E+02 | −3.11976E+02 | 2.77661E+01 | −3.15288E−01 | 1.42703E−01 |
| A12 | 9.91922E+00 | −3.00096E+03 | 1.45641E+03 | −5.46620E+00 | −9.66930E−02 | −2.76209E−02 |
| A14 | −1.17917E+01 | 7.91934E+03 | −2.89774E+03 | −2.59816E+01 | 1.67006E−01 | −3.11872E−03 |
| A16 | 8.87410E+00 | −8.51578E+03 | 1.35594E+03 | 1.43091E+01 | −4.43712E−02 | 1.34499E−03 |
| A18 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

The detail parameters of the first embodiment are listed in Table 1, in which the unit of the radius of curvature, thickness, and focal length are millimeter, and surface 0-10 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

Second Embodiment

Figure 2A:
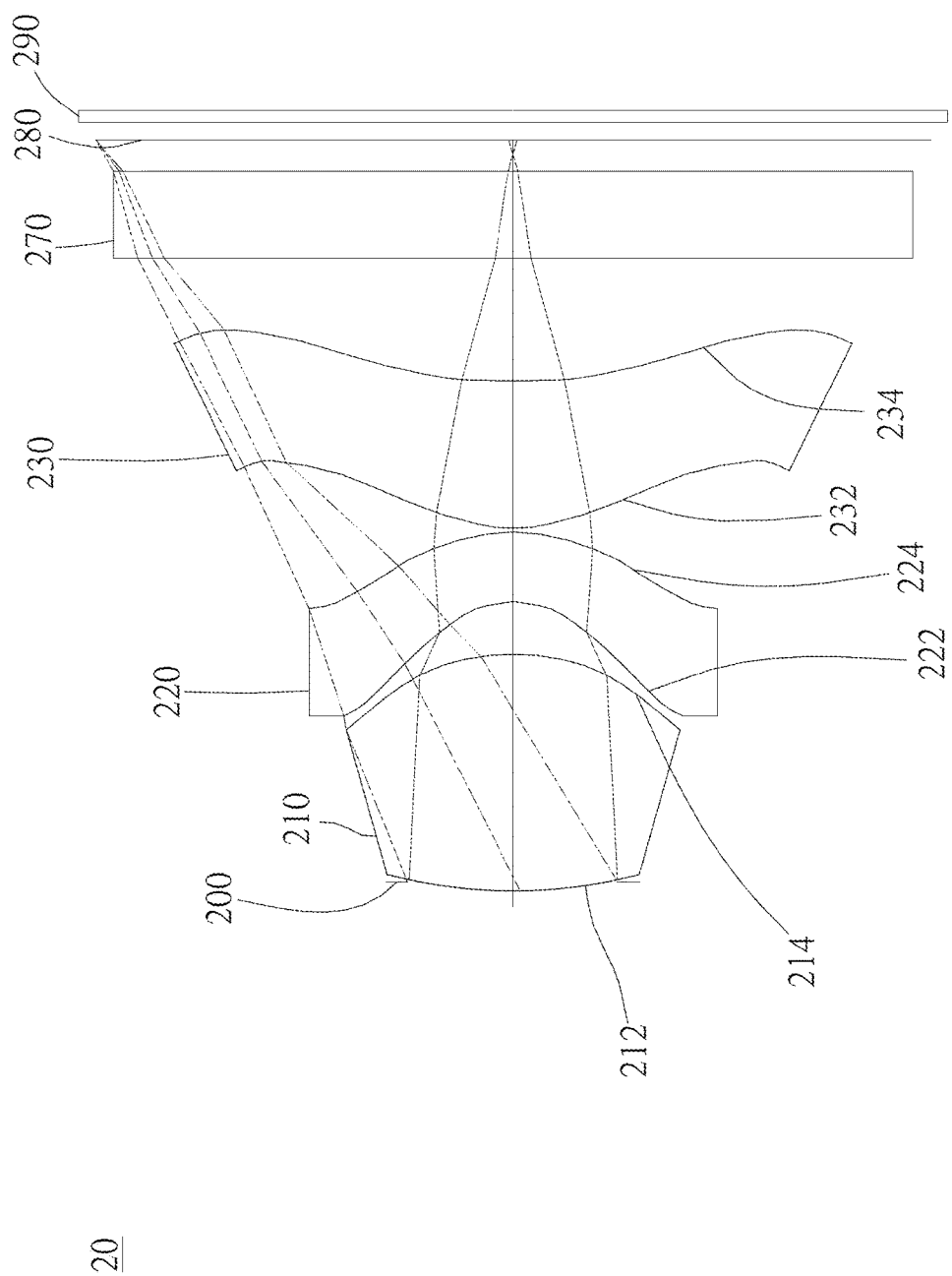
FIG. 2A is a schematic diagram of a second embodiment of the present invention.
Figure 2B:
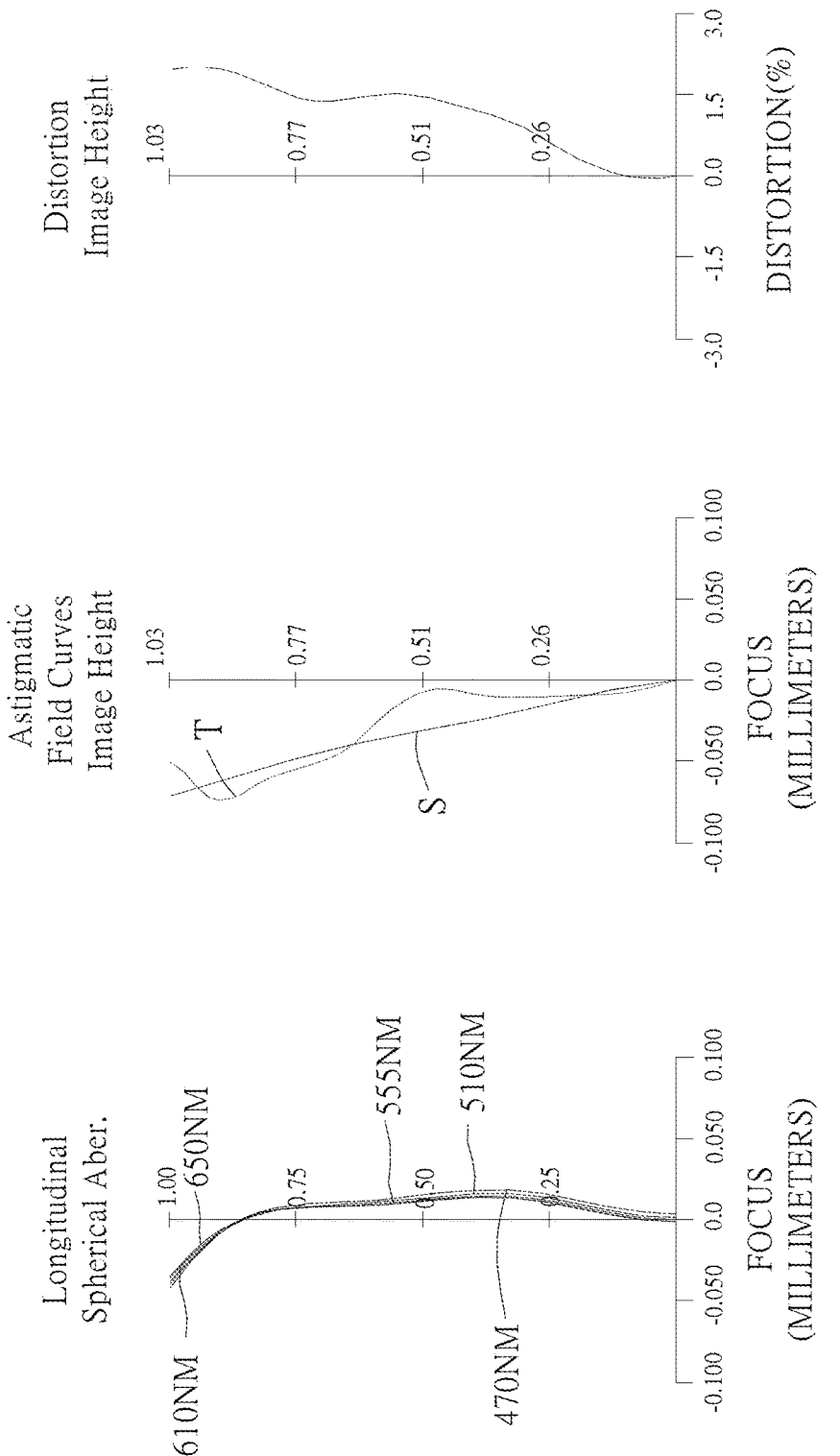
FIG. 2B shows curve diagrams of longitudinal spherical aberration, astigmatic field, and optical distortion of the optical image capturing system in the order from left to right of the second embodiment of the present application.
Figure 2C:
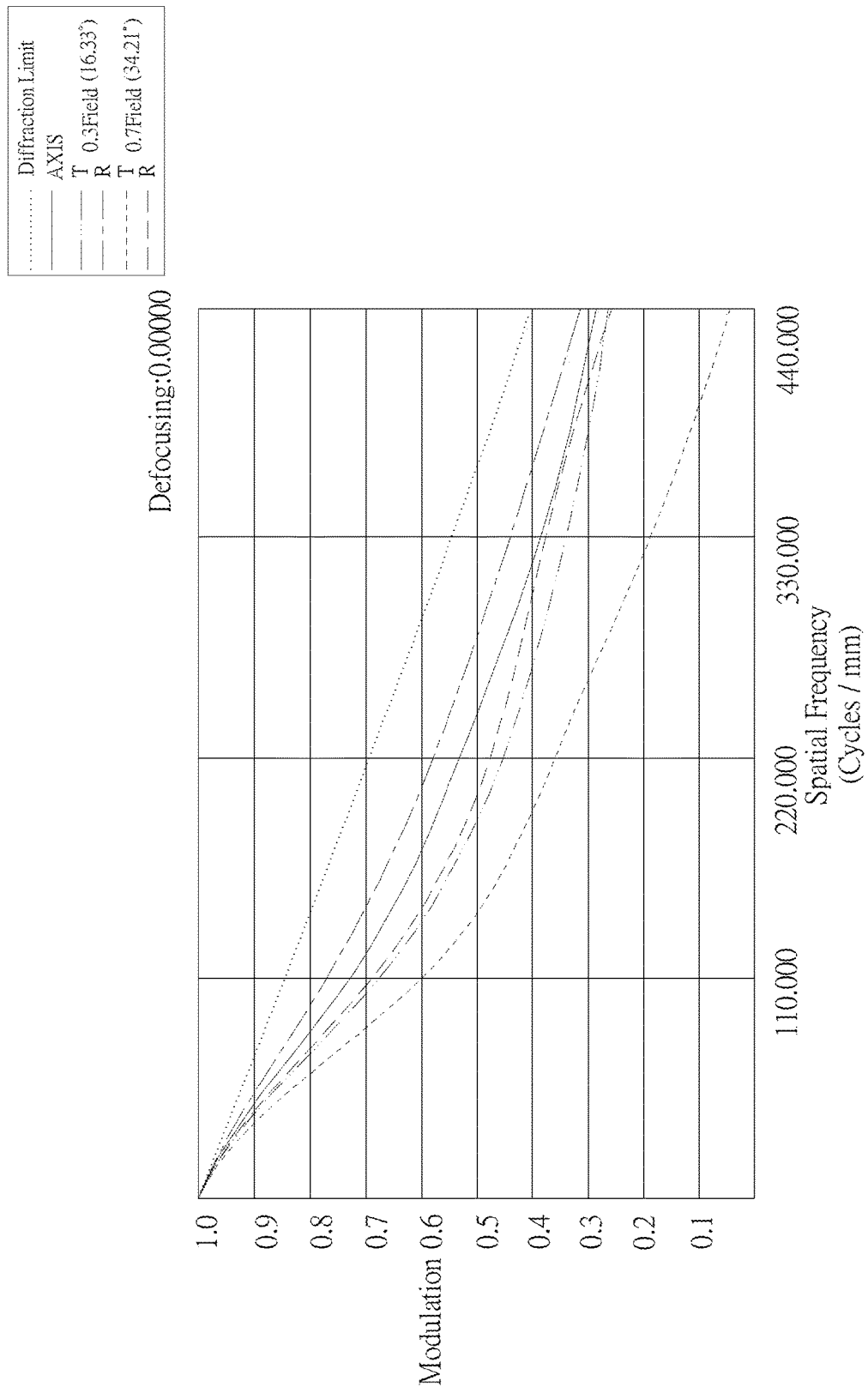
FIG. 2C shows a feature map of modulation transformation of the optical image capturing system of the second embodiment of the present application in visible spectrum.
Figure 2D:
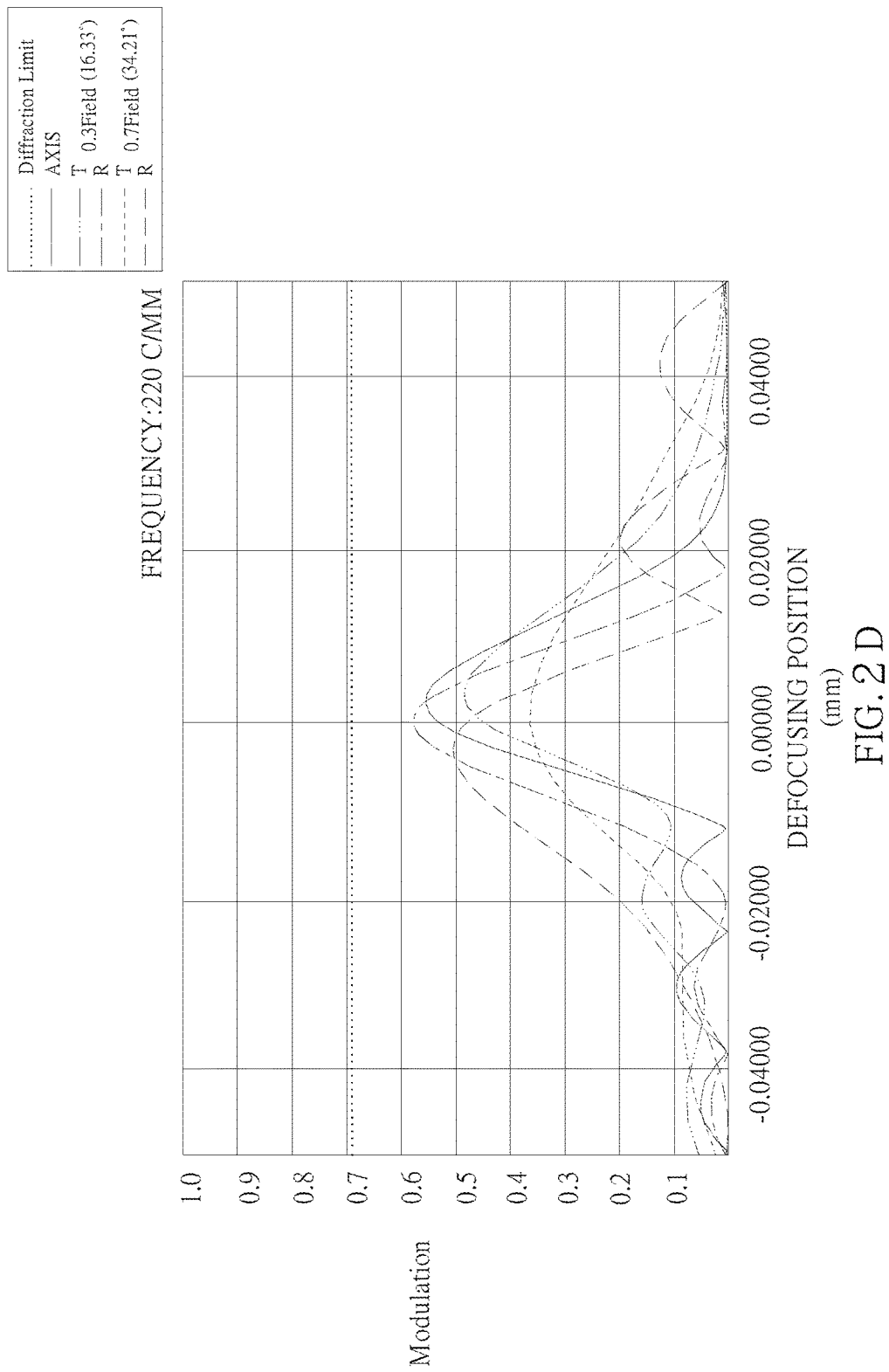
FIG. 2D is a diagram showing the through-focus MTF values of the visible light spectrum at the central field of view, 0.3 field of view, and 0.7 field of view of the first embodiment of the present invention.
Figure 2E:
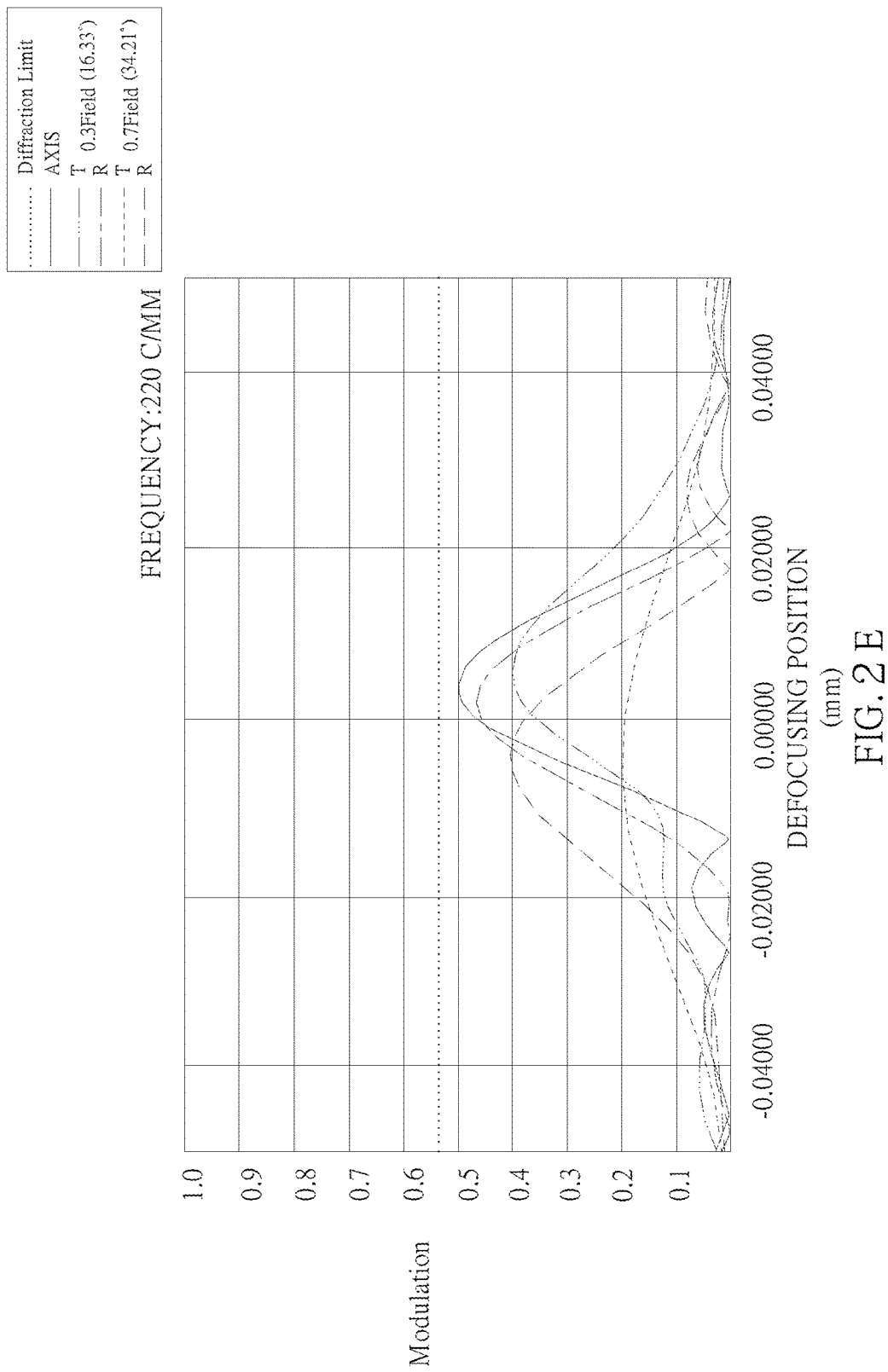
FIG. 2E is a diagram showing the through-focus MTF values of the infrared light spectrum at the central field of view, 0.3 field of view, and 0.7 field of view of the first embodiment of the present disclosure.

As shown in FIG. 2A and FIG. 2B, an optical image capturing system 20 of the second embodiment of the present invention includes, along an optical axis from an object side to an image side, an aperture 200, a first lens 210, a second lens 220, a third lens 230, an infrared rays filter 270, an image plane 280, and an image sensor 290. FIG. 2C shows a modulation transformation of the optical image capturing system 20 of the second embodiment of the present application. FIG. 2D is a diagram showing the through-focus MTF values of the visible light spectrum at the central field of view, 0.3 field of view, and 0.7 field of view of the second embodiment of the present invention. FIG. 2E is a diagram showing the through-focus MTF values of the infrared light spectrum at the central field of view, 0.3 field of view, and 0.7 field of view of the second embodiment of the present disclosure.

The first lens 210 has positive refractive power and is made of plastic. An object-side surface 212 thereof, which faces the object side, is a convex aspheric surface, and an image-side surface 214 thereof, which faces the image side, is a convex aspheric surface. The object-side surface 212 has an inflection point, and the image-side surface 214 has two inflection points.

The second lens 220 has negative refractive power and is made of plastic. An object-side surface 222 thereof, which faces the object side, is a concave aspheric surface, and an image-side surface 224 thereof, which faces the image side, is a convex aspheric surface. The object-side surface 222 has two inflection points, and image-side surface 224 has an inflection point.

The third lens 230 has positive refractive power and is made of plastic. An object-side surface 232, which faces the object side, is a convex aspheric surface, and an image-side surface 234, which faces the image side, is a concave aspheric surface. The object-side surface 232 and the image-side surface 234 both have an inflection point.

The infrared rays filter 270 is made of glass and between the third lens 230 and the image plane 280. The infrared rays filter 270 gives no contribution to the focal length of the system.

The parameters of the lenses of the second embodiment are listed in Table 3 and Table 4.

TABLE 3 f = 1.03917 mm; f/HEP = 2.0, HAF = 44.0043 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 600 | | | | |
| 1 | Aperture | 1E+18 | −0.020 | | | | |
| 2 | 1st lens | 1.124000217 | 0.583 | plastic | 1.545 | 55.99 | 0.783 |
| 3 | | −0.564078465 | 0.130 | | | | |
| 4 | | 1E+18 | 0.000 | | | | |
| 5 | 2nd lens | −0.190562349 | 0.170 | plastic | 1.643 | 22.47 | −0.593 |
| 6 | | −0.510560702 | 0.010 | | | | |
| 7 | 3rd lens | 0.386375111 | 0.364 | plastic | 1.545 | 55.99 | 0.788 |
| 8 | | 2.526116279 | 0.304 | | | | |
| 9 | Infrared rays filter | 1E+18 | 0.210 | BK7_SCHOTT | 1.517 | 64.13 | |
| 10 | | 1E+18 | 0.080 | | | | |
| 11 | Image plane | 1E+18 | 0.000 | | | | |

Reference wavelength: 555 nm; the position of blocking light: the clear aperture of the sixth surface is 0.506 mm.

TABLE 4

Coefficients of the aspheric surfaces

| | Surface | | | | | |
|---|---|---|---|---|---|---|
| | 2 | 3 | 5 | 6 | 7 | 8 |
| k | −3.335885E+00 | −3.347157E−01 | −8.598583E−01 | −7.027462E−01 | −5.260295E+00 | 6.802171E+00 |
| A4 | −2.592273E+00 | −2.298773E+00 | 1.955454E+01 | 1.808357E−01 | 2.088381E−01 | 3.223520E+00 |
| A6 | 1.313962E+02 | 6.657401E+01 | −3.527743E+02 | −8.874732E+00 | 1.268189E+00 | −2.103722E+01 |
| A8 | −3.663169E+03 | −2.260529E+03 | 3.995737E+03 | −1.601337E+02 | −5.503054E+01 | 6.450623E+01 |
| A10 | 4.845574E+04 | 3.343295E+04 | −1.605944E+04 | 4.016297E+03 | 3.531187E+02 | −1.152514E+02 |
| A12 | −2.131092E+05 | −2.490329E+05 | −2.782363E+04 | −2.581260E+04 | −1.080747E+03 | 1.162936E+02 |
| A14 | −1.331595E+06 | 9.590514E+05 | 4.174622E+05 | 7.090158E+04 | 1.660273E+03 | −5.841831E+01 |
| A16 | 1.191308E+07 | −1.529052E+06 | −9.334629E+05 | −7.324544E+04 | −1.038118E+03 | 9.383938E+00 |

An equation of the aspheric surfaces of the second embodiment is the same as that of the first embodiment, and the definitions are the same as well.

The exact parameters of the second embodiment based on Table 3 and Table 4 are listed in the following table:

| Second embodiment | | | | | |
|---|---|---|---|---|---|
| MTFQ0 | MTFQ3 | MTFQ7 | MTFH0 | MTFH3 | MTFH7 |
| 0.73 | 0.68 | 0.6 | 0.53 | 0.45 | 0.35 |
| ETP1 | ETP2 | ETP3 | ETP1/TP1 | ETP2/TP2 | ETP3/TP3 |
| 0.486 | 0.251 | 0.322 | 0.834 | 1.475 | 0.885 |
| ETL | EBL | EIN | EIR | PIR | SETP |
| 1.824 | 0.571 | 1.254 | 0.281 | 0.304 | 1.059 |
| EIN/ETL | SETP/EIN | EIR/PIR | EBL/BL | BL | STP |
| 0.687 | 0.845 | 0.924 | 0.9614 | 0.5939 | 1.117 |
| ED12 | ED23 | ED12/IN12 | ED23/IN23 | SED | SETP/STP |
| 0.050 | 0.144 | 0.386 | 14.431 | 0.194 | 0.948 |
| \|f/f1\| | \|f/f2\| | \|f/f3\| | \|f1/f2\| | \|f2/f3\| | TP1/TP2 |
| 1.32705 | 1.75127 | 1.31932 | 0.75776 | 1.32740 | 3.42862 |

| Second embodiment | | | | | |
|---|---|---|---|---|---|
| ΣPPR | ΣNPR | ΣPPR/\|ΣNPR\| | IN12/f | IN23/f | TP2/TP3 |
| 2.64638 | 1.75127 | 1.51112 | 0.12469 | 0.00962 | 0.46688 |
| TP2/(IN12 + TP2 + IN23) | | (TP1 + IN12)/TP2 | | (TP3 + IN23)/TP2 | |
| 0.54913 | | 2.20071 | | 2.20071 | |
| HOS | InTL | HOS/HOI | InS/HOS | \|ODT\| % | \|TDT\| % |
| 1.85044 | 1.25657 | 1.80004 | 0.98919 | 2.05766 | 0.65399 |
| HVT21 | HVT22 | HVT31 | HVT32 | HVT32/HOI | HVT32/HOS |
| 0.00000 | 0.00000 | 0.59857 | 0.70842 | 0.68912 | 0.38284 |
| VSFS0 | VSFS3 | VSFS7 | VTFS0 | VTFS3 | VTFS7 |
| 0.003 | 0.000 | −0.003 | 0.003 | 0.003 | 0.000 |
| VSMTF0 | VSMTF3 | VSMTF7 | VTMTF0 | VTMTF3 | VTMTF7 |
| 0.555 | 0.577 | 0.503 | 0.555 | 0.477 | 0.363 |
| ISFS0 | ISFS3 | ISFS7 | ITFS0 | ITFS3 | ITFS7 |
| 0.003 | 0.003 | −0.005 | 0.003 | 0.005 | −0.005 |
| ISMTF0 | ISMTF3 | ISMTF7 | ITMTF0 | ITMTF3 | ITMTF7 |
| 0.499 | 0.471 | 0.408 | 0.499 | 0.404 | 0.199 |
| FS | AIFS | AVFS | AFS | | |
| 0.000 | 0.000 | 0.001 | 0.000 | | |

(Reference wavelength: 555 nm)

The results of the equations of the second embodiment based on Table 3 and Table 4 are listed in the following table:

| Values related to the inflection points of the second embodiment (Reference wavelength: 555 nm) | | | | | | | |
|---|---|---|---|---|---|---|---|
| HIF111 | 0.2542 | HIF111/HOI | 0.2473 | SGI111 | 0.0251 | \|SGI111\|/(\|SGI111\| + TP1) | 0.0413 |
| HIF121 | 0.3534 | HIF121/HOI | 0.3438 | SGI121 | −0.1404 | \|SGI121\|/(\|SGI121\| + TP1) | 0.1941 |
| HIF122 | 0.3791 | HIF122/HOI | 0.3688 | SGI122 | −0.1613 | \|SGI122\|/(\|SGI122\| + TP1) | 0.2167 |
| HIF211 | 0.2767 | HIF211/HOI | 0.2691 | SGI211 | −0.1673 | \|SGI211\|/(\|SGI211\| + TP2) | 0.2230 |
| HIF212 | 0.4039 | HIF212/HOI | 0.3929 | SGI212 | −0.2779 | \|SGI212\|/(\|SGI212\| + TP2) | 0.3229 |
| HIF221 | 0.3281 | HIF221/HOI | 0.3192 | SGI221 | −0.1109 | \|SGI221\|/(\|SGI221\| + TP2) | 0.1599 |
| HIF311 | 0.3071 | HIF311/HOI | 0.2988 | SGI311 | 0.0841 | \|SGI311\|/(\|SGI311\| + TP3) | 0.1261 |
| HIF321 | 0.4020 | HIF321/HOI | 0.3911 | SGI321 | 0.0623 | \|SGI321\|/(\|SGI321\| + TP3) | 0.0966 |

Third Embodiment

Figure 3A:
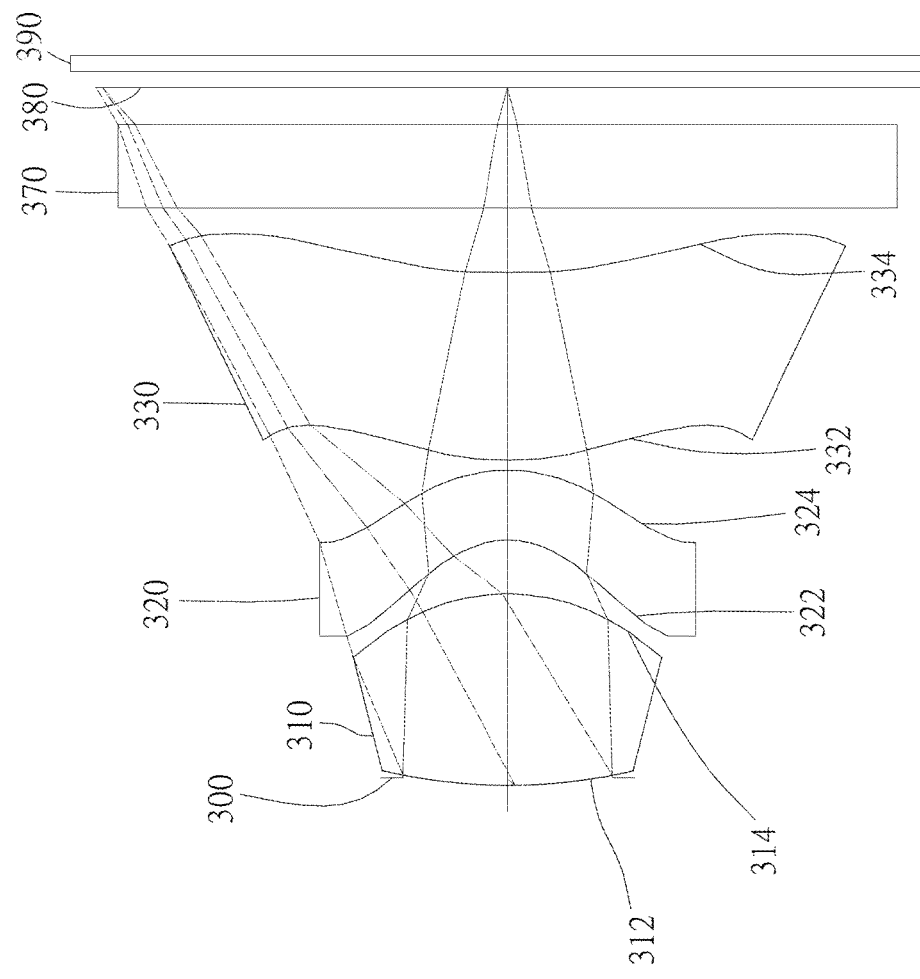
FIG. 3A is a schematic diagram of a third embodiment of the present invention.
Figure 3:
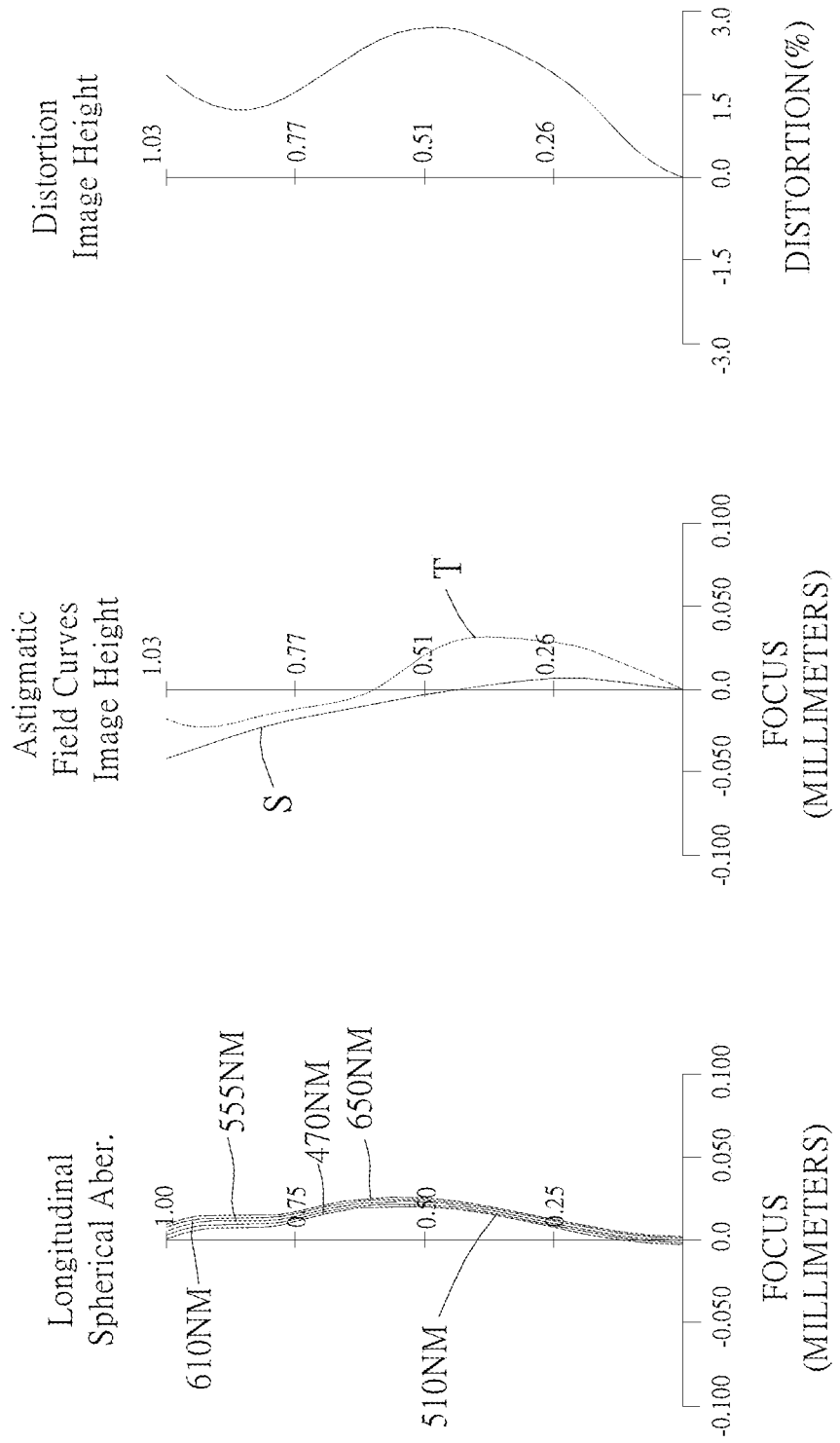
FIG. 3B shows curve diagrams of longitudinal spherical aberration, astigmatic field, and optical distortion of the optical image capturing system in the order from left to right of the third embodiment of the present application.
FIG. 3C shows a feature map of modulation transformation of the optical image capturing system of the third embodiment of the present application in visible spectrum.
FIG. 3D is a diagram showing the through-focus MTF values of the visible light spectrum at the central field of view, 0.3 field of view, and 0.7 field of view of the first embodiment of the present invention.
FIG. 3E is a diagram showing the through-focus MTF values of the infrared light spectrum at the central field of view, 0.3 field of view, and 0.7 field of view of the first embodiment of the present disclosure.
Figure 3C:
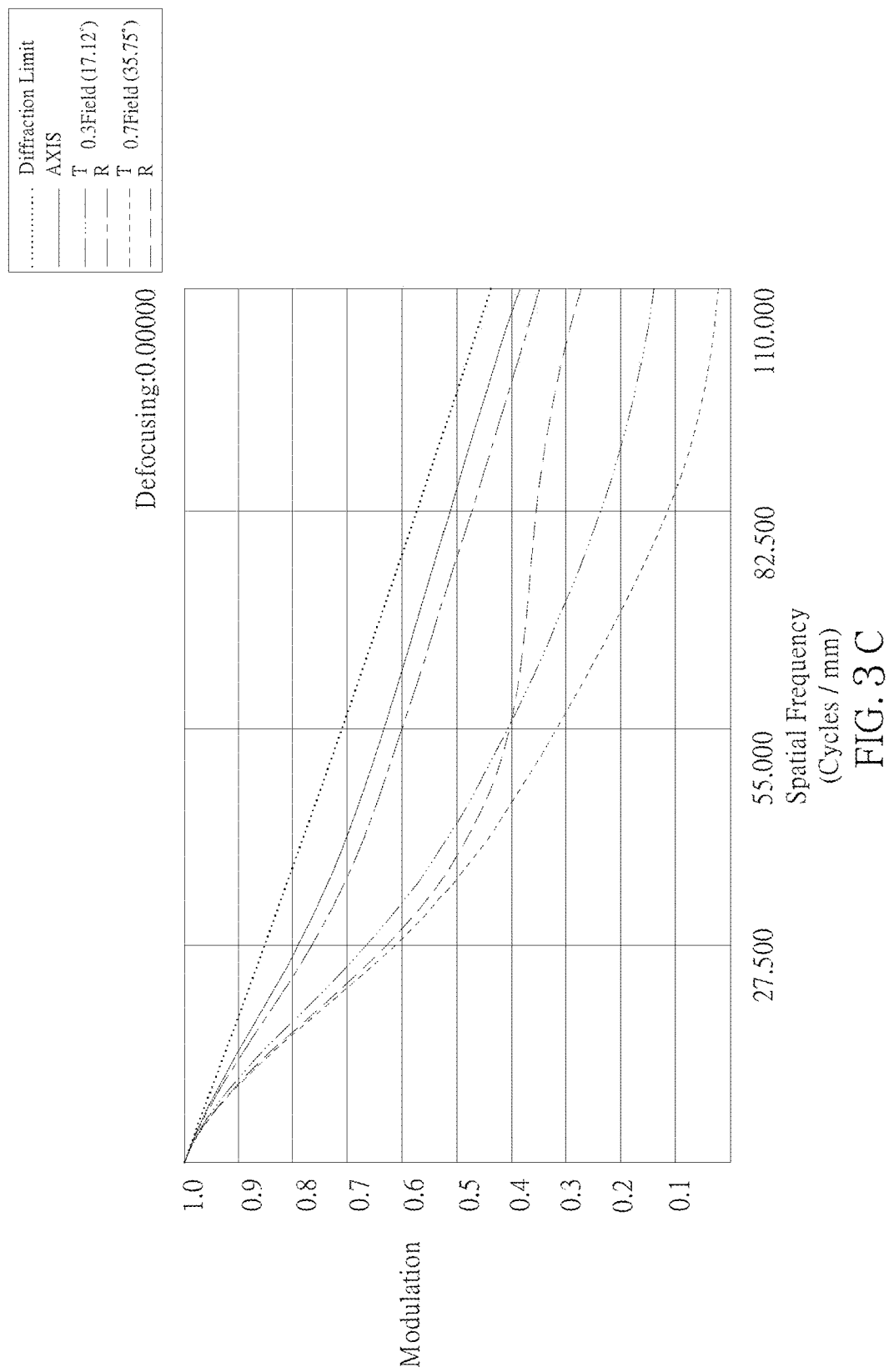
Figure 3D:
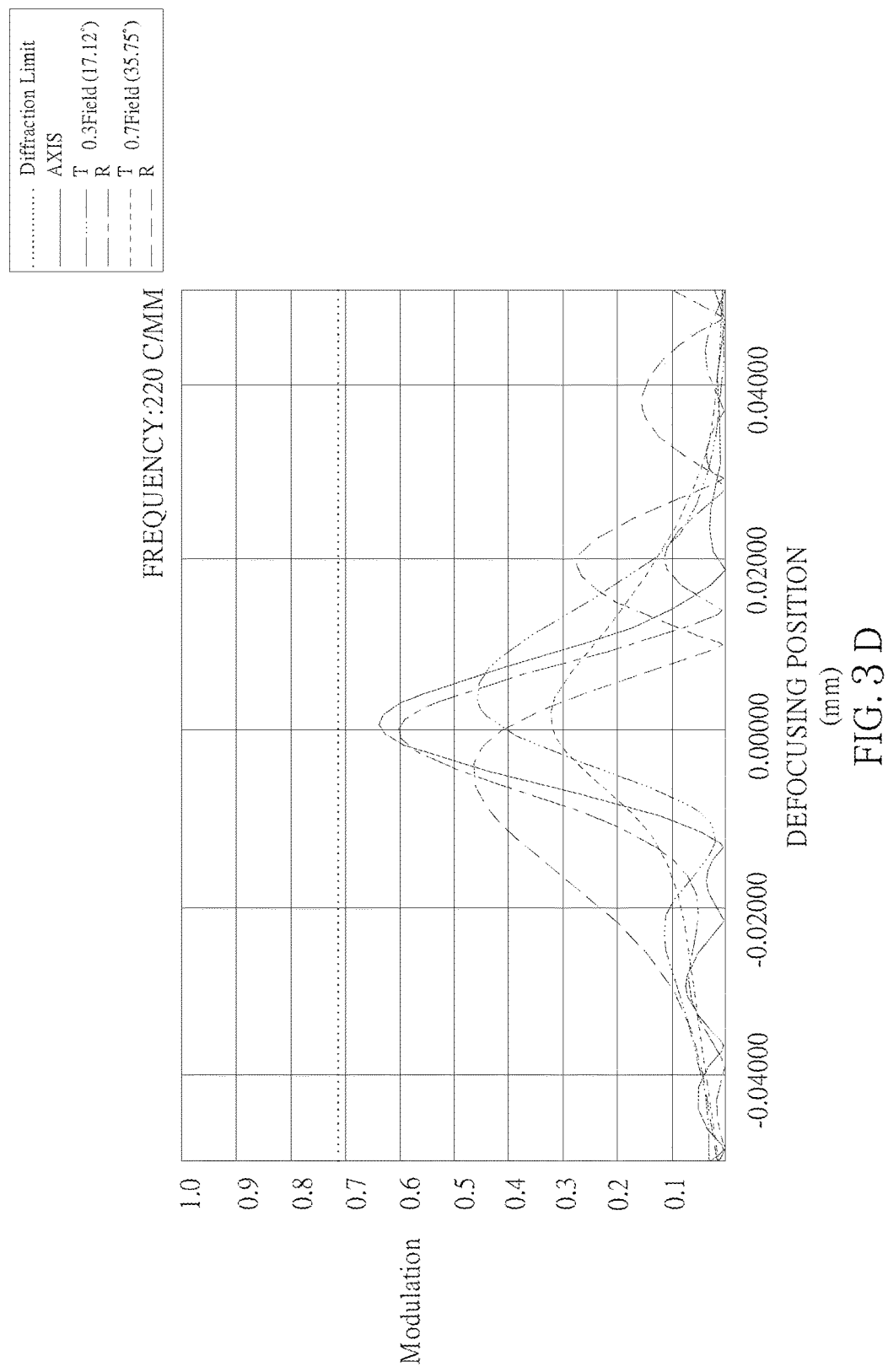
Figure 3:
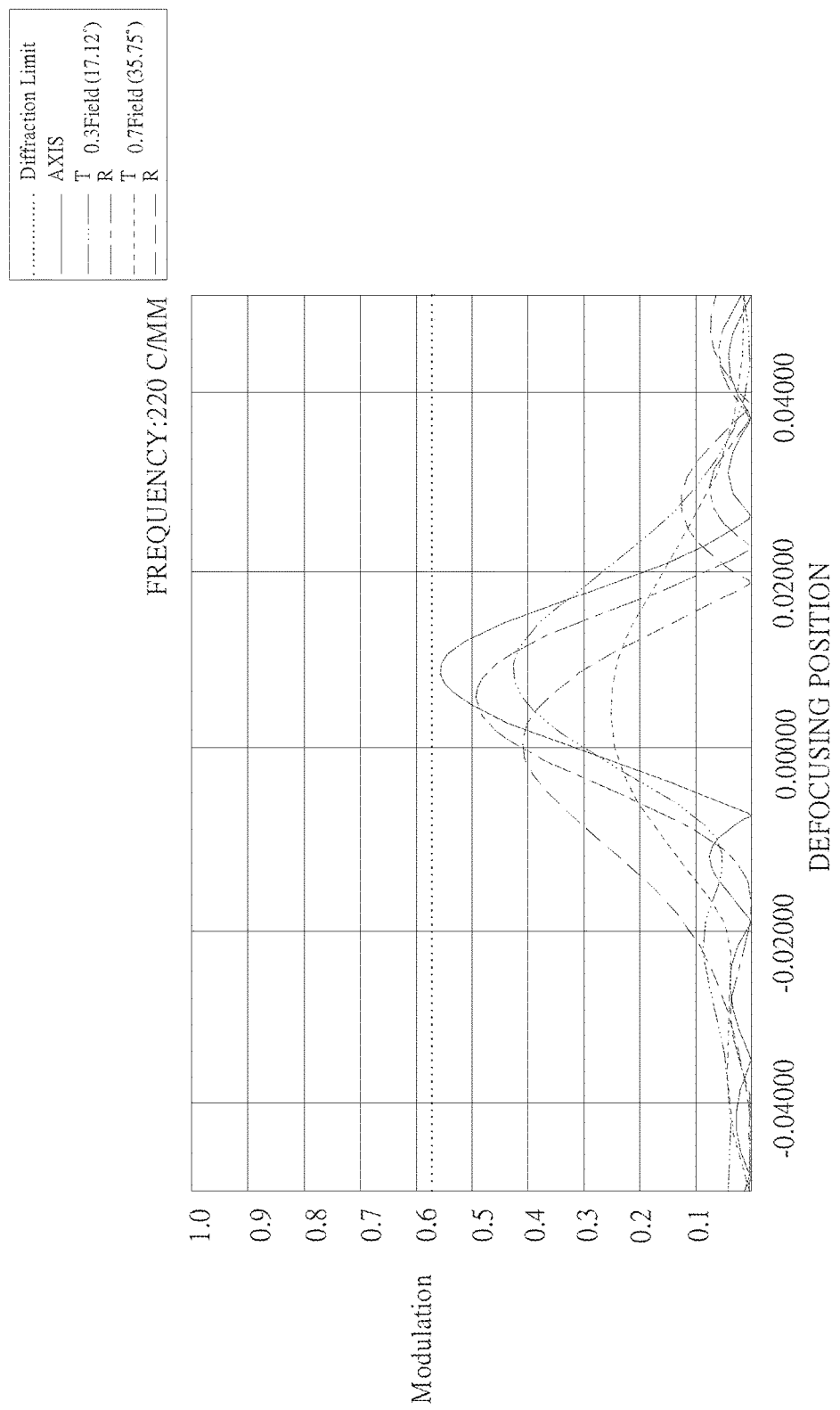

As shown in FIG. 3A and FIG. 3B, an optical image capturing system of the third embodiment of the present invention includes, along an optical axis from an object side to an image side, an aperture 300, a first lens 310, a second lens 320, a third lens 330, an infrared rays filter 370, an image plane 380, and an image sensor 390. FIG. 3C shows a modulation transformation of the optical image capturing system 30 of the third embodiment of the present application. FIG. 3D is a diagram showing the through-focus MTF values of the visible light spectrum at the central field of view, 0.3 field of view, and 0.7 field of view of the third embodiment of the present invention. FIG. 3E is a diagram showing the through-focus MTF values of the infrared light spectrum at the central field of view, 0.3 field of view, and 0.7 field of view of the third embodiment of the present disclosure.

The first lens 310 has positive refractive power and is made of plastic. An object-side surface 312 thereof, which faces the object side, is a convex aspheric surface, and an image-side surface 314 thereof, which faces the image side, is a convex aspheric surface. The object-side surface 312 and the image-side surface 314 both have an inflection point.

The second lens 320 has negative refractive power and is made of plastic. An object-side surface 322 thereof, which faces the object side, is a concave aspheric surface, and an image-side surface 324 thereof, which faces the image side, is a convex aspheric surface. The object-side surface 322 and the image-side surface 324 both have an inflection point.

The third lens 330 has positive refractive power and is made of plastic. An object-side surface 332 thereof, which faces the object side, is a convex surface, and an image-side surface 334 thereof, which faces the image side, is a concave aspheric surface. The object-side surface 332 and the image-side surface 334 both have an inflection point.

The infrared rays filter 370 is made of glass and between the third lens 330 and the image plane 380. The infrared rays filter 390 gives no contribution to the focal length of the system.

The parameters of the lenses of the third embodiment are listed in Table 5 and Table 6.

TABLE 5 f = 0.966775 mm; f/HEP = 1.8; HAF = 45.8483 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 600 | | | | |
| 1 | Aperture | 1E+18 | −0.020 | | | | |
| 2 | 1$^{st}$ lens | 1.149364832 | 0.483 | plastic | 1.545 | 55.99 | 0.772 |
| 3 | | −0.567899584 | 0.139 | | | | |
| 4 | | 1E+18 | 0.000 | | | | |
| 5 | 2$^{nd}$ lens | −0.209076778 | 0.177 | plastic | 1.643 | 22.47 | −1.183 |
| 6 | | −0.383313533 | 0.023 | | | | |
| 7 | 3$^{rd}$ lens | 0.617142404 | 0.476 | plastic | 1.545 | 55.99 | 1.496 |
| 8 | | 1.833755718 | 0.163 | | | | |
| 9 | Infrared rays filter | 1E+18 | 0.210 | BK7_SCHOTT | 1.517 | 64.13 | |
| 10 | | 1E+18 | 0.095 | | | | |
| 11 | Image plane | 1E+18 | 0.000 | | | | |

Reference wavelength: 555 nm; the position of blocking light: the clear aperture of the third surface is 0.390 mm.

TABLE 6

Coefficients of the aspheric surfaces

| | Surface | | | | | |
|---|---|---|---|---|---|---|
| | 2 | 3 | 5 | 6 | 7 | 8 |
| k | −7.553083E+00 | −4.294660E−01 | −8.619843E−01 | −7.017040E−01 | −7.542044E+00 | 8.137776E−01 |
| A4 | −4.647532E−01 | 1.141386E+00 | 1.228677E+01 | 2.927896E+00 | 2.424297E−01 | 1.292947E+00 |
| A6 | 3.794284E+00 | −1.137661E+02 | −2.237222E+02 | −4.018216E+01 | −9.864433E+00 | −9.683351E+00 |
| A8 | −3.909617E+02 | 2.529425E+03 | 3.514219E+03 | 4.122324E+02 | 5.444734E+01 | 3.028484E+01 |
| A10 | 9.477053E+03 | −3.366505E+04 | −2.470105E+04 | −1.239024E+03 | −1.556839E+02 | −5.844136E+01 |
| A12 | −4.120078E+04 | 2.801816E+05 | 8.224834E+04 | 5.154358E+02 | 1.314751E+02 | 6.882955E+01 |
| A14 | −1.331595E+06 | −1.293165E+06 | −1.108675E+05 | 5.973147E+02 | 3.188239E+02 | −4.514124E+01 |
| A16 | 1.191308E+07 | 2.469069E+06 | 3.623981E+04 | 5.545968E+03 | −6.151683E+02 | 1.251737E+01 |

An equation of the aspheric surfaces of the third embodiment is the same as that of the first embodiment, and the definitions are the same as well.

The exact parameters of the third embodiment based on Table 5 and Table 6 are listed in the following table:

| Third embodiment | | | | | |
|---|---|---|---|---|---|
| MTFQ0 | MTFQ3 | MTFQ7 | MTFH0 | MTFH3 | MTFH7 |
| 0.79 | 0.66 | 0.62 | 0.63 | 0.41 | 0.32 |
| ETP1 | ETP2 | ETP3 | ETP1/TP1 | ETP2/TP2 | ETP3/TP3 |
| 0.386 | 0.235 | 0.454 | 0.799 | 1.325 | 0.954 |
| ETL | EBL | EIN | EIR | PIR | SETP |
| 1.740 | 0.444 | 1.296 | 0.139 | 0.163 | 1.074 |
| EIN/ETL | SETP/EIN | EIR/PIR | EBL/BL | BL | STP |
| 0.745 | 0.829 | 0.854 | 0.9491 | 0.4678 | 1.135 |
| ED12 | ED23 | ED12/IN12 | ED23/IN23 | SED | SETP/STP |
| 0.064 | 0.158 | 0.463 | 6.804 | 0.222 | 0.976 |
| \|f/f1\| | \|f/f2\| | \|f/f3\| | \|f1/f2\| | \|f2/f3\| | TP1/TP2 |
| 1.25150 | 0.81735 | 0.64617 | 1.53117 | 1.26492 | 2.72498 |

-continued

Third embodiment

| ΣPPR | ΣNPR | ΣPPR/|ΣNPR| | IN12/f | IN23/f | TP2/TP3 |
|---|---|---|---|---|---|
| 1.89766 | 0.81735 | 2.32174 | 0.14394 | 0.02399 | 0.37242 |

| TP2/(IN12 + TP2 + IN23) | (TP1 + IN12)/TP2 | (TP3 + IN23)/TP3 |
|---|---|---|
| 0.52174 | 2.81612 | 2.81612 |

| HOS | InTL | HOS/HOI | InS/HOS | |ODT| % | |TDT| % |
|---|---|---|---|---|---|
| 1.76548 | 1.29767 | 1.71739 | 0.98867 | 2.77647 | 1.23439 |

| HVT21 | HVT22 | HVT31 | HVT32 | HVT32/HOI | HVT32/HOS |
|---|---|---|---|---|---|
| 0.00000 | 0.00000 | 0.50032 | 0.68965 | 0.67087 | 0.39063 |

| VSFS0 | VSFS3 | VSFS7 | VTFS0 | VTFS3 | VTFS7 |
|---|---|---|---|---|---|
| 0.000 | 0.000 | −0.005 | 0.000 | 0.005 | 0.000 |

| VSMTF0 | VSMTF3 | VSMTF7 | VTMTF0 | VTMTF3 | VTMTF7 |
|---|---|---|---|---|---|
| 0.635 | 0.602 | 0.466 | 0.635 | 0.456 | 0.319 |

| ISFS0 | ISFS3 | ISFS7 | ITFS0 | ITFS3 | ITFS7 |
|---|---|---|---|---|---|
| 0.008 | 0.005 | 0.000 | 0.008 | 0.008 | 0.005 |

| ISMTF0 | ISMTF3 | ISMTF7 | ITMTF0 | ITMTF3 | ITMTF7 |
|---|---|---|---|---|---|
| 0.562 | 0.498 | 0.410 | 0.562 | 0.422 | 0.254 |

| FS | AIFS | AVFS | AFS |
|---|---|---|---|
| 0.008 | 0.005 | 0.000 | 0.005 |

(Reference wavelength: 555 nm)

The results of the equations of the third embodiment based on Table 5 and Table 6 are listed in the following table:

Values related to the inflection points of the third embodiment
(Reference wavelength: 555 nm)

| HIF111 | 0.2222 | HIF111/HOI | 0.2162 | SGI111 | 0.0190 | |SGI111|/(|SGI111| + TP1) | 0.0378 |
|---|---|---|---|---|---|---|---|
| HIF121 | 0.3775 | HIF121/HOI | 0.3673 | SGI121 | −0.1529 | |SGI121|/(|SGI121| + TP1) | 0.2406 |
| HIF211 | 0.2557 | HIF211/HOI | 0.2487 | SGI211 | −0.1348 | |SGI211|/(|SGI211| + TP2) | 0.2183 |
| HIF221 | 0.3022 | HIF221/HOI | 0.2940 | SGI221 | −0.1103 | |SGI221|/(|SGI221| + TP2) | 0.1860 |
| HIF311 | 0.2638 | HIF311/HOI | 0.2566 | SGI311 | 0.0443 | |SGI311|/(|SGI311| + TP3) | 0.0841 |
| HIF321 | 0.3988 | HIF321/HOI | 0.3879 | SGI321 | 0.0525 | |SGI321|/(|SGI321| + TP3) | 0.0981 |

Fourth Embodiment

Figure 4A:
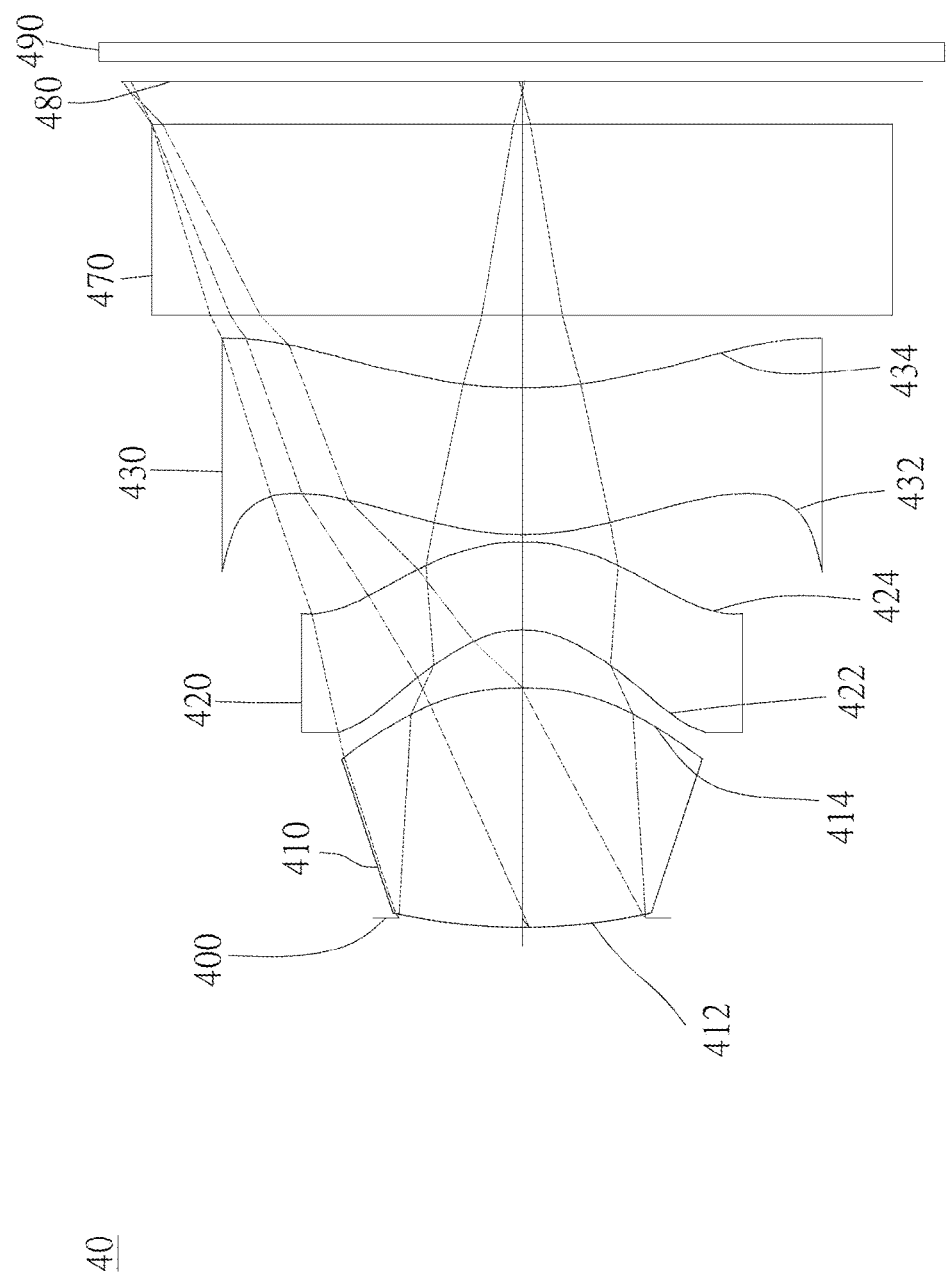
FIG. 4A is a schematic diagram of a fourth embodiment of the present invention.
Figure 4B:
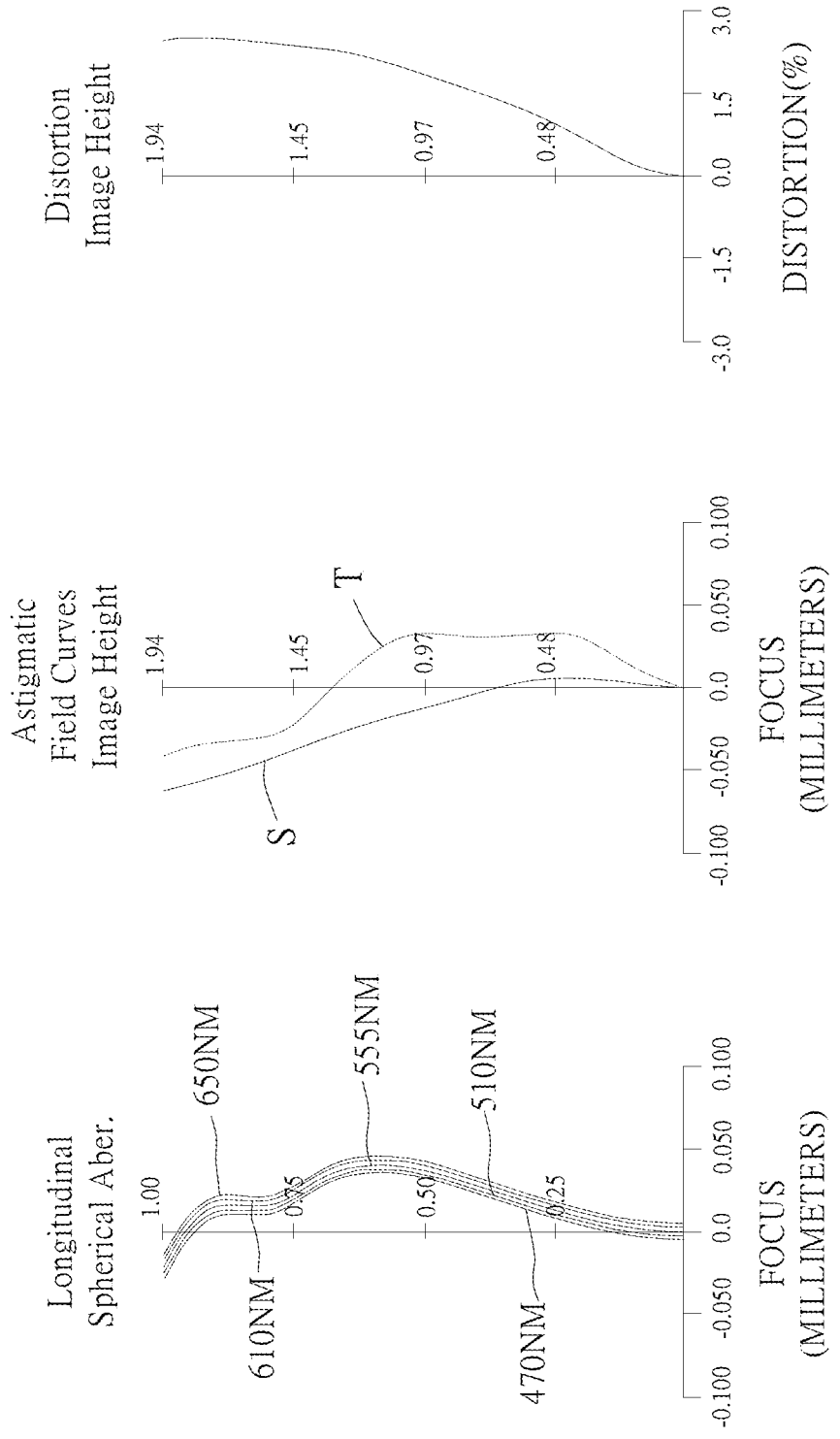
FIG. 4B shows curve diagrams of longitudinal spherical aberration, astigmatic field, and optical distortion of the optical image capturing system in the order from left to right of the fourth embodiment of the present application.
Figure 4C:
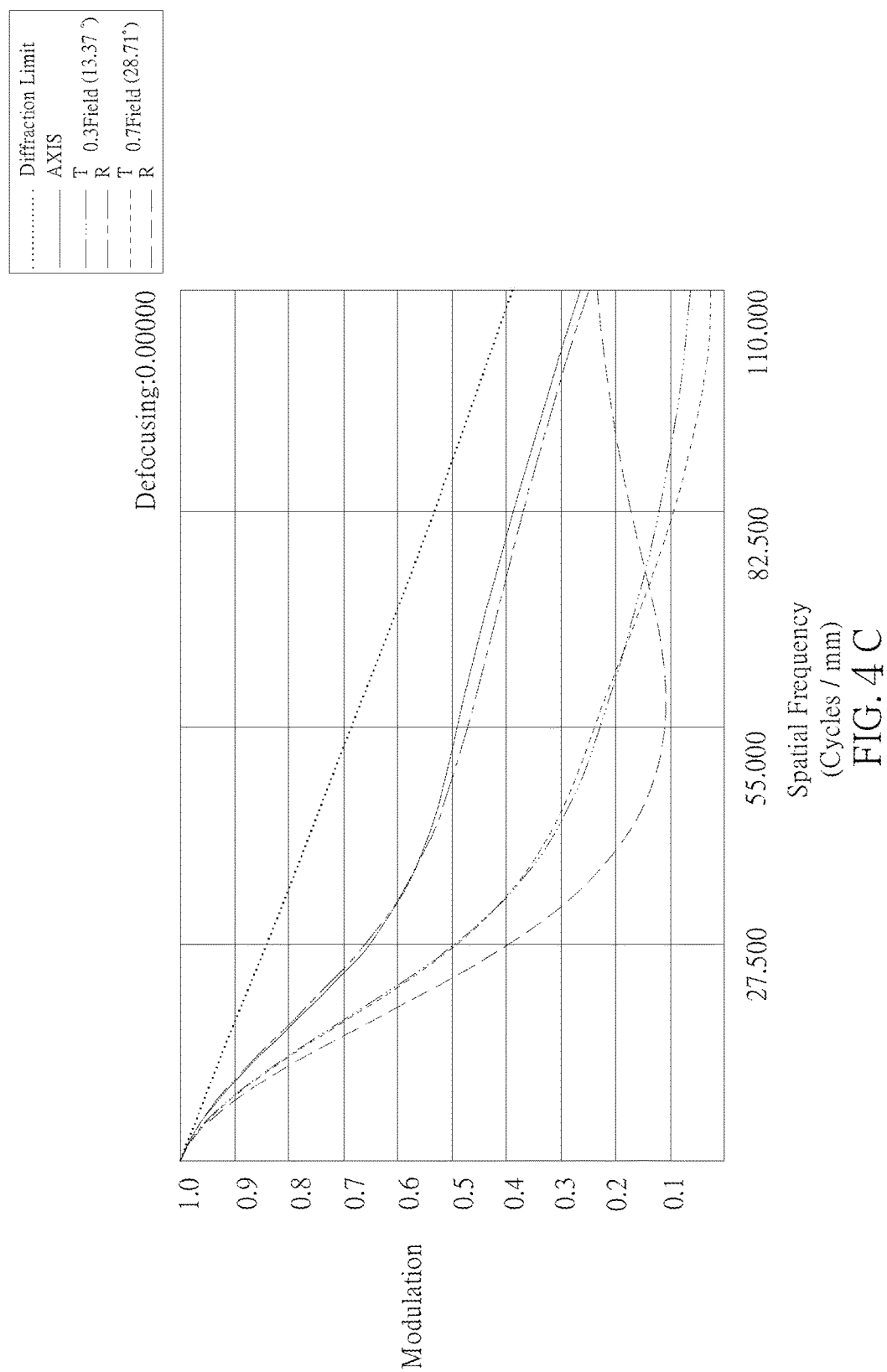
FIG. 4C shows a feature map of modulation transformation of the optical image capturing system of the fourth embodiment in visible spectrum.
Figure 4D:
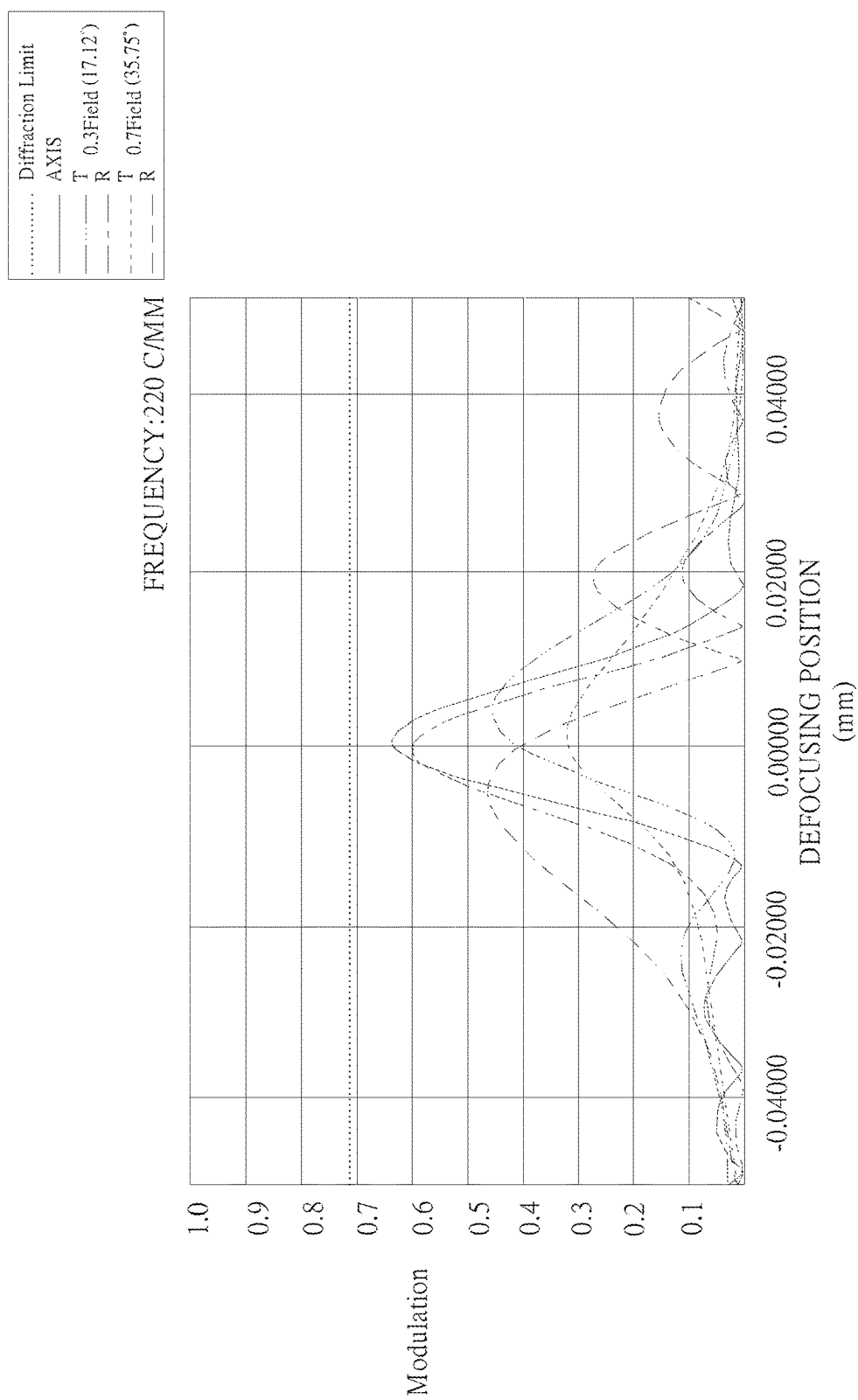
FIG. 4D is a diagram showing the through-focus MTF values of the visible light spectrum at the central field of view, 0.3 field of view, and 0.7 field of view of the first embodiment of the present invention.
Figure 4E:
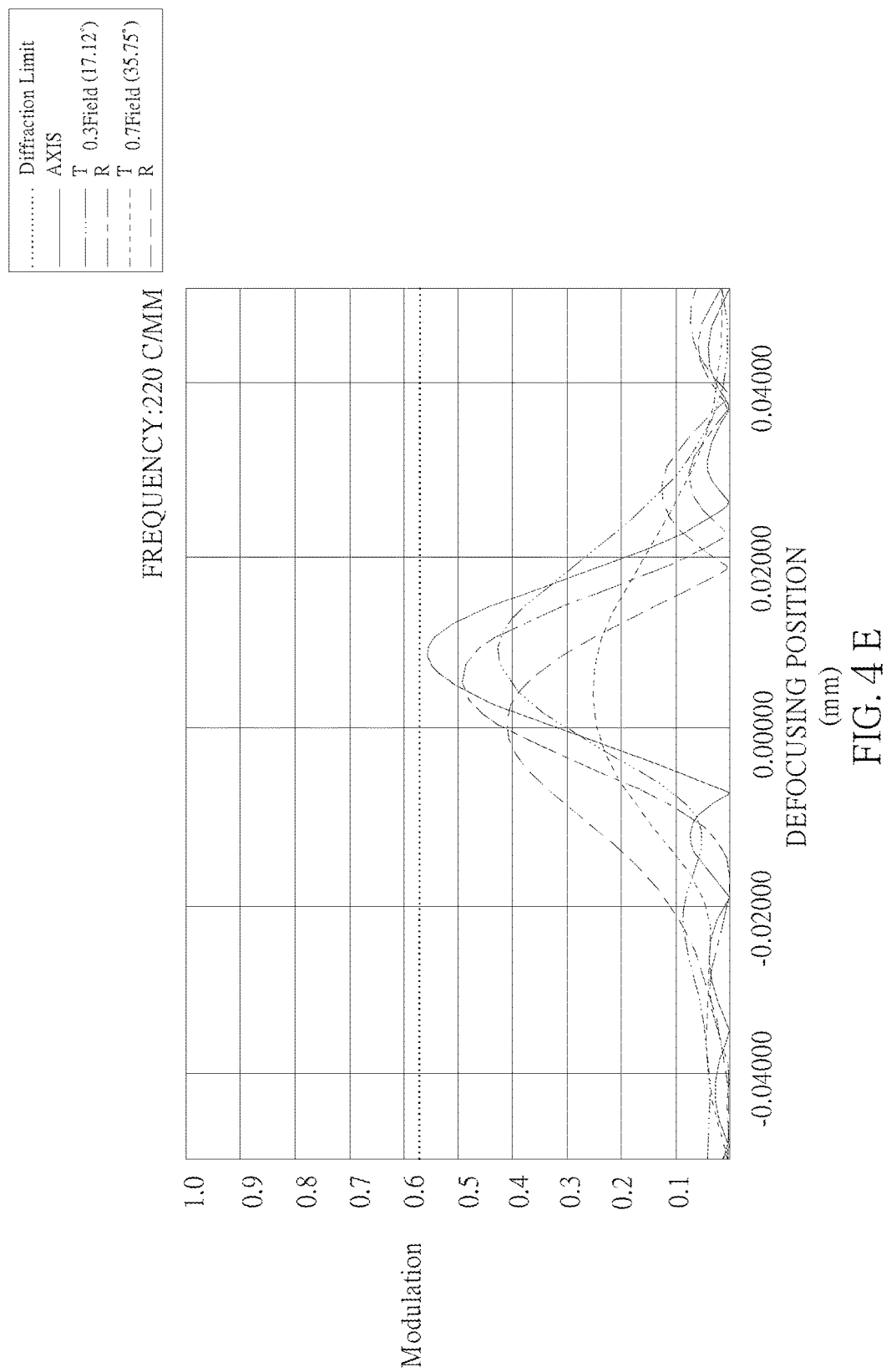
FIG. 4E is a diagram showing the through-focus MTF values of the infrared light spectrum at the central field of view, 0.3 field of view, and 0.7 field of view of the first embodiment of the present disclosure.

As shown in FIG. 4A and FIG. 4B, an optical image capturing system 40 of the fourth embodiment of the present invention includes, along an optical axis from an object side to an image side, an aperture 400, a first lens 410, a second lens 420, a third lens 430, an infrared rays filter 470, an image plane 480, and an image sensor 490. FIG. 4C shows a modulation transformation of the optical image capturing system 40 of the fourth embodiment of the present application. FIG. 4D is a diagram showing the through-focus MTF values of the visible light spectrum at the central field of view, 0.3 field of view, and 0.7 field of view of the fourth embodiment of the present invention. FIG. 4E is a diagram showing the through-focus MTF values of the infrared light spectrum at the central field of view, 0.3 field of view, and 0.7 field of view of the fourth embodiment of the present disclosure.

The first lens 410 has positive refractive power and is made of plastic. An object-side surface 412 thereof, which faces the object side, is a convex aspheric surface, and an image-side surface 414 thereof, which faces the image side, is a convex aspheric surface. The object-side surface 412 has two inflection points, and the image-side surface 414 has an inflection point.

The second lens 420 has negative refractive power and is made of plastic. An object-side surface 422 thereof, which faces the object side, is a concave aspheric surface, and an image-side surface 424 thereof, which faces the image side, is a convex aspheric surface. The object-side surface 422 and the image-side surface 424 both have an inflection point.

The third lens 430 has positive refractive power and is made of plastic. An object-side surface 432 thereof, which faces the object side, is a convex aspheric surface, and an image-side surface 434 thereof, which faces the image side, is a concave aspheric surface. The object-side surface 432 and the image-side surface 434 both have an inflection point.

The infrared rays filter 470 is made of glass and between the third lens 430 and the image plane 480. The infrared rays filter 470 gives no contribution to the focal length of the system.

The parameters of the lenses of the fourth embodiment are listed in Table 7 and Table 8.

TABLE 7 f = 2.39635 mm; f/HEP = 2.0; HAF = 38.0362 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 600 | | | | |
| 1 | Aperture | 1E+18 | −0.044 | | | | |
| 2 | 1$^{st}$ lens | 2.327267435 | 1.169 | plastic | 1.545 | 55.99 | 1.712 |
| 3 | | −1.28628031 | 0.287 | | | | |
| 4 | | 1E+18 | 0.000 | | | | |
| 5 | 2$^{nd}$ lens | −0.47876464 | 0.431 | plastic | 1.643 | 22.47 | −2.571 |
| 6 | | −0.909660474 | 0.035 | | | | |
| 7 | 3$^{rd}$ lens | 1.28469498 | 0.720 | plastic | 1.545 | 55.99 | 4.204 |
| 8 | | 2.338233669 | 0.358 | | | | |
| 9 | Infrared rays filter | 1E+18 | 0.930 | BK7_SCHOTT | 1.517 | 64.13 | 1E+18 |
| 10 | | 1E+18 | 0.208 | | | | |
| 11 | Image plane | 1E+18 | 0.000 | | | | |

Reference wavelength: 555 nm; the position of blocking light: none.

TABLE 8

Coefficients of the aspheric surfaces

| | Surface | | | | |
|---|---|---|---|---|---|
| | 2 | 3 | 5 | 6 | 7 | 8 |
| k | −5.074263E+00 | −5.079854E−01 | −8.585184E−01 | −6.971269E−01 | −7.542044E+00 | −7.130575E−01 |
| A4 | −3.280016E−02 | −9.694687E−02 | 8.702258E−01 | 1.300003E−01 | 1.291371E−02 | 3.206024E−02 |
| A6 | 9.344954E−02 | −2.529624E−01 | −2.082010E+00 | −5.588734E−02 | −7.771714E−02 | −1.400937E−01 |
| A8 | −1.476299E+00 | 4.552890E−01 | 7.933272E+00 | 4.763078E−01 | −4.957582E−02 | 1.127690E−01 |
| A10 | 7.319610E+00 | 1.539874E+00 | −1.400856E+01 | −1.945844E−01 | 1.965625E−01 | −5.295364E−02 |
| A12 | −6.368328E+00 | −4.853520E+00 | 1.228722E+01 | −3.583660E−01 | −2.049377E−01 | 1.445973E−02 |
| A14 | −4.174505E+01 | 4.516861E+00 | −4.571329E+00 | 3.414383E−01 | 9.627247E−02 | −2.102671E−03 |
| A16 | 7.574769E+01 | −1.195773E+00 | 3.550937E−01 | −7.841846E−02 | −1.772355E−02 | 1.205817E−04 |

An equation of the aspheric surfaces of the fourth embodiment is the same as that of the first embodiment, and the definitions are the same as well.

The exact parameters of the fourth embodiment based on Table 7 and Table 8 are listed in the following table:

| Fourth embodiment | | | | | |
|---|---|---|---|---|---|
| MTFQ0 | MTFQ3 | MTFQ7 | MTFH0 | MTFH3 | MTFH7 |
| 0.65 | 0.49 | 0.49 | 0.49 | 0.25 | 0.23 |
| ETP1 | ETP2 | ETP3 | ETP1/TP1 | ETP2/TP2 | ETP3/TP3 |
| 0.943 | 0.559 | 0.689 | 0.806 | 1.297 | 0.957 |
| ETL | EBL | EIN | EIR | PIR | SETP |
| 4.071 | 1.419 | 2.652 | 0.281 | 0.358 | 2.190 |
| EIN/ETL | SETP/EIN | EIR/PIR | EBL/BL | BL | STP |
| 0.651 | 0.826 | 0.786 | 0.9468 | 1.4988 | 2.320 |
| ED12 | ED23 | ED12/IN12 | ED23/IN23 | SED | SETP/STP |
| 0.134 | 0.328 | 0.465 | 9.317 | 0.461 | 0.944 |

-continued

| Fourth embodiment | | | | | |
|---|---|---|---|---|---|
| \|f/f1\| | \|f/f2\| | \|f/f3\| | \|f1/f2\| | \|f2/f3\| | TP1/TP2 |
| 1.39960 | 0.93206 | 0.56996 | 1.50161 | 1.63530 | 2.71366 |
| ΣPPR | ΣNPR | ΣPPR/\|ΣNPR\| | IN12/f | IN23/f | TP2/TP3 |
| 1.96956 | 0.93206 | 2.11312 | 0.11981 | 0.01468 | 0.59836 |
| TP2/(IN12 + TP2 + IN23) | | (TP1 + IN12)/TP2 | | (TP3 + IN23)/TP2 | |
| 0.57205 | | 1.75287 | | 1.75287 | |
| HOS | InTL | HOS/HOI | InS/HOS | \|ODT\| % | \|TDT\| % |
| 4.14090 | 2.64214 | 2.13229 | 0.98928 | 2.51662 | 0.36730 |
| HVT21 | HVT22 | HVT31 | HVT32 | HVT32/HOI | HVT32/HOS |
| 0.00000 | 0.00000 | 1.09135 | 1.42338 | 0.73295 | 0.34374 |
| VSFS0 | VSFS3 | VSFS7 | VTFS0 | VTFS3 | VTFS7 |
| 0.009 | 0.010 | −0.000 | 0.010 | 0.015 | 0.015 |
| VSMTF0 | VSMTF3 | VSMTF7 | VTMTF0 | VTMTF3 | VTMTF7 |
| 0.499 | 0.468 | 0.357 | 0.499 | 0.275 | 0.248 |
| ISFS0 | ISFS3 | ISFS7 | ITFS0 | ITFS3 | ITFS7 |
| 0.022 | 0.020 | 0.005 | 0.020 | 0.020 | 0.005 |
| ISMTF0 | ISMTF3 | ISMTF7 | ITMTF0 | ITMTF3 | ITMTF7 |
| 0.474 | 0.435 | 0.389 | 0.474 | 0.365 | 0.336 |
| FS | AIFS | AVFS | AFS | | |
| 0.013 | 0.015 | 0.010 | 0.005 | | |

(Reference wavelength: 555 nm)

The results of the equations of the fourth embodiment based on Table 7 and Table 8 are listed in the following table:

| Values related to the inflection points of the fourth embodiment (Reference wavelength: 555 nm) | | | | | |
|---|---|---|---|---|---|
| HIF111 | 0.5321 | HIF111/HOI | 0.2740 | SGI111 | 0.0550 | \|SGI111\|/(\|SGI111\| + TP1) | 0.0449 |
| HIF112 | 0.5787 | HIF112/HOI | 0.2980 | SGI112 | 0.0633 | \|SGI112\|/(\|SGI112\| + TP1) | 0.0514 |
| HIF121 | 0.7968 | HIF121/HOI | 0.4103 | SGI121 | −0.2923 | \|SGI121\|/(\|SGI121\| + TP1) | 0.2000 |
| HIF211 | 0.5711 | HIF211/HOI | 0.2941 | SGI211 | −0.2883 | \|SGI211\|/(\|SGI211\| + TP2) | 0.1978 |
| HIF221 | 0.6389 | HIF221/HOI | 0.3290 | SGI221 | −0.2056 | \|SGI221\|/(\|SGI221\| + TP2) | 0.1496 |
| HIF311 | 0.5991 | HIF311/HOI | 0.3085 | SGI311 | 0.1073 | \|SGI311\|/(\|SGI311\| + TP3) | 0.0841 |
| HIF321 | 0.8081 | HIF321/HOI | 0.4161 | SGI321 | 0.1308 | \|SGI321\|/(\|SGI321\| + TP3) | 0.1006 |

Fifth Embodiment

Figure 5A:
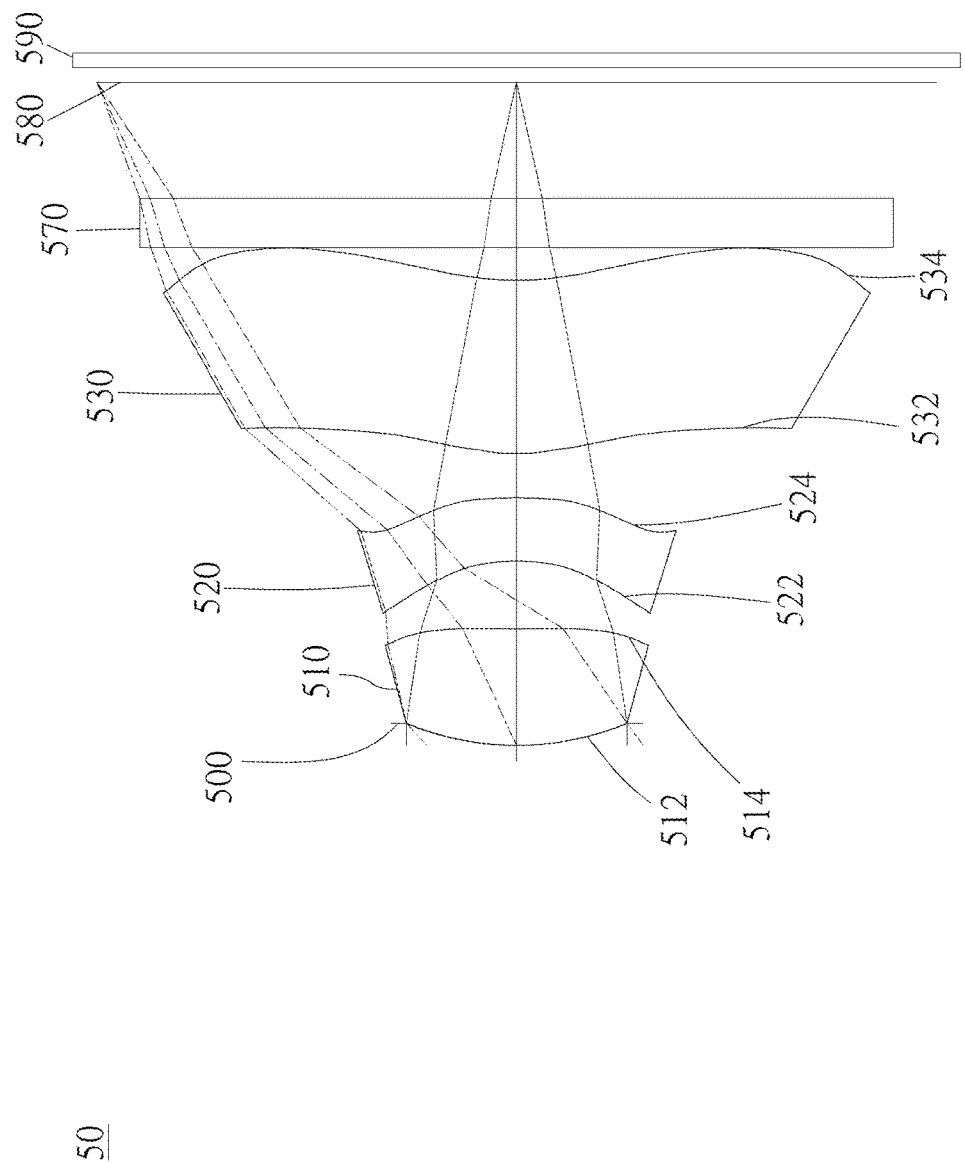
FIG. 5A is a schematic diagram of a fifth embodiment of the present invention.
Figure 5B:
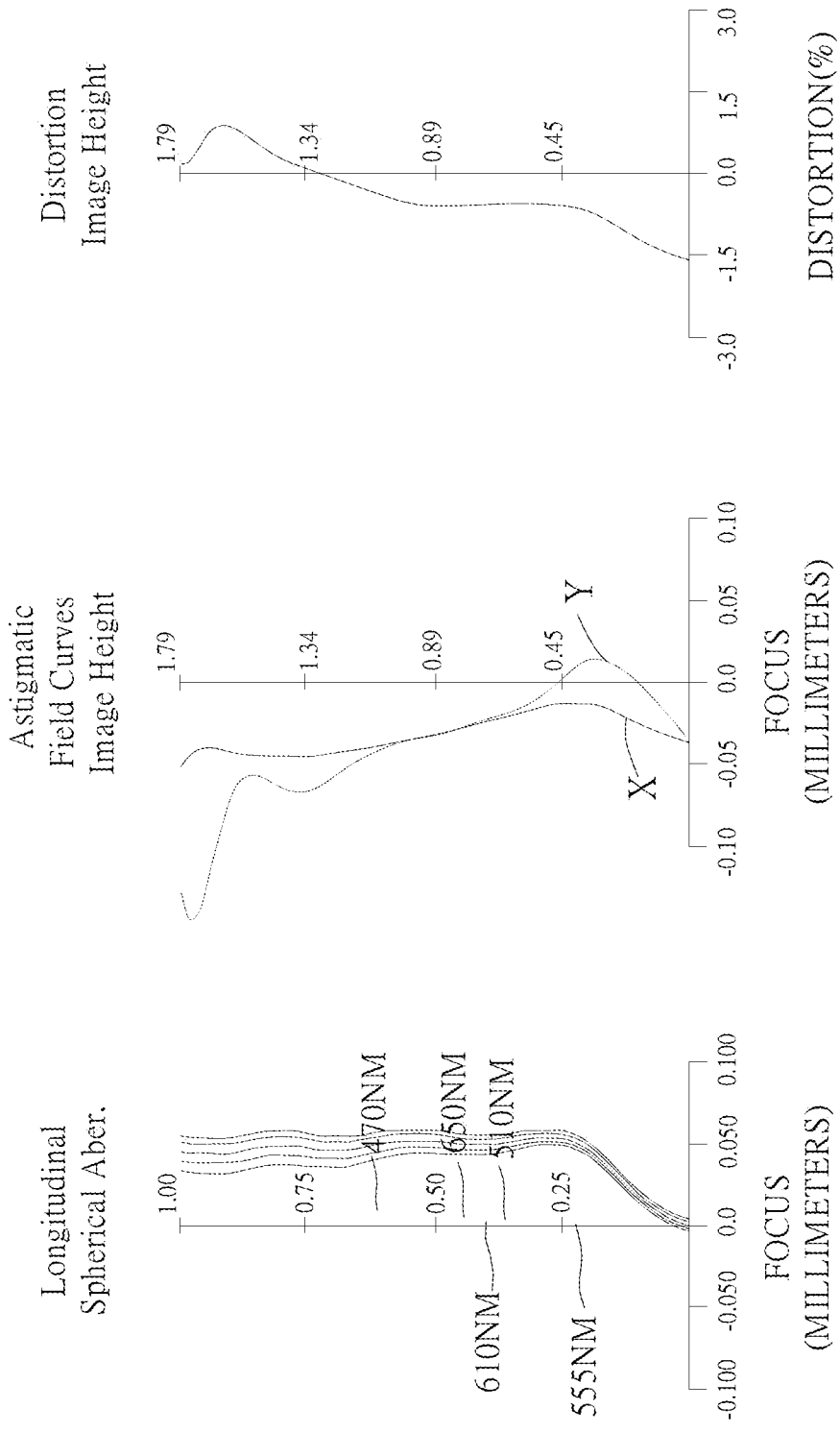
FIG. 5B shows curve diagrams of longitudinal spherical aberration, astigmatic field, and optical distortion of the optical image capturing system in the order from left to right of the fifth embodiment of the present application.
Figure 5C:
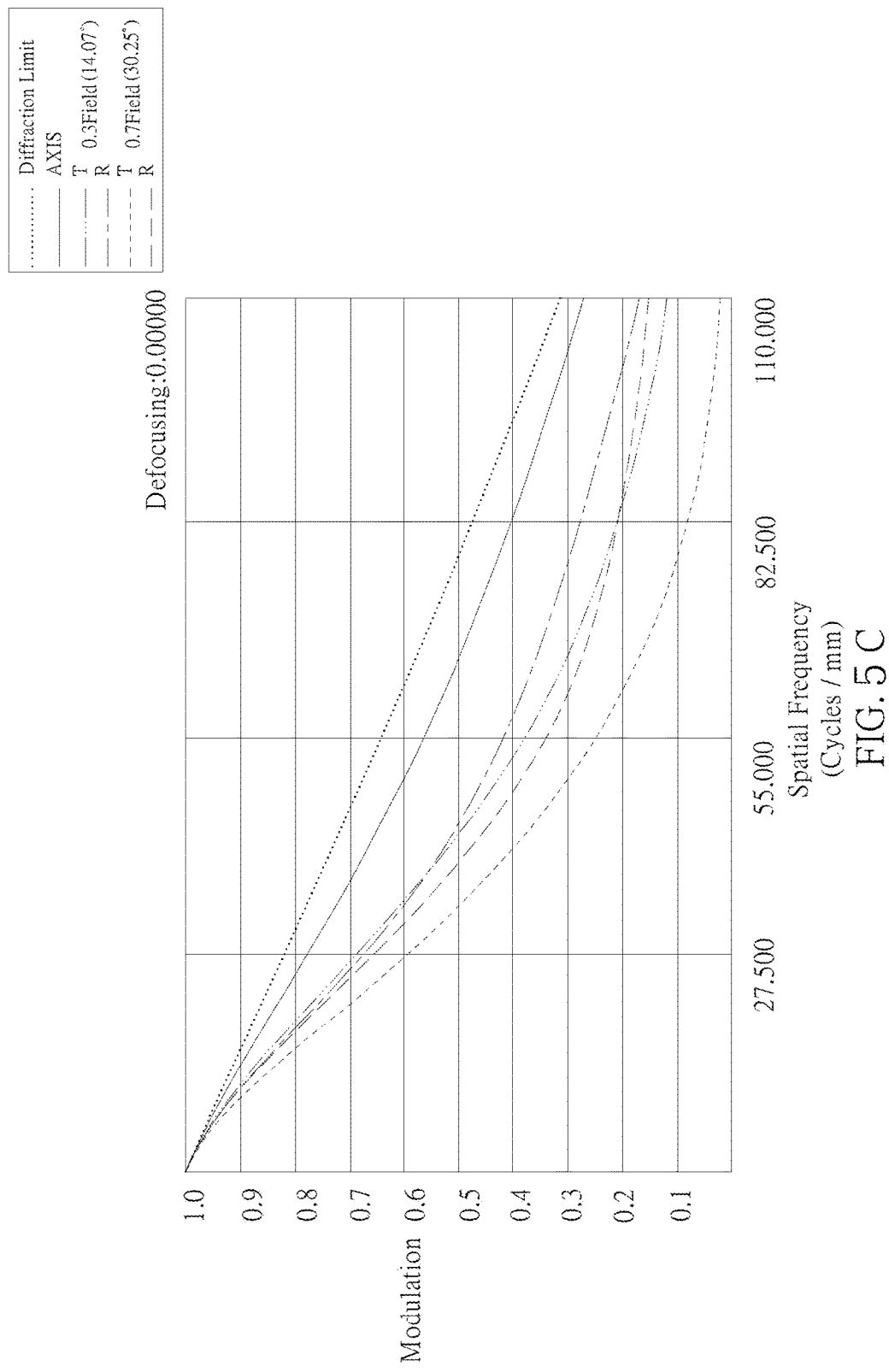
FIG. 5C shows a feature map of modulation transformation of the optical image capturing system of the fifth embodiment of the present application in visible spectrum.
Figure 5D:
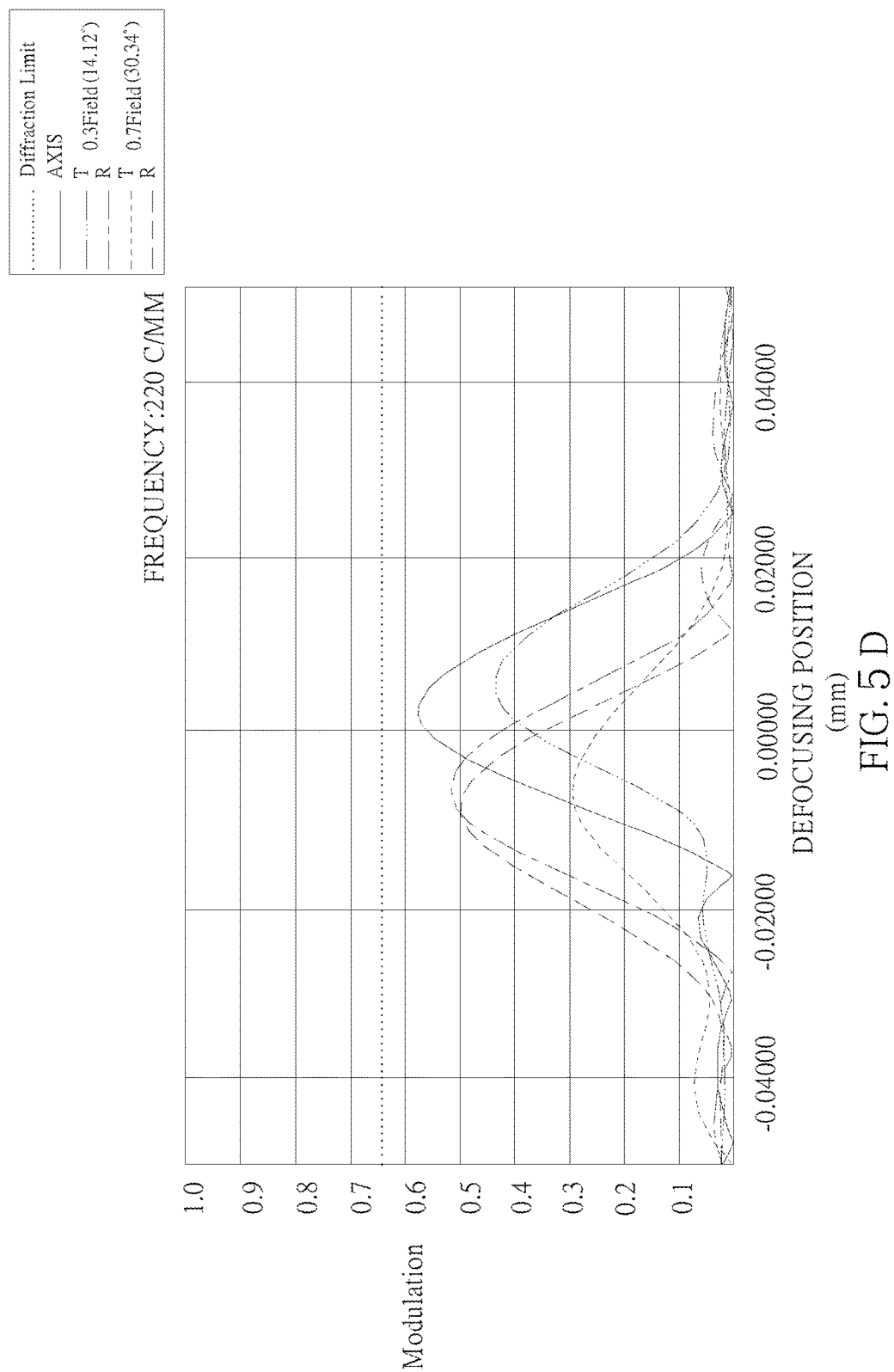
FIG. 5D is a diagram showing the through-focus MTF values of the visible light spectrum at the central field of view, 0.3 field of view, and 0.7 field of view of the first embodiment of the present invention.
Figure 5:
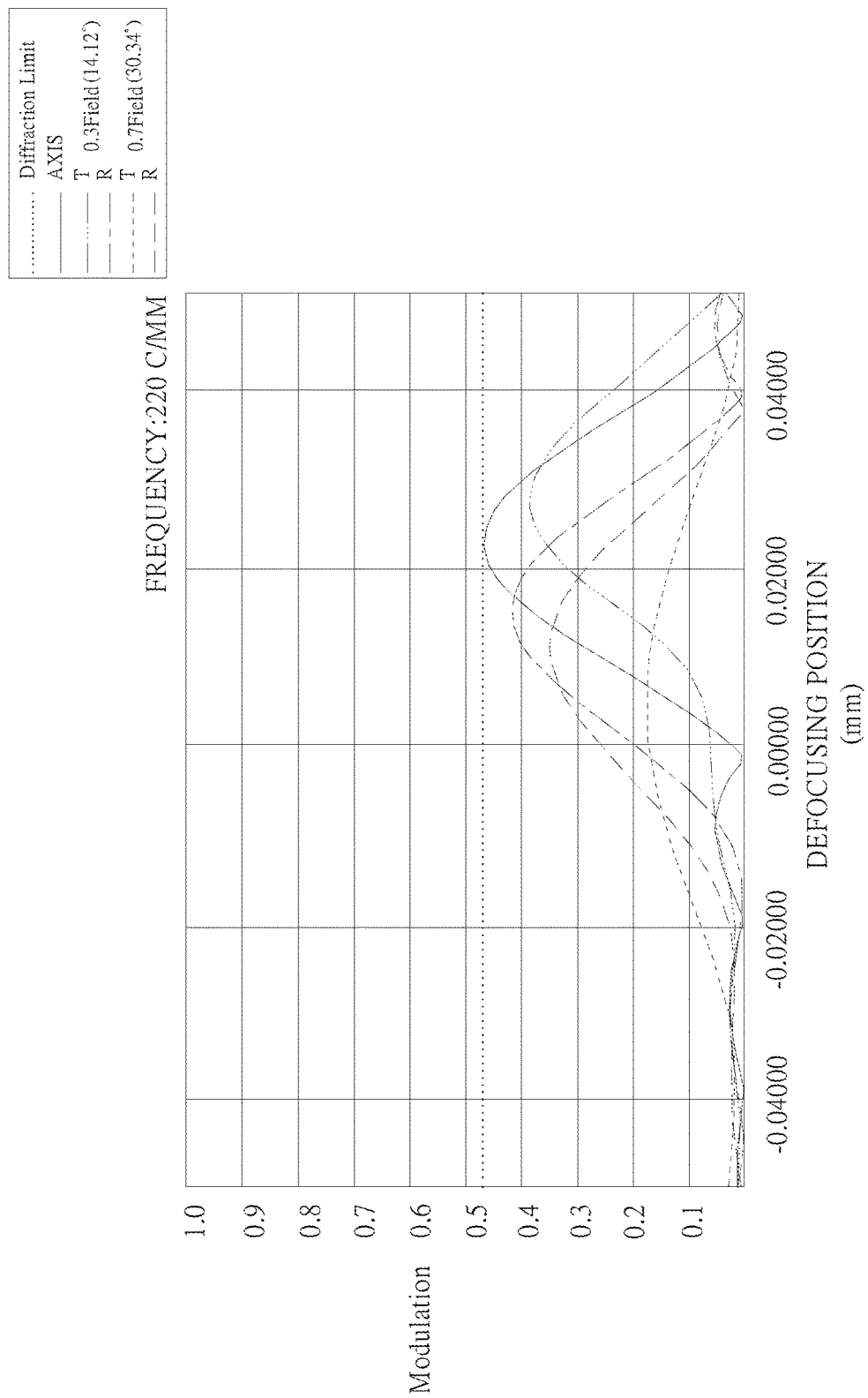
FIG. 5E is a diagram showing the through-focus MTF values of the infrared light spectrum at the central field of view, 0.3 field of view, and 0.7 field of view of the first embodiment of the present disclosure.

As shown in FIG. 5A and FIG. 5B, an optical image capturing system of the fifth embodiment of the present invention includes, along an optical axis from an object side to an image side, an aperture 500, a first lens 510, a second lens 520, a third lens 530, an infrared rays filter 570, an image plane 580, and an image sensor 590. FIG. 5C shows a modulation transformation of the optical image capturing system 50 of the fifth embodiment of the present application. FIG. 5D is a diagram showing the through-focus MTF values of the visible light spectrum at the central field of view, 0.3 field of view, and 0.7 field of view of the fifth embodiment of the present invention. FIG. 5E is a diagram showing the through-focus MTF values of the infrared light spectrum at the central field of view, 0.3 field of view, and 0.7 field of view of the fifth embodiment of the present disclosure.

The first lens 510 has positive refractive power and is made of plastic. An object-side surface 512, which faces the object side, is a convex aspheric surface, and an image-side surface 514, which faces the image side, is a convex aspheric surface. The object-side surface 512 has an inflection point.

The second lens 520 has negative refractive power and is made of plastic. An object-side surface 522 thereof, which faces the object side, is a concave aspheric surface, and an image-side surface 524 thereof, which faces the image side, is a convex aspheric surface. The object-side surface 522 has two inflection points, and the image-side surface 524 has an inflection point.

The third lens 530 has positive refractive power and is made of plastic. An object-side surface 532, which faces the object side, is a convex aspheric surface, and an image-side surface 534, which faces the image side, is a concave aspheric surface. The object-side surface 532 and the image-side surface 534 both have an inflection point.

The infrared rays filter 570 is made of glass and between the third lens 530 and the image plane 580. The infrared rays filter 570 gives no contribution to the focal length of the system.

The parameters of the lenses of the fifth embodiment are listed in Table 9 and Table 10.

TABLE 9 f = 2.05994 mm; f/HEP = 2.24; HAF = 40.102 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 800 | | | | |
| 1 | Aperture/1st lens | 1.097608157 | 0.500 | plastic | 1.535 | 56.27 | 1.970 |
| 2 | | −23.66612836 | 0.293 | | | | |
| 3 | 2$^{nd}$ lens | −0.84550828 | 0.271 | plastic | 1.642 | 22.46 | −2.351 |
| 4 | | −2.14007728 | 0.191 | | | | |
| 5 | 3$^{rd}$ lens | 0.791675048 | 0.745 | plastic | 1.535 | 56.27 | 2.553 |
| 6 | | 1.259520263 | 0.139 | | | | |
| 7 | Infrared rays filter | 1E+18 | 0.210 | BK7_SCHOTT | 1.517 | 64.13 | |
| 8 | | 1E+18 | 0.500 | | | | |
| 9 | Image plane | 1E+18 | 0.000 | | | | |

Reference wavelength: 555 nm; the position of blocking light: none.

TABLE 10

Coefficients of the aspheric surfaces

| | Surface | | | | | |
|---|---|---|---|---|---|---|
| | 1 | 2 | 3 | 4 | 5 | 6 |
| k | −3.742374E−01 | −5.000000E+01 | 8.789334E−01 | −2.814922E+01 | −1.001394E+01 | −5.291352E−01 |
| A4 | −9.127201E−01 | −5.116475E−01 | −2.063462E+00 | −3.594178E+00 | −6.141914E−01 | −5.305365E−01 |
| A6 | 4.530149E+01 | −1.343256E−01 | 3.080256E+01 | 2.268177E+01 | 1.374733E+00 | 4.157730E−01 |
| A8 | −1.206681E+03 | 8.333324E+00 | −4.089820E+02 | −1.184575E+02 | −2.404919E+00 | −2.707202E−01 |
| A10 | 1.850347E+04 | −2.164677E+02 | 3.901370E+03 | 4.698346E+02 | 3.523920E+00 | 1.793410E−01 |
| A12 | −1.744126E+05 | 1.940800E+03 | −2.408948E+04 | −1.217379E+03 | −3.908694E+00 | −1.947189E−01 |
| A14 | 1.025588E+06 | −9.381000E+03 | 9.793655E+04 | 2.177439E+03 | 2.937884E+00 | 1.715881E−01 |
| A16 | −3.668534E+06 | 2.581557E+04 | −2.524928E+05 | −2.819181E+03 | −1.375862E+00 | −8.557032E−02 |
| A18 | 7.304623E+06 | −3.773985E+04 | 3.720423E+05 | 2.459359E+03 | 3.597368E−01 | 2.157538E−02 |
| A20 | −6.210357E+06 | 2.208059E+04 | −2.373458E+05 | −1.067620E+03 | −4.002018E−02 | −2.151959E−03 |

An equation of the aspheric surfaces of the fifth embodiment is the same as that of the first embodiment, and the definitions are the same as well.

The exact parameters of the fifth embodiment based on Table 9 and Table 10 are listed in the following table:

| Fifth embodiment | | | | | |
|---|---|---|---|---|---|
| MTFQ0 | MTFQ3 | MTFQ7 | MTFH0 | MTFH3 | MTFH7 |
| 0.78 | 0.69 | 0.59 | 0.56 | 0.38 | 0.25 |
| ETP1 | ETP2 | ETP3 | ETP1/TP1 | ETP2/TP2 | ETP3/TP3 |
| 0.375 | 0.329 | 0.740 | 0.750 | 1.215 | 0.993 |
| ETL | EBL | EIN | EIR | PIR | SETP |
| 2.756 | 0.784 | 1.972 | 0.074 | 0.139 | 1.444 |
| EIN/ETL | SETP/EIN | EIR/PIR | EBL/BL | BL | STP |
| 0.905 | 0.738 | 1.558 | 0.9235 | 0.8489 | 1.516 |

-continued

| Fifth embodiment | | | | | |
|---|---|---|---|---|---|
| ED12 | ED23 | ED12/IN12 | ED23/IN23 | SED | SETP/STP |
| 0.166 | 0.363 | 0.565 | 1.905 | 0.528 | 0.952 |
| \|f/f1\| | \|f/f2\| | \|f/f3\| | \|f1/f2\| | \|f2/f3\| | TP1/TP2 |
| 1.04584 | 0.87603 | 0.80673 | 1.19384 | 1.08590 | 1.84791 |
| ΣPPR | ΣNPR | ΣPPR/\|ΣNPR\| | IN12/f | IN23/f | TP2/TP3 |
| 1.85256 | 0.87603 | 2.11473 | 0.14212 | 0.09248 | 0.36307 |
| TP2/(IN12 + TP2 + IN23) | | (TP1 + IN12)/TP2 | | (TP3 + IN23)/TP2 | |
| 0.35900 | | 3.45819 | | 3.45819 | |
| HOS | InTL | HOS/HOI | InS/HOS | \|ODT\| % | \|TDT\| % |
| 2.84838 | 1.99953 | 1.58950 | 0.96749 | 2.50178 | 1.31012 |
| HVT21 | HVT22 | HVT31 | HVT32 | HVT32/HOI | HVT32/HOS |
| 0.00000 | 0.61184 | 1.00304 | 0.98558 | 0.54999 | 0.34601 |
| VSFS0 | VSFS3 | VSFS7 | VTFS0 | VTFS3 | VTFS7 |
| −0.000 | −0.005 | −0.010 | −0.000 | 0.005 | −0.005 |
| VSMTF0 | VSMTF3 | VSMTF7 | VTMTF0 | VTMTF3 | VTMTF7 |
| 0.564 | 0.510 | 0.498 | 0.564 | 0.436 | 0.288 |
| ISFS0 | ISFS3 | ISFS7 | ITFS0 | ITFS3 | ITFS7 |
| 0.020 | 0.015 | 0.010 | 0.020 | 0.025 | 0.005 |
| ISMTF0 | ISMTF3 | ISMTF7 | ITMTF0 | ITMTF3 | ITMTF7 |
| 0.459 | 0.412 | 0.345 | 0.459 | 0.379 | 0.179 |
| FS | AIFS | AVFS | AFS | | |
| 0.020 | 0.016 | −0.003 | 0.018 | | |

(Reference wavelength: 555 nm)

The results of the equations of the fifth embodiment based on Table 9 and Table 10 are listed in the following table:

| Values related to the inflection points of the fifth embodiment (Reference wavelength: 555 nm) | | | | | |
|---|---|---|---|---|---|
| HIF111 | 0.4575 | HIF111/HOI | 0.2553 | SGI111 | 0.0913 | \|SGI111\|/(\|SGI111\| + TP1) | 0.1544 |
| HIF211 | 0.4606 | HIF211/HOI | 0.2571 | SGI211 | −0.1593 | \|SGI211\|/(\|SGI211\| + TP2) | 0.2416 |
| HIF212 | 0.5184 | HIF212/HOI | 0.2893 | SGI212 | −0.1974 | \|SGI212\|/(\|SGI212\| + TP2) | 0.2830 |
| HIF221 | 0.4458 | HIF221/HOI | 0.2488 | SGI221 | −0.0947 | \|SGI221\|/(\|SGI221\| + TP2) | 0.1592 |
| HIF311 | 0.2874 | HIF311/HOI | 0.1604 | SGI311 | 0.0386 | \|SGI311\|/(\|SGI311\| + TP3) | 0.0716 |
| HIF321 | 0.4445 | HIF321/HOI | 0.2480 | SGI321 | 0.0617 | \|SGI321\|/(\|SGI321\| + TP3) | 0.1099 |

Sixth Embodiment

Figure 6A:
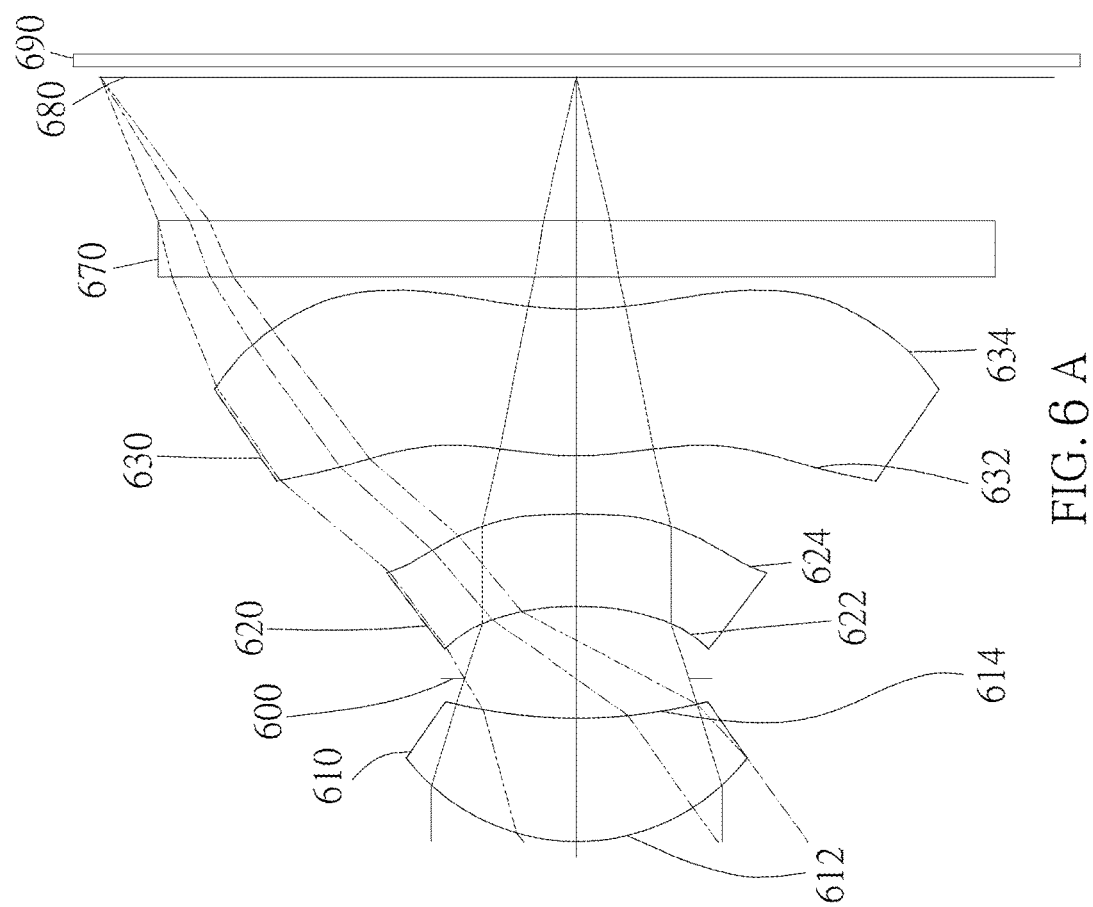
FIG. 6A is a schematic diagram of a sixth embodiment of the present invention.
Figure 6:
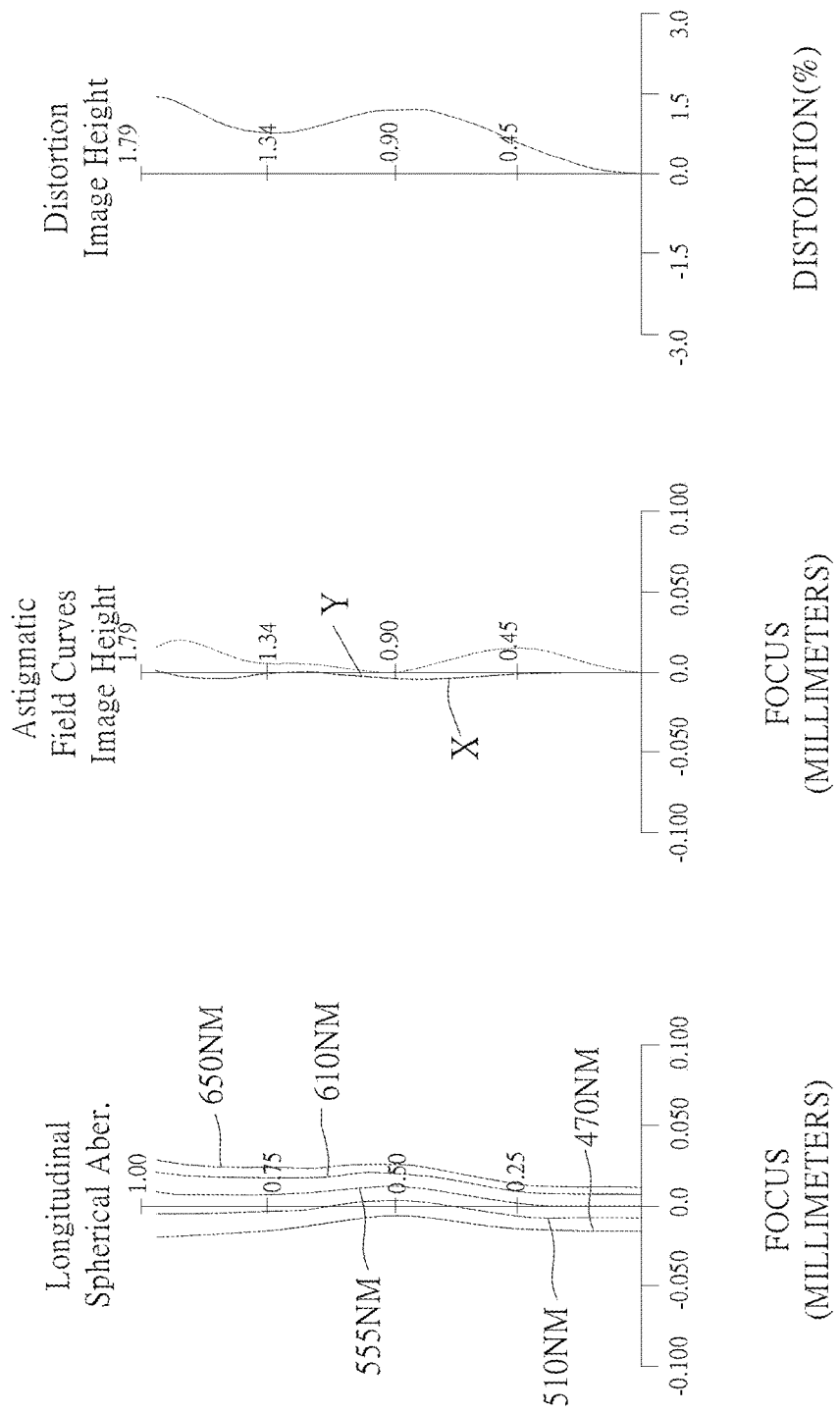
FIG. 6B shows curve diagrams of longitudinal spherical aberration, astigmatic field, and optical distortion of the optical image capturing system in the order from left to right of the sixth embodiment of the present application.
FIG. 6C shows a feature map of modulation transformation of the optical image capturing system of the sixth embodiment of the present application in visible spectrum.
FIG. 6D is a diagram showing the through-focus MTF values of the visible light spectrum at the central field of view, 0.3 field of view, and 0.7 field of view of the first embodiment of the present invention.
FIG. 6E is a diagram showing the through-focus MTF values of the infrared light spectrum at the central field of view, 0.3 field of view, and 0.7 field of view of the first embodiment of the present disclosure.
Figure 6:
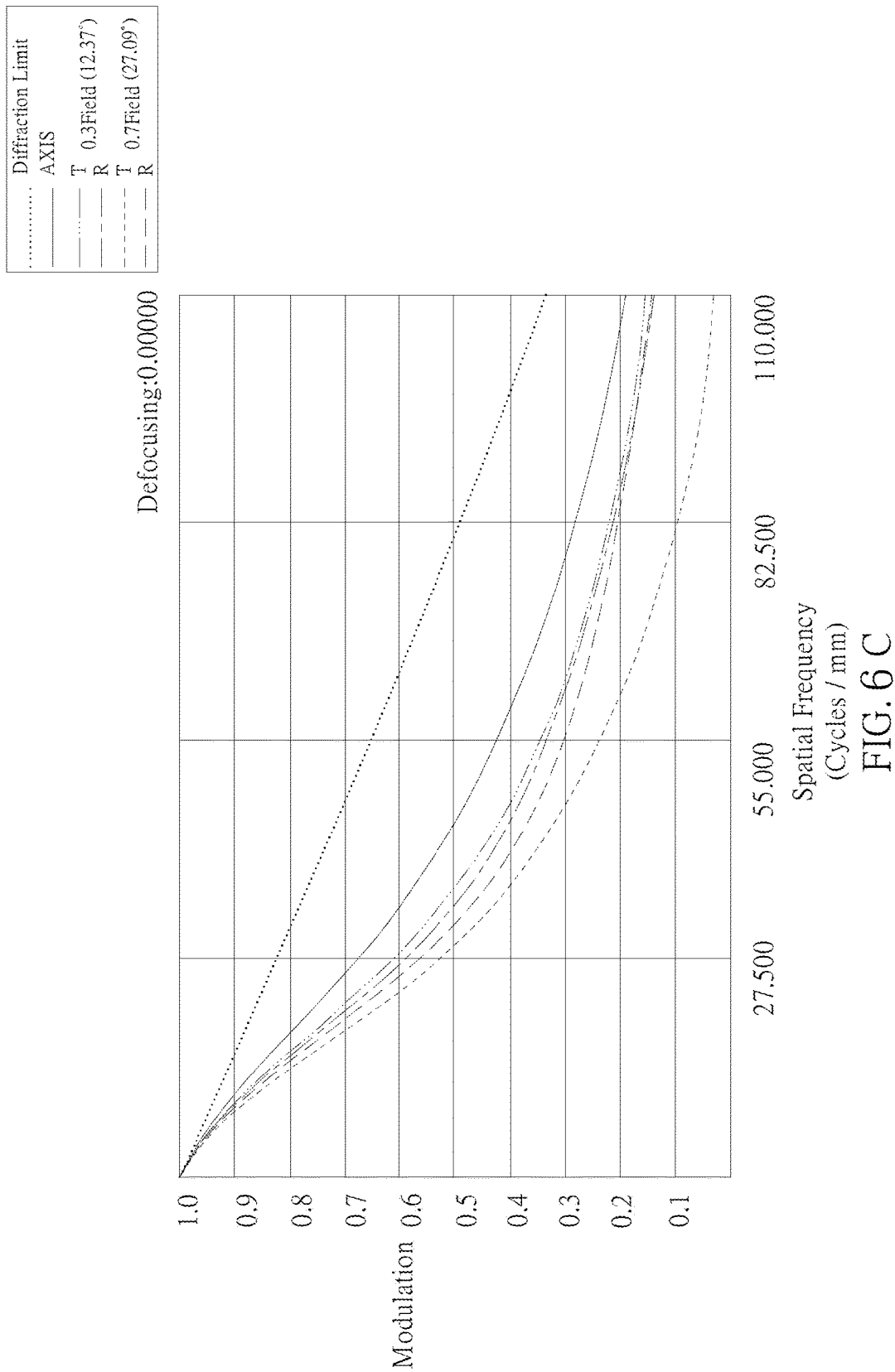
Figure 6:
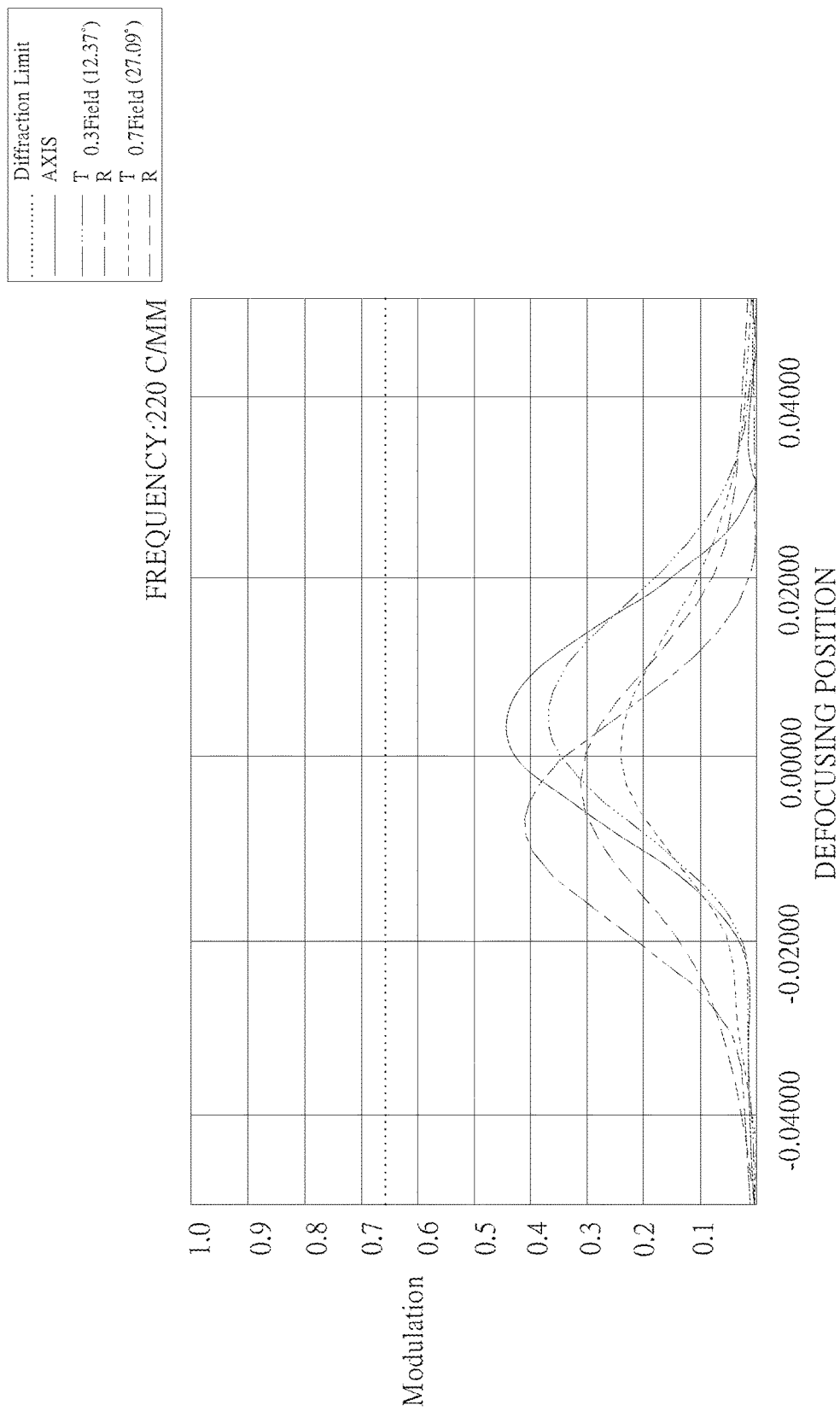
Figure 6:
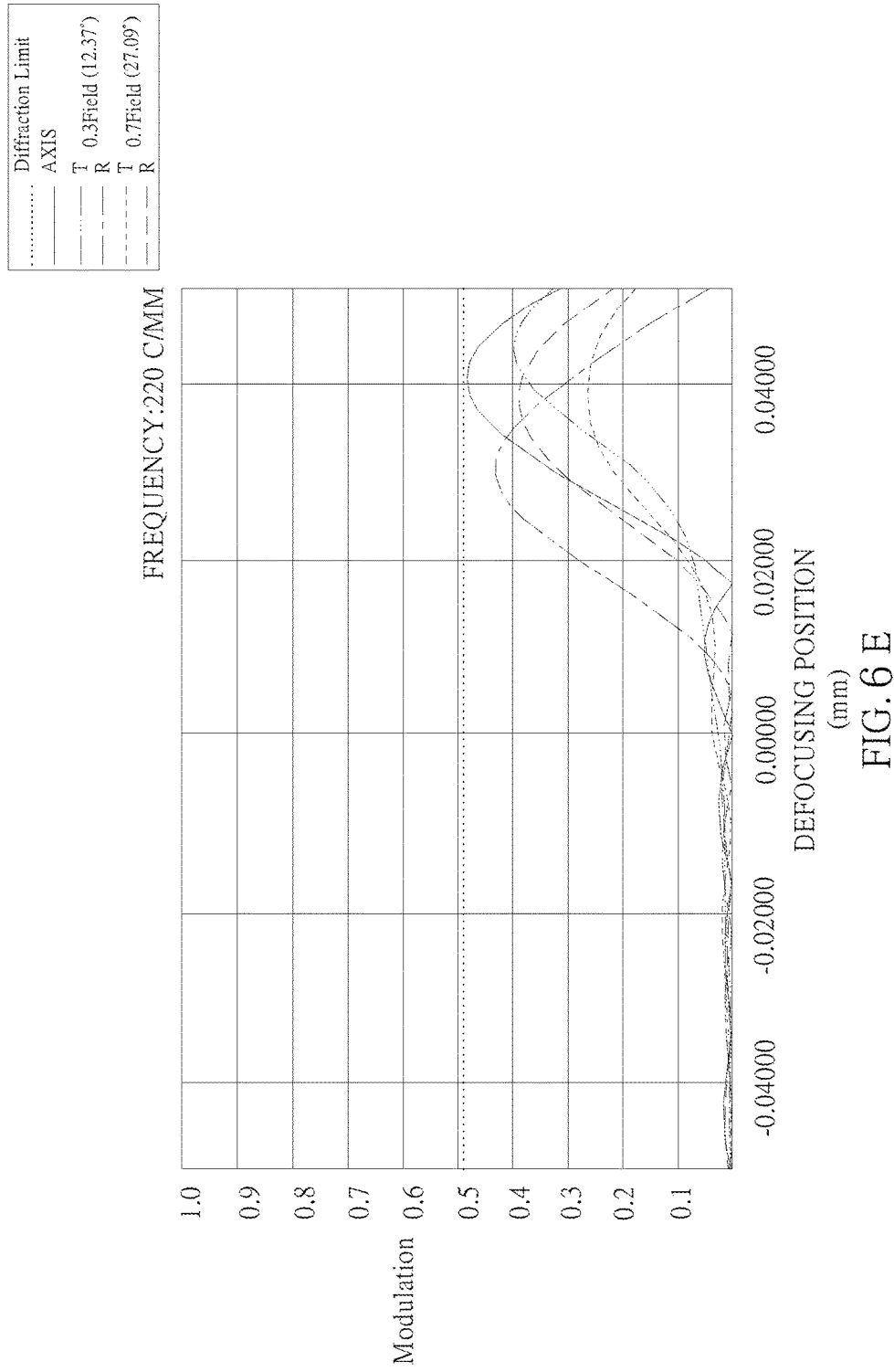

As shown in FIG. 6A and FIG. 6B, an optical image capturing system of the sixth embodiment of the present invention includes, along an optical axis from an object side to an image side, a first lens 610, an aperture 600, a second lens 620, a third lens 630, an infrared rays filter 670, an image plane 680, and an image sensor 690. FIG. 6C shows a modulation transformation of the optical image capturing system 60 of the sixth embodiment of the present application. FIG. 6D is a diagram showing the through-focus MTF values of the visible light spectrum at the central field of view, 0.3 field of view, and 0.7 field of view of the sixth embodiment of the present invention. FIG. 6E is a diagram showing the through-focus MTF values of the infrared light spectrum at the central field of view, 0.3 field of view, and 0.7 field of view of the sixth embodiment of the present disclosure.

The first lens 610 has positive refractive power and is made of plastic. An object-side surface 612, which faces the object side, is a convex aspheric surface, and an image-side surface 614, which faces the image side, is a concave aspheric surface.

The second lens 620 has negative refractive power and is made of plastic. An object-side surface 622 thereof, which faces the object side, is a concave aspheric surface, and an image-side surface 624 thereof, which faces the image side, is a convex aspheric surface. The image-side surface 624 has an inflection point.

The third lens 630 has positive refractive power and is made of plastic. An object-side surface 632, which faces the object side, is a convex aspheric surface, and an image-side surface 634, which faces the image side, is a convex aspheric surface. The object-side surface 632 has two inflection points, and the image-side surface 634 has an inflection point.

The infrared rays filter 670 is made of glass and between the third lens 630 and the image plane 680. The infrared rays filter 670 gives no contribution to the focal length of the system.

The parameters of the lenses of the sixth embodiment are listed in Table 11 and Table 12.

TABLE 11 f = 2.41135 mm; f/HEP = 2.22; HAF = 36 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 600 | | | | |
| 1 | 1st lens | 0.840352226 | 0.468 | plastic | 1.535 | 56.27 | 2.232 |
| 2 | | 2.271975602 | 0.148 | | | | |
| 3 | Aperture | 1E+18 | 0.277 | | | | |
| 4 | 2$^{nd}$ lens | −1.157324239 | 0.349 | plastic | 1.642 | 22.46 | −5.221 |
| 5 | | −1.968404008 | 0.221 | | | | |
| 6 | 3$^{rd}$ lens | 1.151874235 | 0.559 | plastic | 1.544 | 56.09 | 7.360 |
| 7 | | 1.338105159 | 0.123 | | | | |
| 8 | Infrared rays filter | 1E+18 | 0.210 | BK7 | 1.517 | 64.13 | |
| 9 | | 1E+18 | 0.547 | | | | |
| 10 | Image plane | 1E+18 | 0.000 | | | | |

Reference wavelength: 555 nm; the position of blocking light: the clear aperture of the first surface is 0.640 mm.

TABLE 12

Coefficients of the aspheric surfaces

| | Surface | | | | | |
|---|---|---|---|---|---|---|
| | 1 | 2 | 4 | 5 | 6 | 7 |
| k | −2.019203E−01 | 1.528275E+01 | 3.743939E+00 | −1.207814E+01 | −1.276860E+01 | −3.034004E+00 |
| A4 | 3.944883E−02 | −1.670490E−01 | −4.266331E−01 | −1.696843E+00 | −7.396546E−01 | −5.308488E−01 |
| A6 | 4.774062E−01 | 3.857435E+00 | −1.423859E+00 | 5.164775E+00 | 4.449101E−01 | 4.374142E−01 |
| A8 | −1.528780E+00 | −7.091408E+01 | 4.119587E+01 | −1.445541E+01 | 2.622372E−01 | −3.111192E−01 |
| A10 | 5.133947E+00 | 6.365801E+02 | −3.456462E+02 | 2.876958E+01 | −2.510946E−01 | 1.354257E−01 |
| A12 | −6.250496E+00 | −3.141002E+03 | 1.495452E+03 | −2.662400E+01 | −1.048030E−01 | −2.652902E−02 |
| A14 | 1.068803E+00 | 7.962834E+03 | −2.747802E+03 | 1.661634E+01 | 1.462137E−01 | −1.203306E−03 |
| A16 | 7.995491E+00 | −8.268637E+03 | 1.443133E+03 | −1.327827E+01 | −3.676651E−02 | 7.805611E−04 |

An equation of the aspheric surfaces of the sixth embodiment is the same as that of the first embodiment, and the definitions are the same as well.

The exact parameters of the sixth embodiment based on Table 11 and Table 12 are listed in the following table:

| Sixth embodiment | | | | | |
|---|---|---|---|---|---|
| MTFQ0 | MTFQ3 | MTFQ7 | MTFH0 | MTFH3 | MTFH7 |
| 0.67 | 0.62 | 0.53 | 0.43 | 0.35 | 0.24 |
| ETP1 | ETP2 | ETP3 | ETP1/TP1 | ETP2/TP2 | ETP3/TP3 |
| 0.396 | 0.378 | 0.569 | 0.846 | 1.082 | 1.018 |
| ETL | EBL | EIN | EIR | PIR | SETP |
| 2.787 | 0.831 | 1.956 | 0.074 | 0.123 | 1.343 |
| EIN/ETL | SETP/EIN | EIR/PIR | EBL/BL | BL | STP |
| 0.702 | 0.687 | 0.602 | 0.9451 | 0.8793 | 1.376 |

Sixth embodiment

| ED12 | ED23 | ED12/IN12 | ED23/IN23 | SED | SETP/STP |
|---|---|---|---|---|---|
| 0.278 | 0.334 | 0.655 | 1.515 | 0.613 | 0.976 |
| $|f/f1|$ | $|f/f2|$ | $|f/f3|$ | $|f1/f2|$ | $|f2/f3|$ | TP1/TP2 |
| 1.08042 | 0.46186 | 0.32763 | 2.33928 | 1.40968 | 1.33921 |
| ΣPPR | ΣNPR | ΣPPR/|ΣNPR| | IN12/f | IN23/f | TP2/TP3 |
| 1.40805 | 0.46186 | 3.04866 | 0.17636 | 0.09155 | 0.62498 |
| TP2/(IN12 + TP2 + IN23) | | (TP1 + IN12)/TP2 | | (TP3 + IN23)/TP2 | |
| 0.35102 | | 2.23183 | | 2.23183 | |
| HOS | InTL | HOS/HOI | InS/HOS | |ODT| % | |TDT| % |
| 2.90175 | 2.02243 | 1.61928 | 0.78770 | 1.50000 | 0.71008 |
| HVT21 | HVT22 | HVT31 | HVT32 | HVT32/HOI | HVT32/HOS |
| 0.00000 | 0.00000 | 0.46887 | 0.67544 | 0.37692 | 0.23277 |
| VSFS0 | VSFS3 | VSFS7 | VTFS0 | VTFS3 | VTFS7 |
| 0.005 | −0.005 | −0.005 | 0.005 | 0.005 | −0.000 |
| VSMTF0 | VSMTF3 | VSMTF7 | VTMTF0 | VTMTF3 | VTMTF7 |
| 0.441 | 0.402 | 0.309 | 0.441 | 0.369 | 0.239 |
| ISFS0 | ISFS3 | ISFS7 | ITFS0 | ITFS3 | ITFS7 |
| 0.040 | 0.030 | 0.040 | 0.040 | 0.045 | 0.040 |
| ISMTF0 | ISMTF3 | ISMTF7 | ITMTF0 | ITMTF3 | ITMTF7 |
| 0.485 | 0.441 | 0.388 | 0.485 | 0.396 | 0.273 |
| FS | AIFS | AVFS | AFS | | |
| 0.035 | 0.039 | 0.001 | 0.038 | | |

(Reference wavelength: 555 nm)

The results of the equations of the sixth embodiment based on Table 11 and Table 12 are listed in the following table:

Values related to the inflection points of the sixth embodiment
(Reference wavelength: 555 nm)

| | | | | | | |
|---|---|---|---|---|---|---|
| HIF221 | 0.5599 | HIF221/HOI | 0.3125 | SGI221 | −0.1487 | |SGI221|/(|SGI221| + TP2) | 0.2412 |
| HIF311 | 0.2405 | HIF311/HOI | 0.1342 | SGI311 | 0.0201 | |SGI311|/(|SGI311| + TP3) | 0.0413 |
| HIF312 | 0.8255 | HIF312/HOI | 0.4607 | SGI312 | −0.0234 | |SGI312|/(|SGI312| + TP3) | 0.0476 |
| HIF321 | 0.3505 | HIF321/HOI | 0.1956 | SGI321 | 0.0371 | |SGI321|/(|SGI321| + TP3) | 0.0735 |

It must be pointed out that the embodiments described above are only some embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
    a first lens having refractive power;
    a second lens having refractive power;
    a third lens having refractive power;
    a first image plane, which is an image plane specifically for visible light and perpendicular to the optical axis; a through-focus modulation transfer rate (value of MTF) at a first spatial frequency having a maximum value at central field of view of the first image plane; and
    a second image plane, which is an image plane specifically for infrared light and perpendicular to the optical axis; the through-focus modulation transfer rate (value of MTF) at the first spatial frequency having a maximum value at central of field of view of the second image plane;
    wherein the optical image capturing system consists of the three lenses with refractive power; at least one lens among the first to the third lenses has positive refractive power; each lens among the first lens to the third lens has an object-side surface, which faces the object side, and an image-side surface, which faces the image side; wherein the optical image capturing system satisfies:

$1 \leq f/HEP \leq 10$;

$0 \deg < HAF \leq 150 \deg$;

$0.5 \leq SETP/STP < 1$; and $|FS| \leq 30 \ \mu m$;

where f1, f2 and f3 are focal lengths of the first lens to the third lens, respectively; f is a focal length of the optical image capturing system; HEP is an entrance pupil diameter of the optical image capturing system; HOS is a distance between the object-side surface of the first lens and the first image plane on the optical axis; InTL is a distance from the object-side surface of the first lens to the image-side surface of the fifth lens on the optical axis; HAF is a half of a maximum view angle of the optical image capturing system; HOI is a maximum image height on the first image plane perpendicular to the optical axis; FS is a distance on the optical axis between the first image plane and the second image plane; ETP1, ETP2, and ETP3 are respectively a thickness at the height of ½ HEP of the first lens, the second lens, and the third lens; SETP is a sum of the aforementioned ETP1 to ETP3; TP1, TP2, and TP3 are respectively a thickness of the first lens, the second lens, and the third lens on the optical axis; STP is a sum of the aforementioned TP1 to TP3.

2. The optical image capturing system of claim 1, wherein a wavelength of the infrared light ranges from 700 nm to 1000 nm, and the first spatial frequency is denoted by SP1, which satisfies the following condition: SP1≤440 cycles/mm.

3. The optical image capturing system of claim 1, wherein the optical image capturing system further satisfies:

$0.2 \leq EIN/ETL < 1$;

where ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the third lens.

4. The optical image capturing system of claim 1, wherein the image-side surface of the first lens and the image-side surface of the second lens are both convex on the optical axis.

5. The optical image capturing system of claim 1, wherein half of a vertical maximum viewable angle of the optical image capturing system is denoted by VHAF, and the following condition is satisfied: VHAF≥10 deg.

6. The optical image capturing system of claim 1, wherein the optical image capturing system further satisfies:

$HOS/HOI \geq 1.2$.

7. The optical image capturing system of claim 1, wherein the optical image capturing system further satisfies:

$0.3 \leq SETP/EIN < 1$.

8. The optical image capturing system of claim 1, wherein the optical image capturing system further satisfies:

$0.1 \leq EBL/BL \leq 1.5$;

where EBL is a horizontal distance in parallel with the optical axis between a coordinate point at the height of ½ HEP on the first image-side surface of the third lens and image surface;
BL is a horizontal distance in parallel with the optical axis between the point on the image-side surface of the third lens where the optical axis passes through and the image plane.

9. The optical image capturing system of claim 1, further comprising an aperture, wherein the optical image capturing system further satisfies:

$0.2 \leq InS/HOS \leq 1.1$;

where InS is a distance between the aperture and the first image plane on the optical axis.

10. An optical image capturing system, in order along an optical axis from an object side to an image side, comprising:

a first lens having refractive power;
a second lens having refractive power;
a third lens having refractive power;
a first image plane, which is an image plane specifically for visible light and perpendicular to the optical axis; a through-focus modulation transfer rate (value of MTF) at a first spatial frequency having a maximum value at central field of view of the first image plane, and the first spatial frequency being 220 cycles/mm; and
a second image plane, which is an image plane specifically for infrared light and perpendicular to the optical axis; the through-focus modulation transfer rate (value of MTF) at the first spatial frequency having a maximum value at central of field of view of the second image plane, and the first spatial frequency being 220 cycles/mm;
wherein the optical image capturing system consists of the three lenses with refractive power; at least one lens among the first to the third lenses has positive refractive power; each lens among the first lens to the third lens has an object-side surface, which faces the object side, and an image-side surface, which faces the image side; the image-side surface of the first lens is convex on the optical axis;
wherein the optical image capturing system satisfies:

$1 \leq f/HEP \leq 10$;

$0 \deg < HAF \leq 150 \deg$;

$0.2 \leq EIN/ETL < 1$; and $|FS| \leq 30 \ \mu m$;

where f1, f2 and f3 are focal lengths of the first lens to the third lens, respectively; f is a focal length of the optical image capturing system; HEP is an entrance pupil diameter of the optical image capturing system; HOS is a distance between the object-side surface of the first lens and the first image plane on the optical axis; InTL is a distance from the object-side surface of the first lens to the image-side surface of the third lens on the optical axis; HAF is a half of a maximum view angle of the optical image capturing system; HOT is a maximum image height on the first image plane perpendicular to the optical axis; ETL is a distance in parallel with the optical axis between a coordinate point at a height of ½ HEP on the object-side surface of the first lens and the first image plane; EIN is a distance in parallel with the optical axis between the coordinate point at the height of ½ HEP on the object-side surface of the first lens and a coordinate point at a height of ½ HEP on the image-side surface of the third lens.

11. The optical image capturing system of claim 10, wherein the optical image capturing system further satisfies:

MTFQ0≥0.2;

MTFQ3≥0.01; and

MTFQ7≥0.01;

where HOI is a maximum height for image formation perpendicular to the optical axis on the image plane; MTFQ0, MTFQ3, and MTFQ7 are respectively values of modulation transfer function in a spatial frequency of 110 cycles/mm at the optical axis, 0.3 HOI, and 0.7 HOT on an image plane for visible light.

12. The optical image capturing system of claim 10, wherein half of a vertical maximum viewable angle of the optical image capturing system is denoted by VHAF, and the following condition is satisfied: VHAF≥20 deg.

13. The optical image capturing system of claim 10, wherein the optical image capturing system further satisfies:

HOS/HOI≥1.4.

14. The optical image capturing system of claim 10, wherein the optical image capturing system further satisfies:

0<ED23/IN23≤50;

where ED23 is a horizontal distance between the second lens and the third lens at the height of ½ HEP; IN23 is a horizontal distance between the second lens and the third lens on the optical axis.

15. The optical image capturing system of claim 10, wherein the optical image capturing system further satisfies:

0<ED12/IN12≤35;

where ED12 is a horizontal distance between the first lens and the second lens at the height of ½ HEP; IN12 is a horizontal distance between the first lens and the second lens on the optical axis.

16. The optical image capturing system of claim 10, wherein the optical image capturing system further satisfies:

0.1≤ETP1/TP1≤5;

where ETP1 is a thickness of the first lens at the height of ½ HEP in parallel with the optical axis; TP1 is a thickness of the first lens on the optical axis.

17. The optical image capturing system of claim 10, wherein the optical image capturing system further satisfies:

0.1≤ETP2/TP2≤5;

where ETP2 is a thickness of the second lens at the height of ½ HEP in parallel with the optical axis; TP2 is a thickness of the second lens on the optical axis.

18. The optical image capturing system of claim 10, wherein the optical image capturing system further satisfies:

0.1≤ETP3/TP3≤5;

where ETP3 is a thickness of the third lens at the height of ½ HEP in parallel with the optical axis; TP3 is a thickness of the third lens on the optical axis.

19. The optical image capturing system of claim 10, wherein at least one lens among the first lens to the third lens is a light filter, which is capable of filtering out light of wavelengths shorter than 500 nm.

20. An optical image capturing system, in order along an optical axis from an object side to an image side, comprising:

a first lens having positive refractive power;
a second lens having refractive power;
a third lens having refractive power;
a first average image plane, which is an image plane specifically for visible light and perpendicular to the optical axis; the first average image plane being installed at the average position of the defocusing positions, where through-focus modulation transfer rates (values of MTF) of the visible light at central field of view, 0.3 field of view, and 0.7 field of view are at their respective maximum at a first spatial frequency; the first spatial frequency being 220 cycles/mm; and
a second average image plane, which is an image plane specifically for infrared light and perpendicular to the optical axis; the second average image plane being installed at the average position of the defocusing positions, where through-focus modulation transfer rates of the infrared light (values of MTF) at central field of view, 0.3 field of view, and 0.7 field of view are at their respective maximum at the first spatial frequency; the first spatial frequency being 220 cycles/mm;
wherein the optical image capturing system consists of the three lenses having refractive power; at least one lens among the second lens to the third lens has positive refractive power; each lens among the first lens to the third lens has an object-side surface, which faces the object side, and an image-side surface, which faces the image side; the image-side surface of the first lens is convex on the optical axis; the image-side surface of the second lens is convex on the optical axis;
wherein the optical image capturing system satisfies:

1≤f/HEP≤10;

0 deg<HAF≤150 deg;

|AFS|≤30 μm;

VHAF≥20 deg; and 0.2≤EIN/ETL<1;

where f1, f2 and f3 are focal lengths of the first lens to the third lens, respectively; f is a focal length of the optical image capturing system; HEP is an entrance pupil diameter of the optical image capturing system; HOS is a distance between the object-side surface of the first lens and the first image plane on the optical axis; InTL is a distance from the object-side surface of the first lens to the image-side surface of the third lens on the optical axis; HAF is a half of a maximum view angle of the optical image capturing system; HOT is a maximum image height on the first image plane perpendicular to the optical axis; ETL is a distance in parallel with the optical axis between a coordinate point at a height of ½ HEP on the object-side surface of the first lens and the first image plane; EIN is a distance in parallel with the optical axis between the coordinate point at the height of ½ HEP on the object-side surface of the first lens and a coordinate point at a height of ½ HEP on the image-side surface of the third lens; AFS is a distance on the optical axis between the first average image plane and the second average image plane; VHAF is half of a vertical maximum viewable angle of the optical image capturing system.

21. The optical image capturing system of claim 20, wherein the optical image capturing system further satisfies:

$$0.3 \leq SETP/EIN < 1;$$

where ETP1, ETP2, and ETP3 are respectively a thickness at the height of ½ HEP of the first lens, the second lens, and the third lens; SETP is a sum of the aforementioned ETP1 to ETP3.

22. The optical image capturing system of claim 20, wherein the optical image capturing system further satisfies:

$$HOS/HOI \geq 1.6.$$

23. The optical image capturing system of claim 20, wherein a linear magnification of an image formed by the optical image capturing system on the second average image plane is LM, which satisfies the following condition: LM≥0.0003.

24. The optical image capturing system of claim 20, further comprising an aperture and an image sensor, wherein the image sensing device is disposed on the first average image plane and comprises at least 100 thousand pixels; the optical image capturing system further satisfies:

$$0.2 \leq InS/HOS \leq 1.1;$$

where InS is a distance between the aperture and the first average image plane on the optical axis.

25. The optical image capturing system of claim 20, further comprising an aperture, an image sensor, and a driving module, wherein the image sensing device is disposed on the first average image plane and comprises at least 100 thousand pixels; the driving module is coupled with the lenses to move the lenses; the optical image capturing system further satisfies:

$$0.2 \leq InS/HOS \leq 1.1;$$

where InS is a distance between the aperture and the first average image plane on the optical axis.

* * * * *